(12) United States Patent
Takashima

(10) Patent No.: US 7,874,003 B2
(45) Date of Patent: Jan. 18, 2011

(54) INFORMATION PROCESSING APPARATUS, INFORMATION RECORDING MEDIUM, INFORMATION PROCESSING METHOD, AND COMPUTER PROGRAM

(75) Inventor: Yoshikazu Takashima, Tokyo (JP)

(73) Assignee: Sony Corporation, Tokyo (JP)

( * ) Notice: Subject to any disclaimer, the term of this patent is extended or adjusted under 35 U.S.C. 154(b) by 1052 days.

(21) Appl. No.: 10/981,251

(22) Filed: Nov. 4, 2004

(65) Prior Publication Data

US 2005/0114295 A1 May 26, 2005

(30) Foreign Application Priority Data

| Nov. 6, 2003 | (JP) | ............................ P2003-376789 |
| Jan. 30, 2004 | (JP) | ............................ P2004-022638 |
| Apr. 19, 2004 | (JP) | ............................ P2004-123100 |

(51) Int. Cl.
*G06F 7/04* (2006.01)
(52) U.S. Cl. ........................................................ 726/26
(58) Field of Classification Search .................. 726/26; 380/200, 201
See application file for complete search history.

(56) References Cited

U.S. PATENT DOCUMENTS

| 7,188,224 B2 * | 3/2007 | Ohta et al. .................. 711/163 |
| 2002/0138747 A1 | 9/2002 | Clarke |
| 2003/0185128 A1 * | 10/2003 | Shoji et al. ................ 369/59.25 |
| 2005/0131998 A1 | 6/2005 | Takashima |
| 2006/0143666 A1 * | 6/2006 | Okada et al. ................... 725/89 |
| 2006/0146660 A1 * | 7/2006 | Ikeda et al. ............... 369/30.13 |

FOREIGN PATENT DOCUMENTS

| DE | 199 07 711 A1 | 8/2000 |
| JP | 2001-257670 | 9/2001 |
| JP | 2002-132457 | 5/2002 |

OTHER PUBLICATIONS

Jean-Paul Linnartz, et al., "System Aspects of Copy Management for Digital Video", Multimedia and Expo, XP-010511436, Jul. 30, 2000, pp. 203-206.
Sony: "CD-ROM Manual V3.0E", Internet Article, XP-002311965, Jul. 26, 1996, 2 pages.

* cited by examiner

*Primary Examiner*—Ellen Tran
(74) *Attorney, Agent, or Firm*—Oblon, Spivak, McClelland, Maier & Neustadt, L.L.P.

(57) ABSTRACT

An information recording medium, storing: main contents having constituent data according to a predetermined format and subcontents having constituent data not according to the predetermined format, as recorded data; the main contents and the subcontents having constituent data established as contents management units; the contents management units including data stored as encrypted data based on individual unit keys associated respectively with the contents management units.

37 Claims, 34 Drawing Sheets

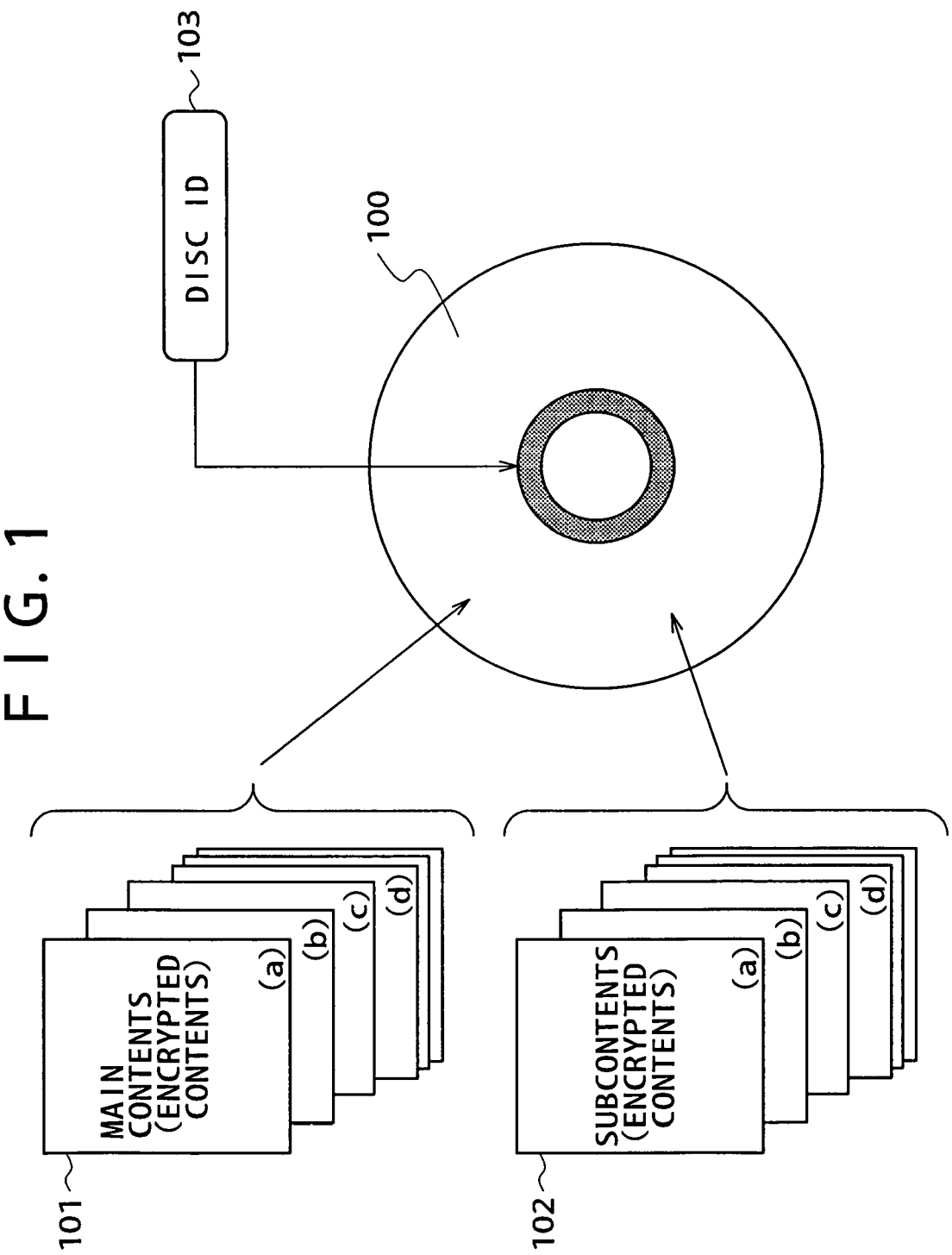

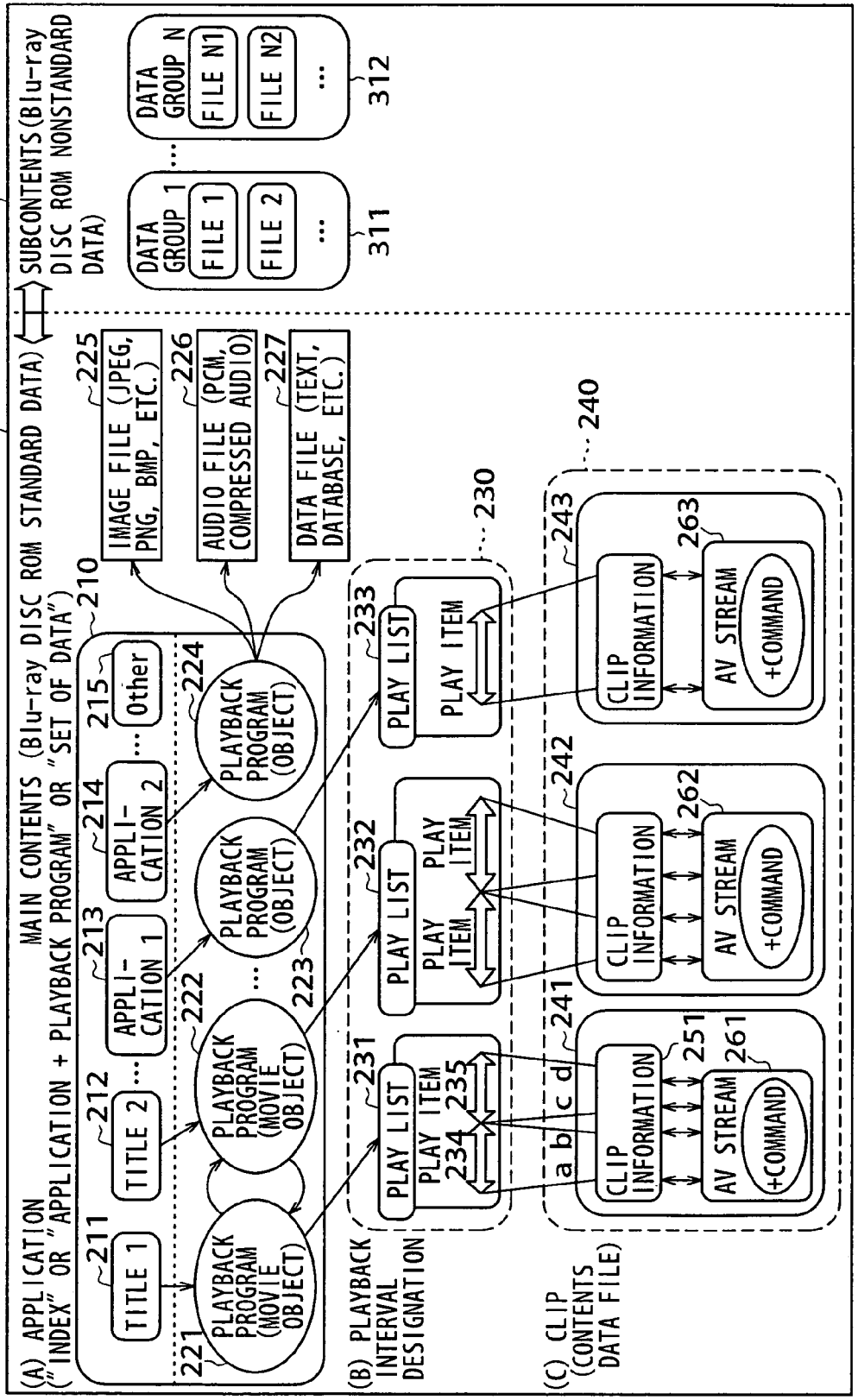

F I G. 3
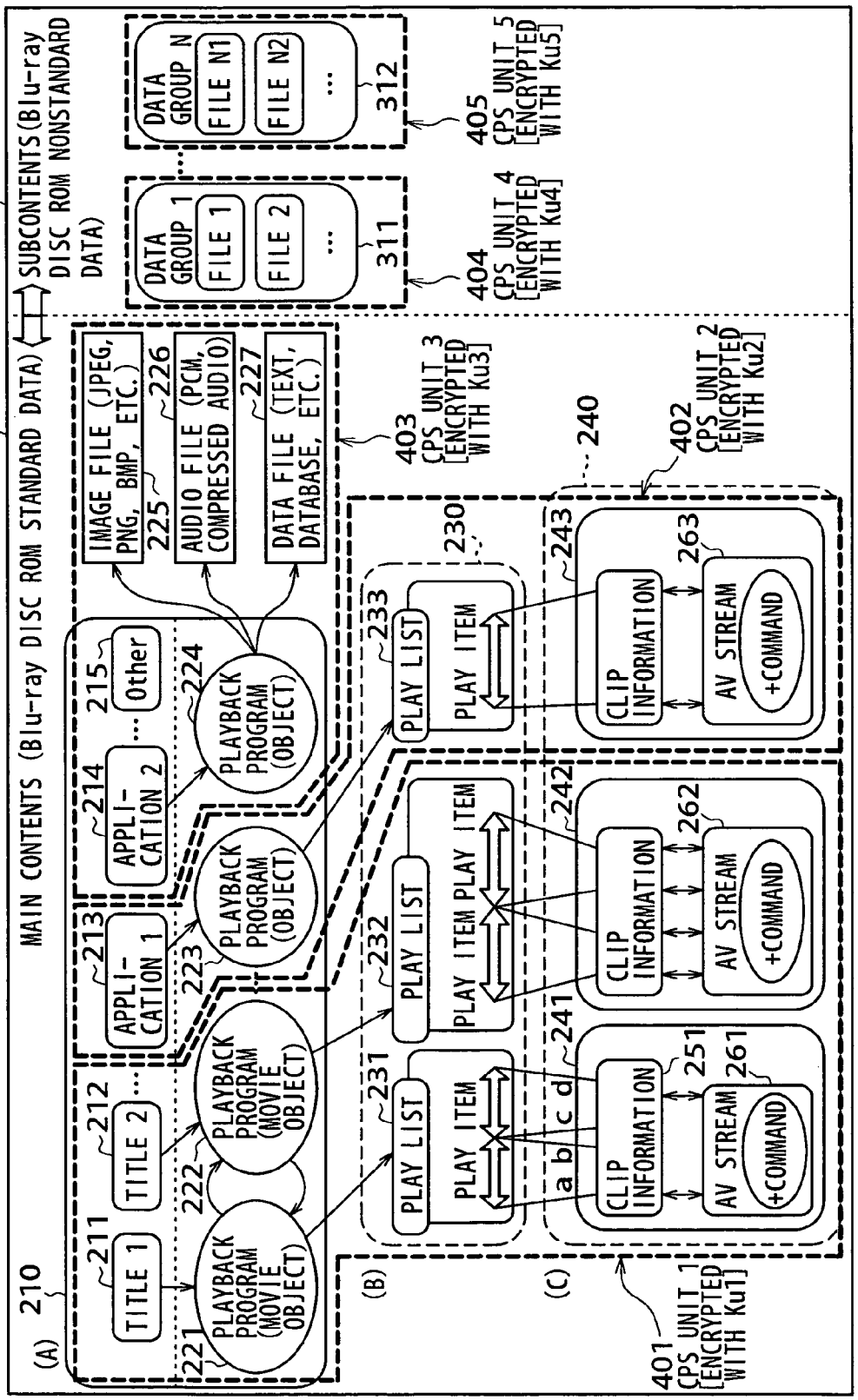

FIG. 4

| INDEX OR APPLICATION FILE OR DATA GROUP IN APPLICATION LAYER | CONTENTS MANAGEMENT UNIT (CPS) | UNIT KEY (CPS) | |
|---|---|---|---|
| TITLE 1 | CPS1 | Ku1 | MAIN CONTENTS ASSOCIATED DATA |
| TITLE 2 | CPS1 | Ku1 | |
| APPLICATION 1 | CPS2 | Ku2 | |
| APPLICATION 2 | CPS3 | Ku3 | |
| ...... | ...... | ...... | |
| DATA GROUP 1 | CPS4 | Ku4 | SUBCONTENTS ASSOCIATED DATA |
| DATA GROUP 2 | CPS5 | Ku5 | |
| ...... | ...... | ...... | |

FIG. 7

| INDEX OR APPLICATION FILE OR DATA GROUP IN APPLICATION LAYER | CONTENTS MANAGEMENT UNIT (CPS) | UNIT KEY (CPS) | |
|---|---|---|---|
| FIRST PLAYBACK | CPS1 | Ku1 | MAIN CONTENTS ASSOCIATED DATA |
| TOP MENU | CPS1 | Ku1 | |
| TITLE 1 | CPS2 | Ku2 | |
| ⋯⋯ | ⋯⋯ | ⋯⋯ | |
| APPLICATION 1 | CPS3 | Ku3 | |
| ⋯⋯ | ⋯⋯ | ⋯⋯ | |
| DATA GROUP 1 | CPS4 | Ku4 | SUBCONTENTS ASSOCIATED DATA |
| DATA GROUP 2 | CPS5 | Ku5 | |
| ⋯⋯ | ⋯⋯ | ⋯⋯ | |

FIG. 10

| CONTENTS MANAGEMENT UNIT (CPS) | INITIAL STATE | CURRENT STATE |
|---|---|---|
| CPS1 | Discrete only | Discrete |
| CPS2 | Discrete intially | Bound |
| CPS3 | Bound only | Bound |
| CPS4 | Bound initially | Discrete |
| ...... | ...... | ...... |
| CPSm | Discrete only | Discrete |

FIG. 11

| FIELD NAME | NUM_OF_BITS |
|---|---|
| Num_of_Content | 16 |
| for(I=0;I<Num_of_Content;I++){ | |
|   CCI_and_other_info_for_Content [I] | 128 |
| } | |

| CONTENTS OF CCI_and_other_info_for_Content [I]: PERT OR ALL OF INFORMATION GIVEN BELOW IS HELD BY FLAG OR VALUE (NUMBER OF BITS USED BY VALUE IS ARTITRARY) | (FLAG/ VALUE) | (CONTENTS) |
|---|---|---|
| ⟨OPERATION IN DISCRETE STATE⟩ | | |
| PLAYBACK | FLAG | OK/NG |
| METHOD OF PLAYING CONTENTS UNPLAYABLE IN DISCRETE STATE | VALUE | "CONNECTION TO KEY DISTRIBUTION SERVER", "INSERTION OF MEMORY CARD WITH KEY", ETC. |
| SERVER DESIGNATION | VALUE | INDEX VALUE TO SERVER LIST |
| ⟨OPERATION IN BOUND STATE⟩ | | |
| COPYING AND STREAMING COMPATIBILITY INFORMATION | VALUE | COMPATIBILITY INFORMATION FOR PLAYING BACK CONTENTS ON OTHER INTRANETWORK DEVICE |
| DATA CONVERSION PROCESS UPON COPYING AND STREAMING | VALUE | PROCESS USABLE FOR CONVERTING CONTENTS TO THOSE FOR OTHER DEVICE |
| WHETHER OR NOT COPYABLE TO INTRANETWORK RECORDING MEDIUM OF SAME TYPE | FLAG | OK/NG |
| NUMBER OF COPIES FOR COPYING TO INTRANETWORK RECORDING MEDIUM OF SAME TYPE | VALUE | NUMBER OF COPIES |
| EXPIRATION DATE FOR COPYING TO INTRANETWORK RECORDING MEDIUM OF SAME TYPE | VALUE | EXPIRATION DATE |
| WHETHER OR NOT COPYABLE TO INTRANETWORK RECORDING MEDIUM OF OTHER TYPE | FLAG | OK/NG |
| NUMBER OF COPIES FOR COPYING TO INTRANETWORK RECORDING MEDIUM OF OTHER TYPE | VALUE | NUMBER OF COPIES |
| EXPIRATION DATE FOR COPYING TO INTRANETWORK RECORDING MEDIUM OF OTHER TYPE | VALUE | EXPIRATION DATE |
| WHETHER OR NOT THERE ARE DATA FOR COPYING TO INTRANETWORK RECORDING MEDIUM OF OTHER TYPE | FLAG | OK/NG |
| DESIGNATION OF DATA FOR COPYING TO INTRANETWORK RECORDING MEDIUM OF OTHER TYPE | VALUE | INDEX VALUE FOR DESIGNATING DATA FOR COPYING |
| WHETHER OR NOT COPYABLE TO PORTABLE UNIT | FLAG | OK/NG |
| NUMBER OF COPIES TO PORTABLE UNIT | VALUE | NUMBER OF COPIES |
| EXPIRATION DATE FOR COPYING TO PORTABLE UNIT | VALUE | EXPIRATION DATE |
| WHETHER THERE ARE DATA FOR COPYING TO PORTABLE DEVICE | FLAG | OK/NG |
| DESIGNATION OF DATA FOR COPYING TO PORTABLE DEVICE | VALUE | INDEX VALUE FOR DESIGNATING DATA FOR COPYING |
| WHETHER OR NOT STREAMING IS POSSIBLE | FLAG | OK/NG |
| DESIGNATION OF STREAMING RECEPTION OBJECT | VALUE | LIMITATION OF OBJECT UNIT |
| WHETHER OR NOT REMOTELY PLAYABLE | FLAG | OK/NG |
| DESIGNATION OF REMOTE PLAYBACK RECEPTION OBJECT | VALUE | LIMITATION OF OBJECT UNIT |
| PROCESSING IF CONTENTS ARE NOT IN BOUND STATE | VALUE | IMMEDIATE INVALIDATION OF COPYING, INVALIDATION AFTER CERTAIN PERIOD, ERASURE, ETC. |
| TYPE OF DOWNLOADED DATA | VALUE | TYPE OF DOWNLOADED DATA (SUBTITLE, AUDIO, STILL IMAGE) |
| METHOD OF ACQUIRING DOWNLOADED DATA | VALUE | "CONNECTION TO DOWNLOAD SERVER", "INSERTION OF MEMORY CARD WITH DATA", ETC. |
| DESIGNATION OF DOWNLOAD SERVER | VALUE | INDEX VALUE TO DOWNLOAD SERVER LIST |
| 501 { ACQUISITION OF OPERATION CONTROL INFORMATION FROM SERVER | FLAG | ACCORDING TO OPERATION CONTROL INFORMATION ACQUIRED FROM SERVER |
|     DESIGNATION OF OPERATION CONTROL INFORMATION ACQUISITION SERVER | VALUE | INDEX VALUE TO SERVER LIST, INDICATING OPERATION CONTROL INFORMATION ACQUISITION SERVER |

FIG. 12

(A) FOR PUTTING ALL INFORMATION INTO ONE LOOP

| FIELD NAME | NUMBER_OF_BITS |
|---|---|
| Num_of_Content | 16 |
| for(I=0;I<Num_of_Content;I++) { | |
|     Num_of_function [I] | 16 |
|     for(J=0;J<Num_of_function;J++) { | |
|         CCI_and_other_info_length | 16 |
|         CCI_and_other_info_type | 8 |
|         CCI_and_other_info_value | 8 |
|         Additional_info | N |
|     } | |
| } | |

(B) FOR ALLOTTING LOOP TO EACH STATE

| FIELD NAME | NUMBER_OF_BITS |
|---|---|
| Num_of_Content | 16 |
| for(I=0;I<Num_of_Content;I++) { | |
|     Num_of_Discrete_function [I] | 16 |
|     for(J=0;J<Num_of_function;J++) { | |
|         CCI_and_other_info_length | 16 |
|         CCI_and_other_info_type | 8 |
|         CCI_and_other_info_value | 8 |
|         Additional_info | N |
|     } | |
|     Num_of_Bound_function [I] | 16 |
|     for(J=0;J<Num_of_function;J++) { | |
|         CCI_and_other_info_length | 16 |
|         CCI_and_other_info_type | 8 |
|         CCI_and_other_info_value | 8 |
|         Additional_info | N |
|     } | |
| } | |

LIST OF CCI_and_other_info_type AND CONTENTS OF CORRESPONDING CCI_and_other_info_value, Additional_info

| "CCI_and_other_info_type" | "CCI_and_other_info_valuie" | "Additional_info" |
|---|---|---|
| PLAYBACK IN DISCRETE STATE | OK/NG | METHOD OF PLAYING CONTENTS UNPLAYABLE IN DISCRETE STATE |
| | | SERVER DESIGNATION |
| COPY TO INTRANETWORK RECORDING MEDIUM OF SAME TYPE | OK/NG | NUMBER OF COPIES, EXPIRATION DATE |
| COPY TO INTRANETWORK RECORDING MEDIUM OF OTHER TYPE | OK/NG | NUMBER OF COPIES, EXPIRATION DATE, WHETHER THER ARE DATA FOR COPYING, DESIGNATION OF DATA FOR COPYING |
| | | DESIGNATION OF PROCESS FOR CONVERTING DATA UPON COPYING |
| COPY TO PORTABLE UNIT | OK/NG | NUMBER OF COPIES, EXPIRATION DATE, WHETHER THER ARE DATA FOR COPYING, DESIGNATION OF DATA FOR COPYING |
| | | DESIGNATION OF PROCESS FOR CONVERTING DATA UPON COPYING |
| STREAMING IN NETWORK | OK/NG | DESIGNATION OF STREAMING OBJECT UNIT |
| | | WHETHER THER ARE DATA FOR STREAMING, DESIGNATION OF DATA FOR STREAMING |
| | | DESIGNATION OF PROCESS FOR CONVERTING DATA UPON STREAMING |
| REMOTE PLAYBACK IN NETWORK | OK/NG | DESIGNATION OF OBJECT UNIT FOR REMOTE PLAYBACK |
| PROCESSING WHEN NOT IN BOUND STATE | VALUE | IMMEDIATE INVALIDATION OF COPYING, INVALIDATION AFTER CERTAIN PERIOD, ERASURE, ETC. |
| PLAYBACK OF DOWNLOADED DATA | VALUE (DATA TYPE) | METHOD OF ACQUIRING DOWNLOADED DATA, DESIGNATION OF DOWNLOAD SERVER |
| 502 — INFORMATION FOR ACQUISITION OF OPERATION CONTROL INFORMATION FROM SERVER | VALUE | DESIGNATION SERVER |
| 503 — USER DEFINITION INFORMATION | | UNIQUE DEFINITION BY CONTENTS OWNER, UNIQUE DEFINITION BY CONTENTS OWNER |

FIG. 22

EXAMPLE OF STRUCTURE OF Unit_Key_Generation_Value.inf:SYNTAX DIAGRAM

| FIELD NAME | NUM_OF_BITS |
|---|---|
| Unit_Key_Genertion_Value.inf { | |
|     CPS_Unit_number_for_FirstPlayback | 16 |
|     CPS_Unit_number_for_TopMenu | 16 |
|     Number of Titles | 16 |
|     for(i=1; i<Num_of_Titles+1; i++) { | |
|         CPS_Unit_number fo Title #i | 16 |
|     } | |
|     Number of CPS_Units | 16 |
|     for(i=1; i<Num_of_CPS_Unit+1; i++) { | |
|         Unit Key Generation Value for CPS_Unit #i | 128 |
|     } | |
| } | |

- IF First Playback IS NOT PRESENT IN AV CONTENTS, THEN SET CPS_Unit_number_for_FirstPlayback = 0.
- IF Top Menu IS NOT PRESENT IN AV CONTENTS, THEN SET CPS_Unit_number_for_Top Menu = 0.
- Title#1 - Title#[Number_of_Titles] DEFINES CORRESPONDING CPS_Unit NUMBER WITH ABOVE Syntax.

F I G. 2 4
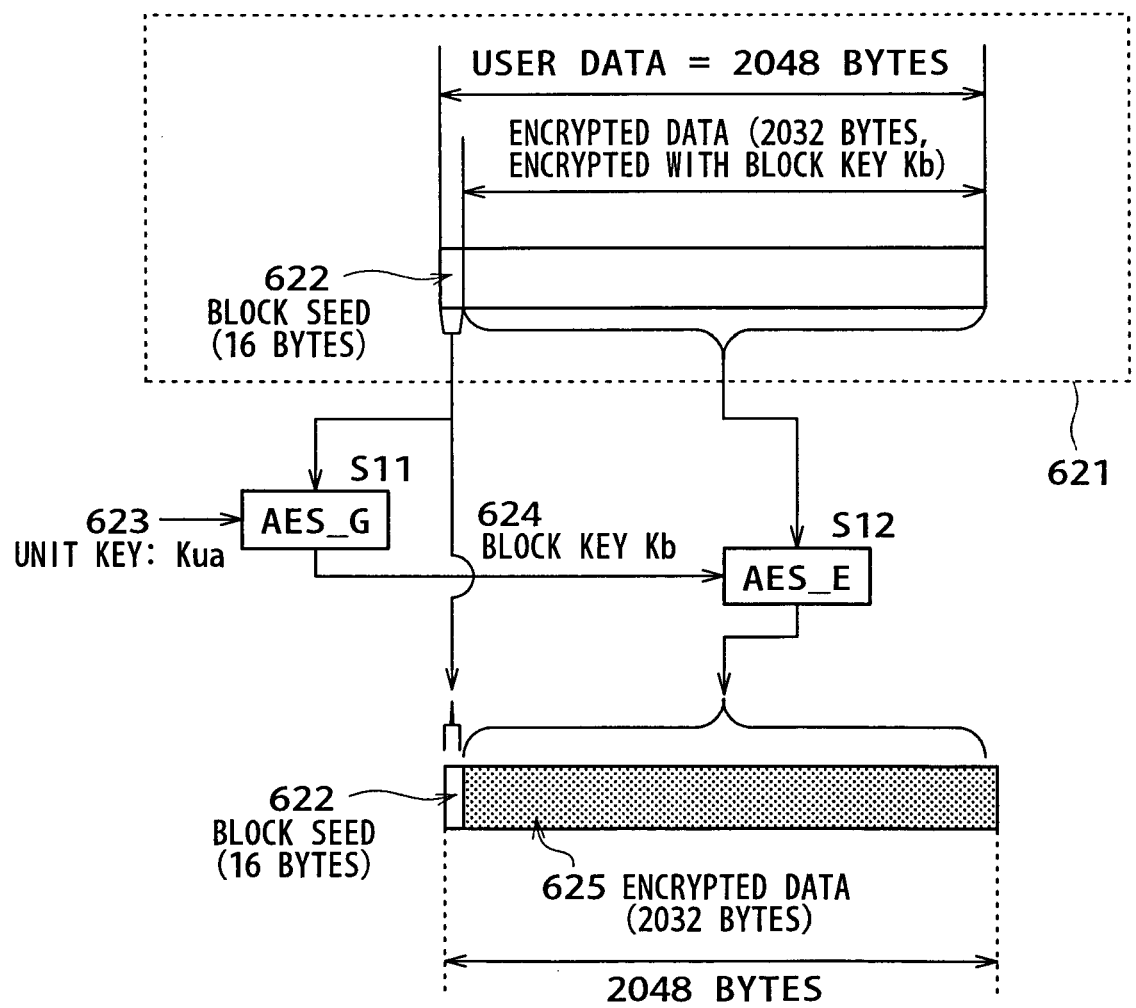

FIG. 28

| CCI_and_other_info0: EXAMPLE OF BASIC INFORMATION (NAMES) | (CONTENTS) |
|---|---|
| COPYABLE/UNCOPYABLE INFORMATION | COPYABLE/UNCOPYABLE/COPYABLE FOR ONE GENERATION ONLY |
| VIDEO OUTPUT RESOLUTION LIMIT INFORMATION | OUTPUT LIMIT/NO OUTPUT LIMIT |
| ANALOG COPY CONTROL INFORMATION | ANALOG COPY POSSIBLE/IMPOSSIBLE (DESIGNATION OF ANALOG COPY PREVENTION TECHNIQUE) |
| INFORMATION ON WHETHER OR NOT THERE IS ENCRYPTION | ENCRYPTION/NO ENCRYPTION |
| INFORMATION ON WHETHER OR NOT THERE IS CLAIM OF RIGHTS | CLAIM OF RIGHTS/NO CLAIM OF RIGHTS |

| CCI_and_other_info0: EXAMPLE OF EXTENDED INFORMATION (NAMES) | (CONTENTS) |
|---|---|
| PLAYABLE/UNPLAYABLE INFORMATION ON SINGLE DISC | INDICATES WHETHER OR NOT CONTENTS PLAYBACK IS POSSIBLE ONLY WITH INFORMATION ON DISC |
| METHOD OF PLAYING CONTENTS UNPLAYABLE ON SINGLE DISC | "CONNECTION TO KEY DISTRIBUTION SERVER", "INSERTION OF MEMORY CARD WITH KEY", ETC. |
| SERVER DESIGNATION | INDEX VALUE TO SERVER LIST |
| COPYING AND STREAMING COMPATIBILITY INFORMATION | COMPATIBILITY INFORMATION FOR PLAYING BACK CONTENTS ON OTHER INTRANETWORK DEVICE |
| DATA CONVERSION PROCESS UPON COPYING AND STREAMING | PROCESS USABLE FOR CONVERTING CONTENTS TO THOSE FOR OTHER DEVICE |
| WHETHER OR NOT COPYABLE TO INTRANETWORK RECORDING MEDIUM OF SAME TYPE | OK/NG |
| NUMBER OF COPIES TO INTRANETWORK RECORDING MEDIUM OF SAME TYPE | NUMBER OF COPIES |
| EXPIRATION DATE FOR COPYING TO INTRANETWORK RECORDING MEDIUM OF SAME TYPE | EXPIRATION DATE |
| WHETHER OR NOT COPYABLE TO INTRANETWORK RECORDING MEDIUM OF OTHER TYPE | OK/NG |
| NUMBER OF COPIES TO INTRANETWORK RECORDING MEDIUM OF OTHER TYPE | NUMBER OF COPIES |
| EXPIRATION DATE FOR COPYING TO INTRANETWORK RECORDING MEDIUM OF OTHER TYPE | EXPIRATION DATE |
| WHETHER OR NOT THERE ARE DATA FOR COPYING TO INTRANETWORK RECORDING MEDIUM OF OTHER TYPE | OK/NG |
| DESIGNATION OF DATA FOR COPYING TO INTRANETWORK RECORDING MEDIUM OF OTHER TYPE | INDEX VALUE FOR DESIGNATING DATA FOR COPYING |
| WHETHER OR NOT COPYABLE TO PORTABLE UNIT | OK/NG |
| NUMBER OF COPIES TO PORTABLE UNIT | NUMBER OF COPIES |
| EXPIRATION DATE FOR COPYING TO PORTABLE UNIT | EXPIRATION DATE |
| WHETHER THERE ARE DATA FOR COPYING TO PORTABLE DEVICE | OK/NG |
| DESIGNATION OF DATA FOR COPYING TO PORTABLE DEVICE | INDEX VALUE FOR DESIGNATING DATA FOR COPYING |
| WHETHER OR NOT STREAMING IS POSSIBLE | OK/NG |
| DESIGNATION OF STREAMING RECEPTION OBJECT | INDEX VALUE FOR DESIGNATING OBJECT |
| WHETHER OR NOT REMOTELY PLAYABLE | OK/NG |
| DESIGNATION OF REMOTE PLAYBACK RECEPTION OBJECT | LIMITATION OF OBJECT UNIT |
| PROCESSING IF USE OF CONTENTS IN NETWORK IS FINISHED | IMMEDIATE INVALIDATION OF COPYING, INVALIDATION AFTER CERTAIN PERIOD, ERASURE, ETC. |
| TYPE OF DOWNLOADED DATA | TYPE OF DOWNLOADED DATA (SUBTITLE, AUDIO, STILL IMAGE) |
| METHOD OF ACQUIRING DOWNLOADED DATA | "CONNECTION TO DOWNLOAD SERVER", "INSERTION OF MEMORY CARD WITH DATA", ETC. |
| DESIGNATION OF DOWNLOAD SERVER | INDEX VALUE TO DOWNLOAD SERVER LIST |
| ACQUISITION OF OPERATION CONTROL INFORMATION FROM SERVER | ACCORDING TO OPERATION CONTROL INFORMATION ACQUIRED FROM SERVER |
| DESIGNATION OF OPERATION CONTROL INFORMATION ACQUISITION SERVER | INDEX VALUE TO SERVER LIST INDICATING OPERATION CONTROL INFORMATION ACQUISITION SERVER |

F I G. 2 9

| FIELD NAME | NUM_OF_BITS | |
|---|---|---|
| CPSUnitX.cci { | | |
| Number_of_Primary_CCI_loops | 16 | |
| Reserved | 112 | ~721 |
| for(I=0;I<Number_of_Primary_CCI_loops;I++) { | | |
|     CCI_and_other_info_type | 16 | 2048 Bytes |
|     CCI_and_other_info_data_length (=N) | 16 | |
|     CCI_and_other_info_data | N*8 | |
| } | | |
| Reserved | X | |
| Hash_value_for_Primary_CCI | 160 | |
| Number_of_Secondary_CCI_loops | 16 | |
| Reserved | 112 | ~722 |
| for(I=0;I<Number_of_Secondary_CCI_loops;I++) { | | |
|     CCI_and_other_info_type | 16 | (2048*N) Bytes |
|     CCI_and_other_info_data_length (=M) | 16 | : OPTION |
|     CCI_and_other_info_data | M*8 | |
| } | | |
| Reserved | Y | |
| Hash_value_for_All_CCI | 160 | |
| } | | |

F I G. 3 1

| FIELD NAME | NUM_OF_BITS | |
|---|---|---|
| Number_of_Basic_CCI_loops | 16 | ⎫ |
| Reserved | 112 | ⎬ ~771 |
| for(I=0;I<Number_of_Basic_CCI_loops;I++) { | | ⎪ |
|     CCI_and_other_info_type | 16 | ⎬ 2048 Bytes |
|     CCI_and_other_info_data_length (=N) | 16 | ⎪ |
|     CCI_and_other_info_data | N*8 | ⎪ |
| } | | ⎪ |
| Reserved | X | ⎪ |
| Hash_value_for_Basic_CCI | 160 | ⎭ |
| Number_of_Extended_CCI_loops | 16 | ⎫ |
| Reserved | 112 | ⎬ ~772 |
| for(I=0;I<Number_of_Extended_CCI_loops;I++) { | | ⎪ (2048*N) Bytes |
|     CCI_and_other_info_type | 16 | ⎬ : OPTION |
|     CCI_and_other_info_data_length (=M) | 16 | ⎪ |
|     CCI_and_other_info_data | M*8 | ⎪ |
| } | | ⎪ |
| Reserved | Y | ⎪ |
| Hash_value_for_All_CCI | 160 | ⎭ |

F I G. 3 3
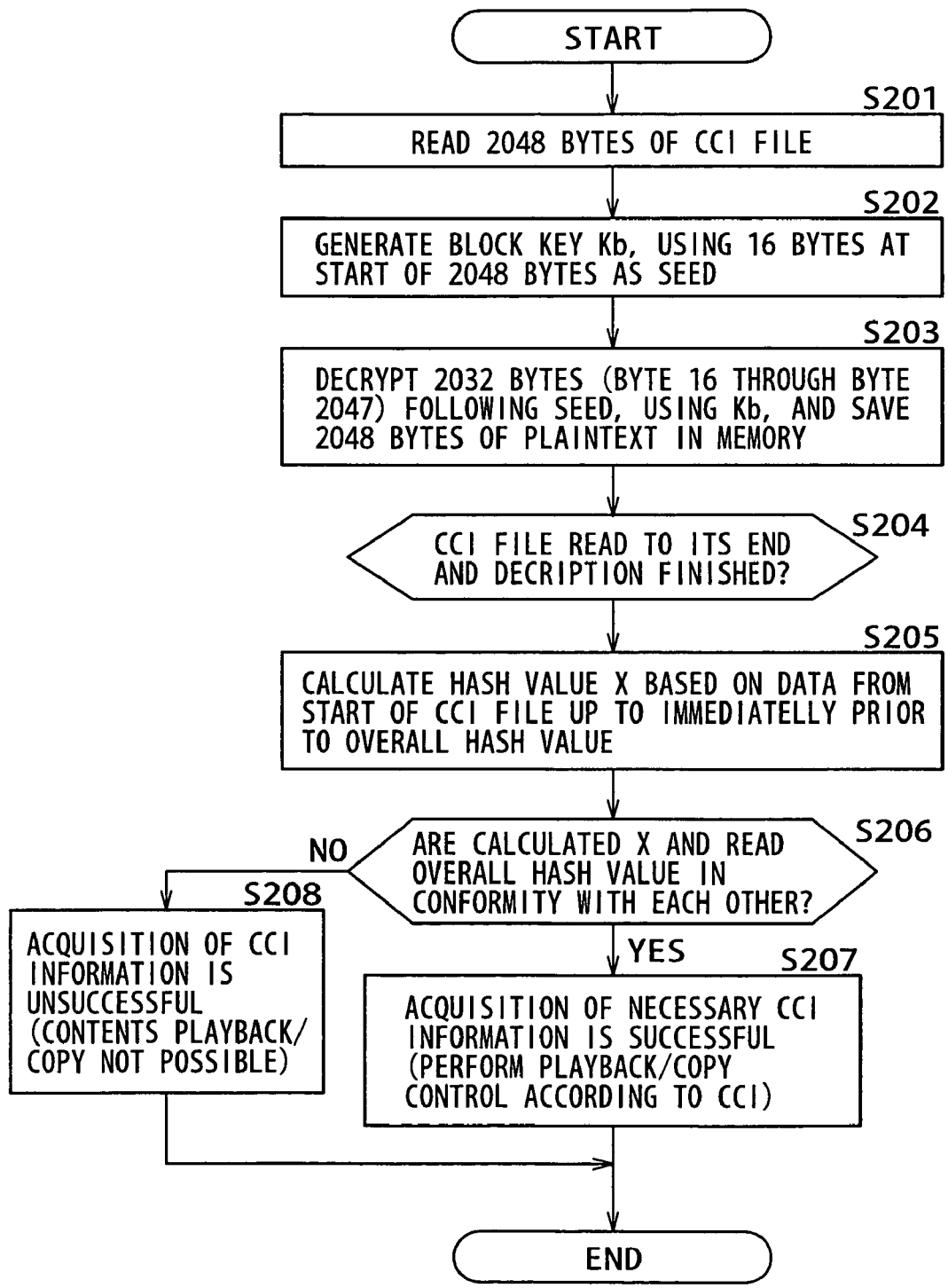

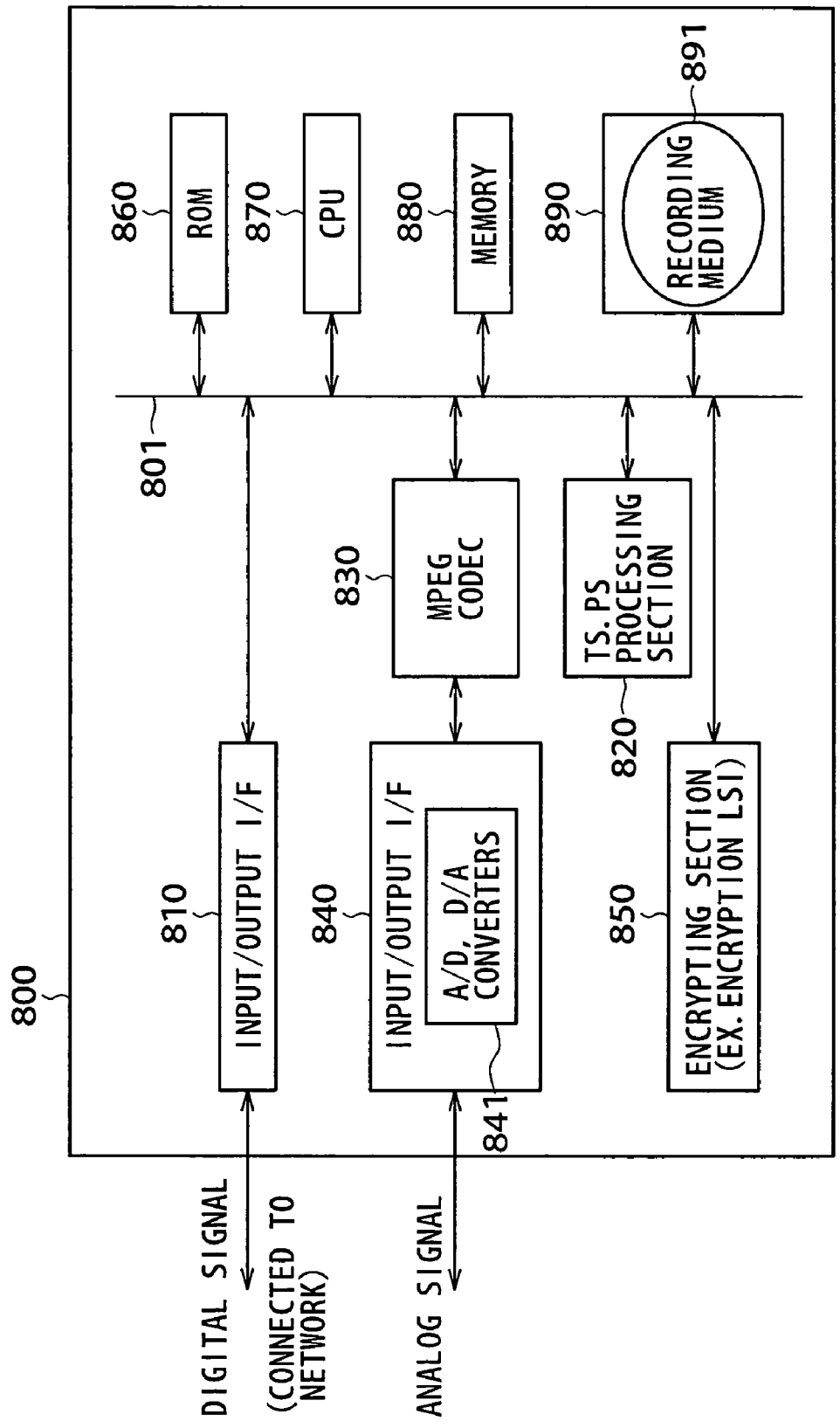

INFORMATION PROCESSING APPARATUS, INFORMATION RECORDING MEDIUM, INFORMATION PROCESSING METHOD, AND COMPUTER PROGRAM

BACKGROUND OF THE INVENTION

The present invention relates to an information processing apparatus, an information recording medium, an information processing method, and a computer program. And more particularly to an information processing apparatus, an information recording medium, an information processing method, and a computer program for realizing the storage of various contents that require contents usage management and the usage management of contents for each of finely segmentalized data units.

Various software data including audio data such as music data, image data such as movie data, game programs, various application programs (hereinafter referred to as "contents") can be stored as digital data on various recording mediums, e.g., Blu-ray discs using blue laser, DVDs (Digital Versatile Discs), MDs (Mini Discs), and CDs (Compact Discs). In particular, Blu-ray discs are discs capable of storing data in highly packed density, and can record a large amount of video contents or the like as data of high image quality.

Digital contents are stored in such various information recording mediums and provided to users. Users play and use the contents recorded in such information recording mediums on their playback units such as PCs (Personal Computers), disc players, etc.

Many contents including music data, image data, etc. are generally protected under distribution rights owned by their producers or sellers. It is customary to pose certain limitations on the distribution of those contents, i.e., to allow only normal users to use contents and inhibit unauthorized duplication, etc.

Digital recording devices and recording mediums are capable of repeatedly recording and reproducing digital contents without deteriorating image and audio data. They tend to give rise to such problems as the delivery of unauthorized copy contents via the Internet, the distribution of pirate discs such as CD-R with copied contents, and the widespread use of copy contents stored in the hard discs of PCs or the like.

Large-capacity recording mediums such as DVDs or recording mediums using blue laser that has been developed in recent years allow a large amount of data, e.g., data of one or several movies, as digital information on a single medium. In view of the ability to record video information as digital information, it is of growing importance to prevent unauthorized copying to protect copyright holders. Recent years have seen digital recording devices and recording medium that incorporate various techniques of preventing digital data from being copied unlawfully.

For example, DVD players employ a content scrambling system. According to the content scrambling system, video data and audio data are encrypted and recorded on a DVD-ROM (Read-Only Memory), and a key for decrypting the encrypted data is given to a licensed DVD player. The license is given to those DVD players that are designed to comply with certain operation rules against unauthorized copying. The licensed DVD player uses the given key to decrypt the encrypted data recorded on the DVD-ROM for thereby reproducing images and sounds from the DVD-ROM.

An unlicensed DVD player, on the other hand, is incapable of decrypting the encrypted data recorded on the DVD-ROM as it does not have the key to decrypt the encrypted data. According to the content scrambling system, therefore, any DVD players that do not meet the requirements for the license cannot play back the DVD-ROM with recorded digital data, thus preventing unauthorized duplication.

With the recent widespread use of data communication networks, so-called home networks are beginning to find use at home for networking home electric appliances, computers, and other peripherals to allow communications therebetween. Home networks give users convenience and comfort by allowing networked devices to communicate with each other thereby to share data processing functions of the devices and also to send and receive contents between the devices, and are expected to find increasing use in the future.

As such networked environments become more popular, there are more opportunities for the contents stored in information recording mediums to be accessed and used by devices that are connected to home networks. The above conventional unauthorized copy prevention system is based on the concept that the playback of contents is allowed on only one licensed player. Therefore, no sufficient consideration has been given to the situation where a networked device loaded with a recording medium, e.g., a home server or a player, is accessed by another networked device, e.g., a PC, a TV set, or the like, to play back the contents through the network.

Heretofore, since it has been the mainstream to use one content stored on a recording medium with a single player, it has been sufficient for performing the usage management of contents by establishing contents access rights such as a license for the contents or the player. At present, however, information recording mediums of larger capacity and home-use digital and networked devices in wider use require contents usage management arrangements different from those in the past. Specifically, there are demands, to be described below, for new contents usage management arrangements.

(1) The realization of arrangements for recording a plurality of contents on a recording medium and performing different usage management for each content.

(2) The realization of contents usage management arrangements for allowing contents to be used in a certain network such as a home network, or specifically allowing contents to be played back by a network-connected device and to be copied by a home server.

(3) The realization of arrangements for distributing information required to play back contents via a network, e.g., a key applied to decrypt contents, safety to a particular user.

It has been desired to realize the arrangements described above in (1) through (3).

SUMMARY OF THE INVENTION

It is therefore an object of the present invention to provide an information processing apparatus, an information recording medium, an information processing method, and a computer program for realizing the copyright management and usage management of each of finely segmentalized data units of contents stored on an information recording medium in the use of various contents stored in the information recording medium which require usage management such as copyright management.

Another object of the present invention is to provide an information processing apparatus, an information recording medium, an information processing method, and a computer program for converting contents usage control information corresponding to contents allotted to contents management units into encrypted data with unit keys corresponding to the contents management units, and setting and recording falsification verification data corresponding to data including the contents usage control information, for thereby realizing contents usage management at a higher security level.

According to a first aspect of the present invention, there is provided an information recording medium, storing:

main contents having constituent data according to a predetermined format and subcontents having constituent data not according to the predetermined format, as recorded data;

the main contents and the subcontents having constituent data established as contents management units;

the contents management units including data stored as encrypted data based on individual unit keys associated respectively with the contents management units.

In the information recording medium, the predetermined format is a Blu-ray disc ROM format, and the main contents include recorded data having a layered data arrangement according to the Blu-ray disc ROM format.

In the information recording medium, the subcontents include a set of data groups including at least one data file, the contents management units being established as units of the data groups, the information recording medium storing path identification information of the files of the data groups corresponding to the contents management units, as data group management information.

In the information recording medium, the subcontents include a set of data groups including at least one data file, the contents management units being established as units of the data groups, the information recording medium having a directory arrangement with the data groups established as individual folders.

The information recording medium stores identification information of the individual folders of the data groups corresponding to the contents management units, as the data group management information.

The information recording medium stores contents usage control information corresponding to the contents management units, as the encrypted data based on the unit keys associated respectively with the contents management units.

The information recording medium stores contents usage control information corresponding to the contents management units, as data having a falsification prevention arrangement.

The information recording medium stores contents usage control information corresponding to the contents management units and data associated with hash values based on the contents usage control information, as the encrypted data based on the unit keys associated respectively with the contents management units.

The information recording medium stores repetitive data of contents usage control information corresponding to the contents management units, as the encrypted data based on the unit keys associated respectively with the contents management units.

The information recording medium stores first playback contents as contents reproduced when the information recording medium is loaded in a drive, the first playback contents being established as contents management units, the contents management units including data stored as the encrypted data based on the individual unit keys associated respectively with the contents management units.

The information recording medium stores top menu contents as contents reproduced when a menu display function is performed, the top menu contents being established as contents management units, the contents management units including data stored as the encrypted data based on the individual unit keys associated respectively with the contents management units.

The information recording medium further stores a data file defining information representative of association between the contents management units and indexes, and random number information for generating the unit keys.

According to a second aspect of the present invention, there is provided an information processing apparatus, including:

a management unit setting section for establishing constituent data of main contents according to a predetermined format and subcontents not according to the predetermined format, as contents management units; and a recording section for recording data included in the contents management units in an information recording medium as encrypted data based on individual unit keys associated respectively with the contents management units.

In the information processing apparatus, the predetermined format is a Blu-ray disc ROM format, and the recording section stores the main contents in the information recording medium as recorded data having a layered data arrangement according to the Blu-ray disc ROM format.

In the information processing apparatus, the management unit setting section establishes the contents management units in association with a set of data groups including at least one data file included in the subcontents, and the recording section records path identification information of the files of the data groups corresponding to the contents management units, in the information recording medium as data group management information.

In the information processing apparatus, the management unit setting section establishes the contents management units in association with a set of data groups including at least one data file included in the subcontents, and the recording section records the at least one data file included in the subcontents in the information recording medium based on a directory arrangement with the data groups established as individual folders.

In the information processing apparatus, the recording section records identification information of the individual folders of the data groups corresponding to the contents management units, in the information recording medium as the data group management information.

In the information processing apparatus, the recording section records contents usage control information corresponding to the contents management units, in the information recording medium as the encrypted data based on the unit keys associated respectively with the contents management units.

In the information processing apparatus, the recording section records contents usage control information corresponding to the contents management units, in the information recording medium as data having a falsification prevention arrangement.

In the information processing apparatus, the recording section encrypts contents usage control information corresponding to the contents management units and data associated with hash values based on the contents usage control information, based on the unit keys associated respectively with the contents management units, and records the encrypted contents usage control information and the encrypted data in the information recording medium.

In the information processing apparatus, the recording section encrypts repetitive data of contents usage control information corresponding to the contents management units, based on the unit keys associated respectively with the contents management units, and records the encrypted repetitive data in the information recording medium.

In the information processing apparatus, the management unit setting section establishes first playback contents as contents reproduced when the information recording medium is loaded in a drive, as contents management units, and the recording section records data included in the contents management units as the encrypted data based on the individual unit keys associated respectively with the contents management units.

In the information processing apparatus, the management unit setting section establishes top menu contents as contents reproduced when a menu display function is performed, as contents management units, and the recording section records data included in the contents management units as the encrypted data based on the individual unit keys associated respectively with the contents management units.

In the information processing apparatus, the recording section further records a data file defining information representative of association between the contents management units and indexes, and random number information for generating the unit keys.

According to a third aspect of the present invention, there is provided an information processing apparatus for reproducing usage management contents, including:

an acquiring section for acquiring encrypted contents usage control information corresponding to contents management units stored in an information recording medium; and a decrypting and verifying section for decrypting and verifying, for falsification, the contents by applying unit keys established in association with the contents management units, and using the contents based on the contents usage control information if no falsification is confirmed.

According to a fourth aspect of the present invention, there is provided an information processing method, including the steps of:

establishing constituent data of main contents according to a predetermined format and subcontents having not according to the predetermined format, as contents management units; and storing data included in the contents management units in an information recording medium as encrypted data based on individual unit keys associated respectively with the contents management units.

In the information processing method, the predetermined format is a Blu-ray disc ROM format, and the data storing step including the step of storing the main contents in the information recording medium as recorded data having a layered data arrangement according to the Blu-ray disc ROM format.

The information processing method further includes the steps of:

establishing the contents management units in association with a set of data groups including at least one data file included in the subcontents; and storing path identification information of the files of the data groups corresponding to the contents management units, in the information recording medium as data group management information.

The information processing method further includes the steps of:

establishing the contents management units in association with a set of data groups including at least one data file included in the subcontents; and storing the at least one data file included in the subcontents in the information recording medium based on a directory arrangement with the data groups established as individual folders.

The information processing method further includes the step of:

storing identification information of the individual folders of the data groups corresponding to the contents management units, in the information recording medium as the data group management information.

The information processing method further includes the step of:

storing contents usage control information corresponding to the contents management units, in the information recording medium as the encrypted data based on the unit keys associated respectively with the contents management units.

The information processing method further includes the step of:

storing contents usage control information corresponding to the contents management units, in the information recording medium as data having a falsification prevention arrangement.

The information processing method further includes the steps of:

encrypt contents usage control information corresponding to the contents management units and data associated with hash values based on the contents usage control information, based on the unit keys associated respectively with the contents management units; and storing the encrypted contents usage control information and the encrypted data in the information recording medium.

The information processing method further includes the steps of encrypting repetitive data of contents usage control information corresponding to the contents management units, based on the unit keys associated respectively with the contents management units; and storing the encrypted repetitive data in the information recording medium.

The information processing method further includes the steps of:

establishing first playback contents as contents reproduced when the information recording medium is loaded in a drive, as contents management units; and storing data included in the contents management units as the encrypted data based on the individual unit keys associated respectively with the contents management units.

The information processing method further includes the steps of:

establishing top menu contents as contents reproduced when a menu display function is performed, as contents management units; and storing data included in the contents management units as the encrypted data based on the individual unit keys associated respectively with the contents management units.

The information processing method further includes the step of:

further storing a data file defining information representative of association between the contents management units and indexes, and random number information for generating the unit keys.

According to a fifth aspect of the present invention, there is provided an information processing method of reproducing usage management contents, including the steps of:

acquiring encrypted contents usage control information corresponding to contents management units stored in an information recording medium;

decrypting and verifying, for falsification, the contents by applying unit keys established in association with the contents management units; and using the contents based on the contents usage control information if no falsification is confirmed.

According to a sixth aspect of the present invention, there is provided a computer program for recording usage management contents, including the steps of:

establishing constituent data of main contents according to a predetermined format and subcontents not according to the predetermined format, as contents management units; and storing data included in the contents management units in an information recording medium as encrypted data based on individual unit keys associated respectively with the contents management units.

According to a seventh aspect of the present invention, there is provided a computer program for reproducing usage management contents, including the steps of:

acquiring encrypted contents usage control information corresponding to contents management units stored in an information recording medium; and decrypting and verifying, for falsification, the contents by applying unit keys established in association with contents management units; and using the contents based on the encrypted contents usage control information corresponding if no falsification is confirmed.

According to an eighth aspect of the present invention, there is provided an information recording medium storing:

at least one contents divided into contents management units and containing encrypted data based on unit keys established respectively in association with the contents management units; and contents usage control information established respectively in association with the contents management units;

the contents usage control information being stored as encrypted data according to an encryption process applying the unit keys established respectively in association with the contents management units, with falsification verification data added thereto.

In the information recording medium, the contents usage control information is encrypted in blocks each having a predetermined amount of data, and stored as block seeds including data of the respective blocks and encrypted block data encrypted based on a block key generated by an encryption process applying the unit keys.

In the information recording medium, the block seeds include block data which do not serve as the contents usage control information.

In the information recording medium, the contents usage control information includes data including control information in different categories representing basic control information and extended control information, the basic control information being stored in one block, with falsification verification data for data of the block storing the basic control information being stored in the same block.

In the information recording medium, the contents usage control information includes data including control information in different categories representing basic control information and extended control information, the basic control information being stored in one block, with first falsification verification data for data of the block storing the basic control information being stored in the same block, the information recording medium storing second falsification verification data for all data of the basic control information and the extended control information.

According to a ninth aspect of the present invention, there is provided an information processing apparatus for reproducing usage management contents, including:

an acquiring section for acquiring contents usage control information corresponding to contents management units stored in an information recording medium;

a decrypting section for decrypting blocks of block data each having a predetermined amount of data and serving as the contents usage control information by applying unit keys established in association with the contents management units, and verifying, for falsification, the blocks based on falsification verification data included in the block data; and a using section for using the contents based on the decrypted contents usage control information if no falsification is confirmed.

In the information processing apparatus, the acquiring section acquires block seeds from the blocks of the contents usage control information, and the decrypting section decrypts the blocks based on a block key generated by an encryption process applying the block seeds and the unit keys.

The information processing apparatus further includes a selection section for selecting only one block data including basic control information from a plurality of block data of the contents usage control information, wherein the decrypting section decrypts the selected block data including the basic control information, and verifies, for falsification, the block data based on falsification verification data included in the block data, and the using section uses the contents based on the decrypted contents usage control information if no falsification is confirmed.

The information processing apparatus further includes a selecting section for selecting a plurality of block data including basic control information and extended control information from a plurality of block data of the contents usage control information, wherein the decrypting section decrypts blocks of the selected block data, and verifies, for falsification, the block data based on falsification verification data, and the using section uses the contents based on the decrypted contents usage control information if no falsification is confirmed.

According to a tenth aspect of the present invention, there is provided an information processing apparatus for recording usage management contents in an information recording medium, including:

a generating section for generating falsification verification data for contents usage control information corresponding to contents management units established for individual usage management control;

an encrypting section for encrypting the contents by applying unit keys established respectively in association with the contents management units to generate encrypted data; and a generating and recording section for generating and recording encrypted contents usage control information including the falsification verification data.

The information processing apparatus further includes:

a dividing section for dividing the contents usage control information into blocks each having a predetermined amount data;

a generating section for generating a block key according to an encryption process applying block seeds extracted from constituent data of the blocks and the unit keys, and generating encrypted block data based on the block key; and a recording section for recording the encrypted block data in the information recording medium.

The information processing apparatus further includes:

an extracting section for extracting the block seeds from block arrangement date which do not serve as the contents usage control information.

The information processing apparatus further includes:

a dividing section for dividing the contents usage control information in different categories representing basic control information and extended control information;

a storing section for storing the basic control information in one block;

a generating section for generating falsification verification data for data of the block storing the basic control information;

a recording section for recording the falsification verification data in the same block.

The information processing apparatus further includes:

a dividing section for dividing the contents usage control information in different categories representing basic control information and extended control information;

a storing section for storing the basic control information in one block;

a generating section for generating first falsification verification data for data of the block storing the basic control information;

a recording section for recording the falsification verification data in the same block;

a generating section for generating second falsification verification data for all data of the basic control information and the extended control information; and a recording section for recording the second falsification verification data.

According to an eleventh aspect of the present invention, there is provided an information processing method of reproducing usage management contents, including the steps of:

acquiring contents usage control information corresponding to contents management units stored in an information recording medium;

decrypting blocks of block data each having a predetermined amount of data and serving as the contents usage control information by applying unit keys established in association with the contents management units;

verifying, for falsification, the blocks based on falsification verification data included in the block data; and using the contents based on the decrypted contents usage control information if no falsification is confirmed.

In the information processing method, the decrypting step includes the steps of:

acquiring block seeds from the blocks of the contents usage control information, and decrypting the blocks based on a block key generated by an encryption process applying the block seeds and the unit keys.

The information processing method further includes the steps of:

selecting only one block data including basic control information from a plurality of block data of the contents usage control information;

decrypting the selected block data including the basic control information;

verifying, for falsification, the block data based on falsification verification data included in the block data; and using the contents based on the decrypted contents usage control information if no falsification is confirmed.

The information processing method further includes the steps of:

selecting a plurality of block data including basic control information and extended control information from a plurality of block data of the contents usage control information;

decrypting blocks of the selected block data;

verifying, for falsification, the block data based on falsification verification data; and using the contents based on the decrypted contents usage control information if no falsification is confirmed.

According to a twelfth aspect of the present invention, there is provided an information processing method of recording usage management contents in an information recording medium, including the steps of:

generating falsification verification data for contents usage control information corresponding to contents management units established for individual usage management control;

encrypting the contents by applying unit keys established respectively in association with the contents management units to generate encrypted data; and generating and recording encrypted contents usage control information including the falsification verification data.

The information processing method further includes the steps of:

dividing the contents usage control information into blocks each having a predetermined amount data, generating a block key according to an encryption process applying block seeds extracted from constituent data of the blocks and the unit keys, generating encrypted block data based on the block key, and recording the encrypted block data in the information recording medium.

In the information processing method, the block seeds are extracted from block arrangement date which do not serve as the contents usage control information.

The information processing method further includes the steps of:

dividing the contents usage control information in different categories representing basic control information and extended control information, storing the basic control information in one block, generate falsification verification data for data of the block storing the basic control information, storing the falsification verification data in the same block, and recording the falsification verification.

The information processing method further includes the steps of:

dividing the contents usage control information in different categories representing basic control information and extended control information, storing the basic control information in one block, generate first falsification verification data for data of the block storing the basic control information, storing the falsification verification data in the same block, and recording the falsification verification; and generating second falsification verification data for all data of the basic control information and the extended control information, and record the second falsification verification data.

According to a thirteenth aspect of the present invention, there is provided a computer program for reproducing usage management contents, including the steps of:

acquiring contents usage control information corresponding to contents management units stored in an information recording medium;

decrypting blocks of block data each having a predetermined amount of data and serving as the contents usage control information by applying unit keys established in association with the contents management units;

verifying, for falsification, the blocks based on falsification verification data included in the block data; and using the contents based on the decrypted contents usage control information if no falsification is confirmed.

According to a fourteenth aspect of the present invention, there is provided a computer program for recording usage management contents in an information recording medium, including the steps of:

generating falsification verification data for contents usage control information corresponding to contents management units established for individual usage management control;

encrypting the contents by applying unit keys established respectively in association with the contents management units to generate encrypted data; and generating and recording encrypted contents usage control information including the falsification verification data.

The computer program according to the present invention includes a computer program that can be supplied to a computer system which is capable of executing various program codes, through a computer-readable storage medium or communication medium, e.g., a recording medium such as a CD, an FD, an MO, or the like, or through a communication medium such as a network or the like. By providing such a program in a computer-readable form to the computer system, the computer system performs a process based on the program.

The above and other objects, features, and advantages of the present invention will become apparent from the following description when taken in conjunction with the accompanying drawings which illustrate preferred embodiments of the present invention by way of example.

BRIEF DESCRIPTION OF THE DRAWINGS

FIG. 1 is a diagram showing a storage data arrangement of an information recording medium;

FIG. 2 is a diagram showing an example of a format of stored contents of an information recording medium;

FIG. 3 is a diagram showing an example of contents management units set for stored contents of an information recording medium;

FIG. 4 is a diagram showing a table of contents management units and unit keys;

FIG. 7 is a diagram showing an example of a table of contents management units and unit keys for an arrangement including first playback and top menu;

FIG. 10 is a diagram showing an example of data of a contents state management table;

FIG. 11 is a diagram showing an example of data of a contents playback and copy control information management table;

FIG. 12 is a diagram showing an example of data of the contents playback and copy control information management table where contents management information depending on the state of contents is recorded with variable-length data;

FIG. 22 is a diagram showing a data arrangement of a unit key generation value information (Unit_Key_Gen_Value.inf);

FIG. 24 is a diagram showing a block encryption process using a block key Kb;

FIG. 28 is a diagram showing a specific example of basic control information (Basic CCI) and extended control information (Extended CCI);

FIG. 29 is a diagram showing a syntax corresponding to a stored example of the contents usage control information shown in FIG. 27;

FIG. 31 is a diagram showing a syntax corresponding to a stored example of the contents usage control information shown in FIG. 30;

FIG. 33 is a flowchart of a processing sequence of the information processing apparatus for reading both basic control information and extended control information and performing contents usage according to the basic control information and the extended control information; and FIG. 34 is a diagram showing an example of an arrangement of the information processing apparatus which is loaded with and plays back an information recording medium.

DETAILED DESCRIPTION OF THE PREFERRED EMBODIMENTS

Figure 5:
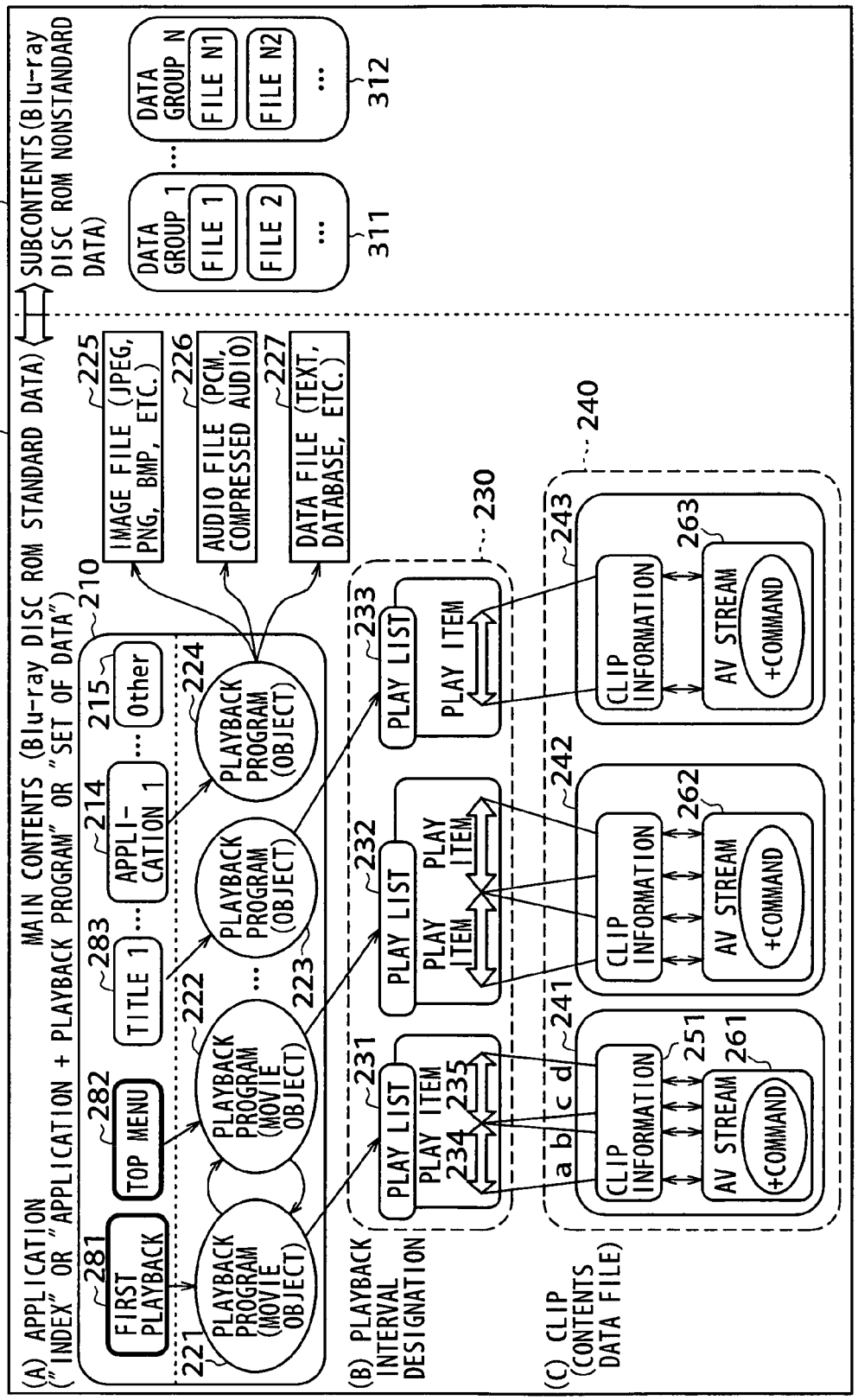
FIG. 5 is a diagram showing an example of a format of storage contents including first playback and top menu.

Details of an information processing apparatus, an information recording medium, an information processing method, and a computer program according to the present invention will be described below with reference to the drawings. The invention will be described successively in respect of separate items given below.

1. Storage data arrangement of information recording medium
2. Example of stored contents arrangement
3. Encryption and usage management arrangement of stored contents
4. First playback and menu display processing arrangement
5. Contents usage management based on network-discrete and -bound states
6. Contents copy management in network
7. Management information for contents management units
8. Storage arrangement of main contents, subcontents, and contents
9. Encryption and falsification prevention processing arrangements for contents usage control information
   (9-1) Summary of encryption and falsification prevention processing arrangements for contents usage control information
   (9-2) Specific example of encryption and falsification prevention processing arrangements for contents usage control information
10. Example of arrangement of information processing apparatus

[1. Storage Data Arrangement of Information Recording Medium]

First, the storage data arrangement of an information recording medium will be described below.

FIG. 1 shows by way of example an information recording medium storing contents to which the processing according to the present invention is applicable. In FIG. 1, information stored on a ROM disc as a contents-stored disc is illustrated by way of example.

The ROM disc is an information recording medium that stores legitimate contents which is manufactured by a disc manufacturing factory under the permission of contents right holders who have lawful contents copyrights or distribution rights. In the embodiment below, a disc-type medium will be described as an example of an information recording medium. However, the present invention is applicable to arrangements which employ various forms of information recording mediums.

As shown in FIG. 1, an information recording medium 100 stores various contents. The contents are generally classified into two categories. One of the categories contains main contents 101 including AV (Audio Visual) streams, game programs of the type prescribed by certain standards, image files, audio data, and text data. The AV streams include moving image contents such as HD (High Definition) movie contents which include high-definition moving image data. The main contents 101 are certain AV format standard data and are stored according to a certain AV data format. Specifically, the main contents 101 are stored as Blu-ray disc ROM standard data according to a Blu-ray disc ROM standard format.

Furthermore, game programs, image files, audio data, and text data as service data are stored as subcontents 102. The subcontents 102 are data having a data format not in accordance with a certain AV data format. Specifically, the subcontents 102 are stored as Blu-ray disc ROM nonstandard data according to an arbitrary format not in accordance with a Blu-ray disc ROM standard format.

Both the main contents 101 and the subcontents 102 contain various types of contents including music data, image data such as moving images, still images, etc., game programs, and WEB contents. These contents contain various types of information such as contents information available based on only data from the information recording medium 100, and contents information available based on a combination of data from the information recording medium 100 and data provided from a networked server.

Each or a set of contents contained in the main contents 101 and the subcontents 102 are encrypted with individual encryption keys (unit keys) and stored in the information recording medium 100 for usage management of the contents. The information recording medium 100 also stores a disc ID 103 as identifying information of the information recording medium 100.

[2. Example of Stored Contents Arrangement]

A storage format of the contents that are stored in the information recording medium according to the present invention will be described below with reference to FIG. 2.

As shown in FIG. 2, the information recording medium stores AV streams of moving image contents such as HD (High Definition) movie contents which include high-definition moving image data as main contents 200, and also stores other data and programs, e.g., game programs, image files, audio data, and text data as service data as subcontents 300.

The main contents 200 are stored as Blu-ray disc ROM standard data, for example, according to a Blu-ray disc ROM standard format. The subcontents 300 are stored as Blu-ray disc ROM nonstandard data according to an arbitrary format not in accordance with a Blu-ray disc ROM standard format.

As shown in FIG. 2, the main contents 200 that are stored according to the Blu-ray disc ROM standard format include moving image contents (AV streams) stored as actual contents to be reproduced, and has a layered arrangement according to the Blu-ray disc ROM standard format. That is, the main contents 200 include:

(A) applications 210;
(B) playback interval designation files (play lists) 230; and
(C) clips (contents data files) 240.
(C) The clips (contents data files) 240 have clips 241, 242, 243 that are segmentalized contents data files. Each clip 241 has an AV (Audio-Visual) stream file 261 and a clip information file 251.

The clip file 251 is a data file storing attribute information relating to the AV (Audio-Visual) stream file 261. The AV (Audio-Visual) stream file 261 includes MPEG-TS (Moving Picture Experts Group-Transport Stream) data having a data structure of multiplexed information including video, audio, and subtitle data, etc. Command information for controlling the reproducing device at the time contents are reproduced may also be multiplexed in the AV (Audio-Visual) stream file 261.

(B) The playback interval designation files (play lists) 230 have a plurality of playback interval designation files (play lists) 231, 232, 233. Each of the playback interval designation files (play lists) 231, 232, 233 is of such an arrangement that it selects either one of the AV stream data files included in the clips (contents data files) 240, and has at least one play item designating, as a playback start point and a playback end point, certain data of the selected AV stream data file. By selecting one playback interval designation file (play list), a playback sequence is determined and contents are reproduced according to the play items of the selected playback interval designation file (play list).

For example, if the playback interval designation file (play list) 231 is selected and contents are reproduced, a play item 234 associated with the playback interval designation file (play list) 231 has a playback start point "a" and a playback end point "b" in the clip 241, and a play item 235 has a playback start point "c" and a playback end point "d" in the clip 241. Therefore, if the playback interval designation file (play list) 231 is selected and contents are reproduced, certain data areas, "a" through "b" and "c" through "d", of the AV stream file 261 which is contents contained in the clip 241 are reproduced.

The applications 210 are established as layers having combinations of application index files 211, 212 and playback programs 221, 222, or combinations of application execution files 213, 214 and playback programs 223, 224. The application index files 211, 212 include contents titles presented on a display which reproduces contents. The application execution files 213, 214 include game contents and WEB contents. The user can determine an object to be reproduced by selecting a title included in the application index files 211, 212.

As shown in FIG. 2, each of the titles is associated with one of the playback programs (movie objects) 221 through 224. When the user selects one title, a playback process is started based on the playback program associated with the selected title. The application index files 211, 212 which are represented as titles 1, 2 in FIG. 2 include a title presentation program for displaying a title and a menu that are automatically reproduced when the information recording medium is set and activated.

The application index files 211, 212 and the application execution files 213, 214 occasionally include application resource files that are used when applications are executed. Various data files, e.g., that can be acquired from an information recording medium or a networked server, e.g., image files 225 such as JPEG, PNG, and BMP files, audio files 226 such as PCM and compressed audio files, and various data files 227 such as text and database files are occasionally applied as application resource files.

The playback programs (movie objects) 221 through 224 are contents playback processing programs for programmably providing functions necessary to present playback contents (HD movie contents). The functions include designating playback interval designation files (play lists), responding to manipulating information relative to a contents playback process input from the user, jumping between titles, and branching a playback sequence. The playback programs 221 through 224 can jump to each other. According to a user input or a preset program, a playback program to be actually executed is selected, and playback contents are selected from the clips 240 and reproduced by a playback interval designation file (play list) 230 that is designated by the selected playback program.

As shown in FIG. 2, the main contents 200 are managed in a layered arrangement according to the Blu-ray disc ROM standard format, as Blu-ray disc ROM standard data, for example. With respect to the framework of the layered arrangement, contents management units (CPS units) are established, and usage management of contents is performed for each of the contents management units (CPS units). Details of the contents management units (CPS units) will be described later on.

The information recording medium stores the subcontents 300 in addition to the main contents 200. The subcontents 300 are contents stored according to a certain AV format, e.g., an arbitrary format not in accordance with the Blu-ray disc ROM standard format.

The subcontents 300 are game programs, image files, audio data, and text data as service data, for example. Sets of data files are set as data groups in the subcontents 300.

FIG. 2 shows a data group 1, 311 through a data group N, 312. These data groups can also be established as usage management contents. When data groups are established as usage management contents, a content management unit (CPS unit) is established for each data group to perform usage management of each data group.

[3. Encryption and Usage Management Arrangement of Stored Contents]

A contents management arrangement for realizing different usage control for each of segmentalized contents stored in the information recording medium will be described below with reference to FIG. 3.

According to the present invention, a different key (unit key) for each of segmentalized contents is assigned as a basic arrangement for realizing different usage control for each of segmentalized contents. A unit to which one unit key is assigned is referred to as a contents management unit (CPS unit).

Each unit key is applied to encrypt the contents belonging to each unit. For using the contents, the key (unit key) assigned to each unit is acquired to reproduce the contents. Each unit key can individually be managed. For example, a unit key assigned to a certain unit A may be established as a key that can be acquired from the information recording medium, and a unit key assigned to a certain unit B may be established as a key that can be acquired by accessing a networked server and meeting such a condition that the user has carried out a predetermined procedure. In this manner, keys associated with respective units may be acquired and managed in independent manners for the respective unit keys.

The manner in which units to which one key is assigned, i.e., contents management units (CPS units), are set will be described below with reference to FIG. 3.

First, an arrangement for setting contents management units (CPS units) in the main contents 200 will be described below.

In the main contents 200, CPS units including application index files 211, 212 or application execution files 213, 214 including one or more titles contained in (A) the applications 210 are set.

A CPS unit 1, 401 shown in FIG. 3 is a single unit including application index files, playback program files, play lists, and a group of AV stream files as actual contents data.

A CPS unit 2, 402 is a single unit including application execution files, playback program files, play lists, and a group of AV stream files as actual contents data.

A CPS unit 3, 403 is a unit including application execution files, playback program files, and various data files that can be acquired from the information recording medium or a networked server.

These units are individually encrypted using the same key (CPS unit key: key Ku1, Ku2, Ku3 in FIG. 3) and stored in the information recording medium.

In FIG. 3, the contents management unit (CPS unit) 1, 401 and the contents management unit (CPS unit) 2, 402 are units which include (A) an application layer in the upper-level layer and (B) playback interval designation files (play lists)+(C) clips (contents data files) in the lower-level layer. The contents management unit (CPS unit) 3, 403 is a unit which does not include (B) playback interval designation files (play lists)+(C) clips (contents data files) in the lower-level layer, but includes (A) applications in the upper-level layer and various data files that can be acquired from the information recording medium or a networked server, i.e., image files 225, audio files 226, data files 227, etc.

The contents management unit (CPS unit) 1, 401 includes a title 1, 211, a title 2, 212, playback programs 221, 222, play lists 231, 232, a clip 241, and a clip 242. AV stream data files

261, 262 as actual contents data contained in these two clips 241, 242 are encrypted with the unit key Ku1 which is an encryption key set in association with the contents management unit (CPS unit) 1, 401.

The contents management unit (CPS unit) 2, 402 includes an application file 213 including game contents, WEB contents, etc., a playback program 223, a play list 233, and a clip 243. An AV stream data file 263 as actual contents data contained in the clip 243 is encrypted with the unit key Ku2 which is an encryption key set in association with the contents management unit (CPS unit) 2, 402. The application file 213 may be an encrypted file generated with the unit key Ku2.

The contents management unit (CPS unit) 3, 403 is established as a unit including application files 214, 215, a playback program 224, and various data files that can be acquired from the information recording medium or a networked server by the playback program 224. The application files 214, 215 are contained in (A) the application layer as the upper-level layer. The contents management unit 3, 403 includes image files 225 such as JPEG, PNG, and BMP files, audio files 226 such as PCM and compressed audio files, and various data files 227 such as text and database files.

The contents management unit (CPS unit) 3, 403 is encrypted with the unit key Ku3 which is an encryption key set in association with the contents management unit (CPS unit) 3, 403.

For example, for the user to reproduce an application file or contents corresponding to the contents management unit (CPS unit) 1, 401, it is necessary to acquire the unit key Ku1 which is an encryption key set in association with the contents management unit (CPS unit) 1, 401 and decrypt the application file or contents with the unit key Ku1. After the decrypting process is performed, the application program may be executed to reproduce the contents.

For example, for using an application file corresponding to the contents management unit (CPS unit) 3, 403 or image files 225, audio files 226 such as PCM and compressed audio files, and various data files 227 such as text and database files that correspond to the playback program 224, it is necessary to acquire the unit key Ku3 which is an encryption key set in association with the contents management unit (CPS unit) 3, 403 and decrypt the application file or contents with the unit key Ku3. After the decrypting process is performed, the application program is executed or the various files are executed.

Limitations posed on the above processing are that while a certain title is being reproduced, it is not possible to reproduce AV stream files that are not included in the CPS unit to which the title belongs. That is, a movie object executed during the reproduction of a title should not include a command for reproducing AV stream files that are not included in the CPS unit to which the title belongs. Movie objects can have a command for performing title switching. When title switching occurs due to a title jump command, the reproducing device determines that the title being reproduced is changed. Specifically, in FIG. 3, it is possible to execute a command for jumping to the title 2, 212 while the title 1, 211 is being reproduced. After the jump, the title 2, 212 is reproduced.

A play list can refer to a plurality of clips, but the clips that can be referred to are limited to those included in one CPS unit.

By setting these limitations, the unit key does not change while the titles belonging to one CPS unit are being reproduced. As a result, a seamless connection is easily achieved when AV streams are successively reproduced in the titles.

Since titles represent information that is visible to the user, they are advantageous in that it is easy to explain to the user and manage contents when keys are distributed and contents are managed with respect to respective CPS units.

When play lists are referred to while an application is being executed, as when titles are reproduced, a seamless connection is easily achieved while AV streams belonging to one CPS unit are being reproduced. As resource files used during the execution of an application file are encrypted with the same key, the encryption key (CPS unit key) is not changed during the execution of the application, allowing the decrypting process to be performed smoothly.

As described above, the information recording medium stores the subcontents 300 in addition to the main contents 200. The subcontents 300 represent game programs, image files, audio data, and text data as service data, and include a set of data files set as data groups. The subcontents 300 are stored as Blu-ray disc ROM nonstandard data according to an arbitrary format not in accordance with the Blu-ray disc ROM standard format.

The data groups in the subcontents 300 can also be established as usage management contents. If the data groups in the subcontents 300 are established as usage management contents, then the data groups are set as contents management units (CPS units), and usage management is performed for each of the data groups.

In the example shown in FIG. 3, the data group 1, 311 in the subcontents 300 is established as a contents management unit (CPS unit) 4, 404, and the data group N, 312 is established as a contents management unit (CPS unit) 5, 405.

Files contained in the contents management unit (CPS unit) 4, 404 are encrypted with a unit key Ku4 which is an encryption key set in association with the contents management unit (CPS unit) 4, 404.

For performing usage of programs and data included in the files corresponding to the contents management unit (CPS unit) 4, 404, it is necessary to acquire the unit key Ku4 which is an encryption key set in association with the contents management unit (CPS unit) 4, 404 and decrypt the programs and data.

Files contained in the contents management unit (CPS unit) 5, 405 are encrypted with a unit key Ku5 which is an encryption key set in association with the contents management unit (CPS unit) 5, 405.

For performing usage of programs and data included in the files corresponding to the contents management unit (CPS unit) 5, 405, it is necessary to acquire the unit key Ku5 which is an encryption key set in association with the contents management unit (CPS unit) 5, 405 and decrypt the programs and data.

Though not shown, there is a supervisory playback control program for performing supervisory control over the reproduction of contents. The supervisory playback control program performs supervisory control over the reproduction of contents.

The supervisory playback control program identifies a contents management unit (CPS unit) corresponding to contents that are instructed to be reproduced by the user, and performs a process of acquiring a CPS encryption key corresponding to the identified CPS management unit information. If the supervisory playback control program fails to acquire a CPS encryption key, then it displays a message indicative of a playback failure. The supervisory playback control program also detects switching to a contents management unit (CPS unit) in the event of a playback execution, and acquires a necessary key and displays a message indicative of a playback failure.

The supervisory playback control program performs a playback management process based on a unit arrangement and unit key management table shown in FIG. 4.

As shown in FIG. 4, the unit arrangement and unit key management table contains contents management units (CPS units) and unit key information in association with indexes, application files, or data groups in the application layer. The supervisory playback control program performs a playback management process based on the management table shown in FIG. 4.

The management table shown in FIG. 4 contains management data corresponding to main contents stored according to a certain AV format (e.g., the Blu-ray disc ROM standard data format), and management data corresponding to subcontents as stored contents different from the certain AV format, as a single management table. These management data may be arranged such that the management data corresponding to main contents and the management data corresponding to subcontents are separately managed. A specific management data file arrangement (directory arrangement) will be described later.

When the supervisory playback control program detects switching between contents management units (CPS units) based on switching between application indexes, the supervisory playback control program switches between keys to be applied due to the switching between contents management units (CPS units). Alternatively, the supervisory playback control program performs a process of displaying a message indicating that a unit key needs to be acquired.

For example, if a reproducing device which is performing a contents playback process stores the unit key Ku1 of the contents management unit (CPS unit) 1, 401 and also stores the unit key Ku2 of the contents management unit (CPS unit) 2, 402, then when the supervisory playback control program which performs supervisory control on the contents playback process detects switching between units of applications or switching between contents, the supervisory playback control program switches between unit keys depending on the switching between contents management units (CPS units), i.e., switches from Ku1 to Ku2.

If a reproducing device which is performing a contents playback process stores the unit key Ku1 of the contents management unit (CPS unit) 1, 401 and does not store the unit key Ku2 of the contents management unit (CPS unit) 2, 402, then when the supervisory playback control program which performs supervisory control on the contents playback process detects switching between units of applications or switching between contents, the supervisory playback control program performs a process of displaying a message indicating that a unit key needs to be acquired.

These processes are also performed upon unit switching between main contents, upon unit switching between subcontents, and also upon switching between main contents units and subcontents units. Depending on the detected unit switching, switching between unit keys Ku1 through Kun or the presentation of a key acquisition message is performed.

[4. First Playback and Menu Display Processing Arrangement]

The encryption and management arrangement of contents based on the storage format and contents management units (CPS units) of contents stored in the information recording medium has been described above with reference to FIGS. 2 through 4. Now, an arrangement having a first playback as playback contents to be activated when an information recording medium (disc) is loaded into the drive and a top menu as contents to be reproduced when a menu displaying function is activated will be described below with reference to FIGS. 5 through 7.

Figure 6:
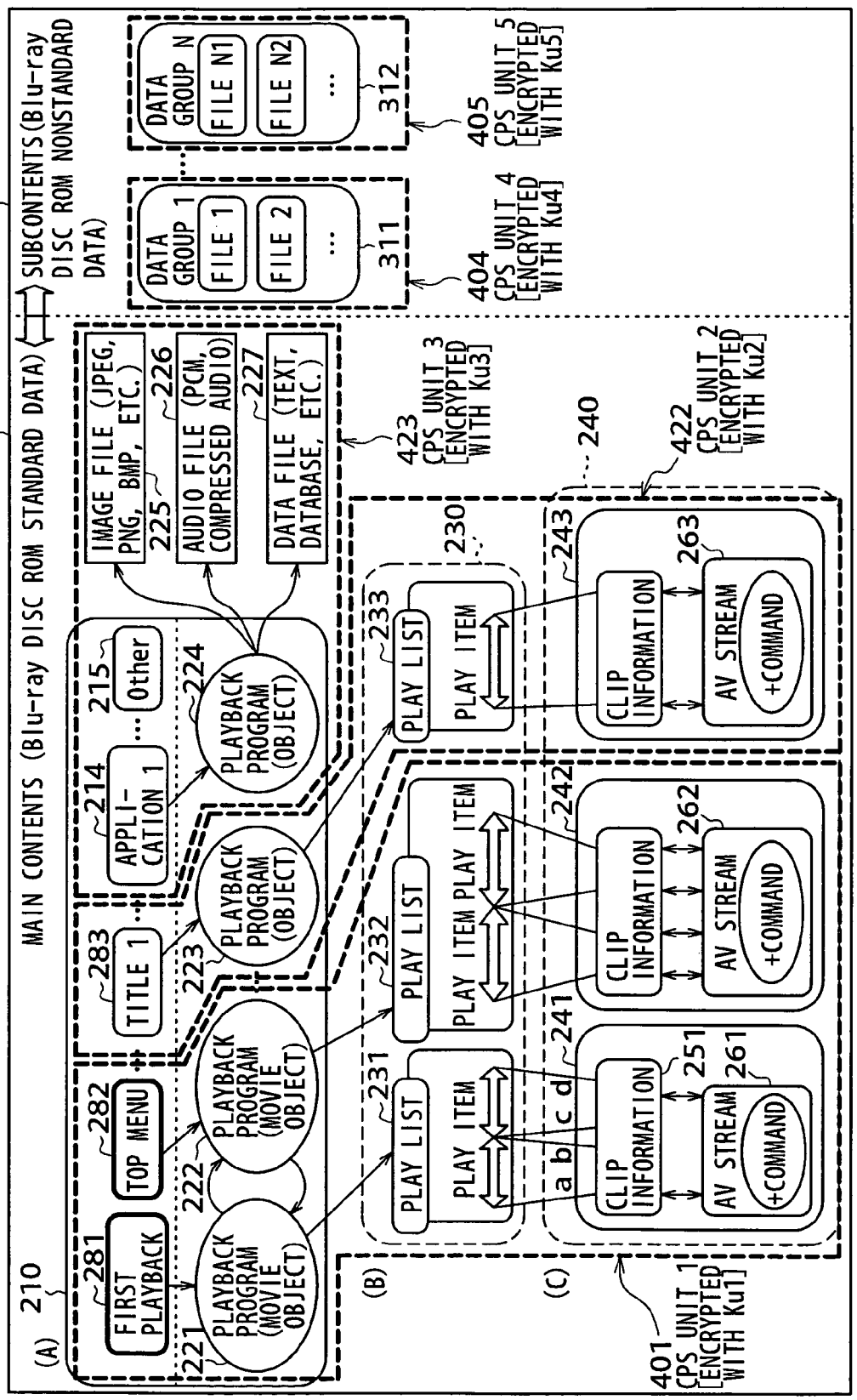
FIG. 6 is a diagram showing an example of contents management units set for a contents arrangement including first playback and top menu.

FIG. 5 shows a contents storage format in an arrangement having a first playback and a top menu, and FIG. 6 shows an example of encryption and contents management units (CPS units) set in the contents storage arrangement shown in FIG. 5.

As with FIG. 2 described above, the contents storage format shown in FIG. 5 is an arrangement which stores AV streams of moving image contents such as HD (High Definition) movie contents which include high-definition moving image data, for example, as the main contents 200, and also stores other data and programs, and game programs, image files, audio data, and text data as service data, for example, as the subcontents 300. Those details in FIG. 5 which are identical to those in FIG. 2 are denoted by identical reference characters.

In the arrangement shown in FIG. 5, the main contents 200 that are stored according to the Blu-ray disc ROM standard format store moving image contents (AV streams) as actual contents to be reproduced, and has a layered arrangement according to the Blu-ray disc ROM standard format. That is, the main contents 20 include:

(A) applications 210;
(B) playback interval designation files (play lists) 230; and
(C) clips (contents data files) 240.

(C) The clips (contents data files) 240 and (B) the playback interval designation files (play lists) 230 are identical to the arrangement described above with reference to FIG. 2.

In the arrangement shown in FIG. 5, (A) the applications 210 have a first playback 281 as index information for playback contents to be activated when an information recording medium (disc) is loaded into the drive and a top menu as contents 282 as index information for contents to be reproduced when a menu displaying function is activated. The first playback and the top menu are playback objects (contents) prescribed according to a BD-ROM AV application standard and having the same structure as the titles.

The first playback 281 represents indexes for indicating contents that are activated and reproduced when an information recording medium (disc) is loaded into the drive. The first playback 281 includes contents including the display of copyright information, for example, and reproduced according to a playback sequence inherent in studios and authoring companies to display the logos of the studios and the authoring companies which edit the contents. The top menu 282 represents indexes for indicating contents to be displayed when a menu display function is performed in the reproducing device.

Based on these indexes, a playback program corresponding to a specified index is activated, and the reproduction of a contents data file (AV stream) specified by a play list indicated by the playback program is performed. The playback procedure is the same as the playback process based on an index such as a title as described above with reference to FIG. 2.

An example of a contents management arrangement having contents associated with the first playback and contents associated with the top menu will be described below with reference to FIG. 6.

According to the present invention, as described above, a different key (unit key) for each of segmentalized contents is assigned as a basic arrangement for realizing different usage control for each of segmentalized contents. A unit to which one unit key is assigned is referred to as a contents management unit (CPS unit). In an arrangement having contents associated with the first playback and contents associated with the top menu, contents management units (CPS units) are associated with those contents for unit management.

Contents associated with the first playback and contents associated with the top menu are also encrypted by applying respective unit keys. For using those contents, keys (unit keys) assigned to the respective units are acquired to reproduce those contents.

In the example shown in FIG. 6, one unit containing contents associated with the first playback and contents associated with the top menu is illustrated. Specifically, in FIG. 6, a CPS unit 1, 421 is a contents management unit including those contents.

However, a CPS unit including only contents associated with the first playback and a CPS unit including only contents associated with the top menu may individually be established.

The CPS unit 1, 421 shown in FIG. 6 is a single unit including application index files containing a first playback index 281 and a top menu index 282, playback program files, play lists, and a group of AV stream files as actual contents data.

A CPS unit 2, 422 is a single unit including application execution files, playback program files, play lists, and a group of AV stream files as actual contents data.

A CPS unit 3, 423 is a unit including application execution files, playback program files, and various data files that can be acquired from the information recording medium or a networked server.

These units are individually encrypted using the same key (CPS unit key: key Ku1, Ku2, Ku3 in FIG. 3) and stored in the information recording medium.

The contents management unit (CPS unit) 1, 421 includes a first playback index 281, a top menu index 282, playback programs 221, 222, play lists 231, 232, a clip 241, and a clip 242. AV stream data files 261, 262 as actual contents data contained in these two clips 241, 242 are encrypted with the unit key: Ku1 which is an encryption key set in association with the contents management unit (CPS unit) 1, 421.

The contents management unit (CPS unit) 2, 422 includes a title 1, 283, a playback program 223, a play list 233, and a clip 243. An AV stream data file 263 as actual contents data contained in the clip 243 is encrypted with the unit key: Ku2 which is an encryption key set in association with the contents management unit (CPS unit) 2, 422.

The contents management unit (CPS unit) 3, 423 is established as a unit including application files 214, 215 contained in (A) the application layer as the upper-level layer, a playback program 224, and various data files that can be acquired from the information recording medium or a networked server by the playback program 224, i.e., image files 225 such as JPEG, PNG, and BMP files, audio files 226 such as PCM and compressed audio files, and various data files 227 such as text and database files.

The contents management unit (CPS unit) 3, 423 is encrypted with the unit key: Ku3 which is an encryption key set in association with the contents management unit (CPS unit) 3, 423.

For example, for the user to reproduce contents corresponding to the contents management unit (CPS unit) 1, 421, i.e., contents associated with the first playback index 281 and the top menu index 282, it is necessary to acquire the unit key: Ku1 which is an encryption key set in association with the contents management unit (CPS unit) 1, 421 and decrypt the contents with the unit key: Ku1. After the decrypting process is performed, the program may be executed to reproduce the contents.

As described above, the supervisory playback control program identifies a contents management unit (CPS unit) corresponding to playback contents, and performs a process of acquiring a CPS encryption key corresponding to the identified CPS management unit information. If the supervisory playback control program fails to acquire a CPS encryption key, then it displays a message indicative of a playback failure. The supervisory playback control program also detects switching to a contents management unit (CPS unit) in the event of a playback execution, and acquires a necessary key and displays a message indicative of a playback failure.

An example of the arrangement of a unit key management table in an arrangement wherein contents corresponding to a first playback as playback contents to be activated when an information recording medium (disc) is loaded into the drive and a top menu as contents to be reproduced when a menu displaying function is activated is illustrated in FIG. 7.

As shown in FIG. 7, the unit arrangement and unit key management table contains contents management units (CPS units) and unit key information in association with indexes, application files, or data groups in the application layer. The supervisory playback control program performs a management process based on the management table shown in FIG. 7.

The table arrangement shown in FIG. 4 corresponds to the CPS settings shown in FIG. 6. The contents management unit (CPS unit) is a unit containing contents corresponding to the first playback and the top menu, and is associated with the unit key Ku1. Different keys (Ku2 and so on) are associated with respective CPS units (CPS 2 and so on). For reproducing contents of each unit, it is necessary to perform a decryption process using a corresponding unit key.

As described above, when the supervisory playback control program detects switching between contents management units (CPS units) based on switching between application indexes, the supervisory playback control program switches between keys to be applied due to the switching between contents management units (CPS units). Alternatively, the supervisory playback control program performs a process of displaying a message indicating that a unit key needs to be acquired.

[5. Contents Usage Management Based on Network-Discrete and-bound States]

If an information recording medium storing contents that are segmentalized in contents management units and encrypted using unit keys as encryption keys for the respective units is loaded into a reproducing device as a device connected to a network such as a home network for reproducing and using the contents, an arrangement for performing contents usage management based on whether each of contents is in a state independent of a network or a state related to a network will be described below. The contents to be described below include both main contents and subcontents.

Figure 8:
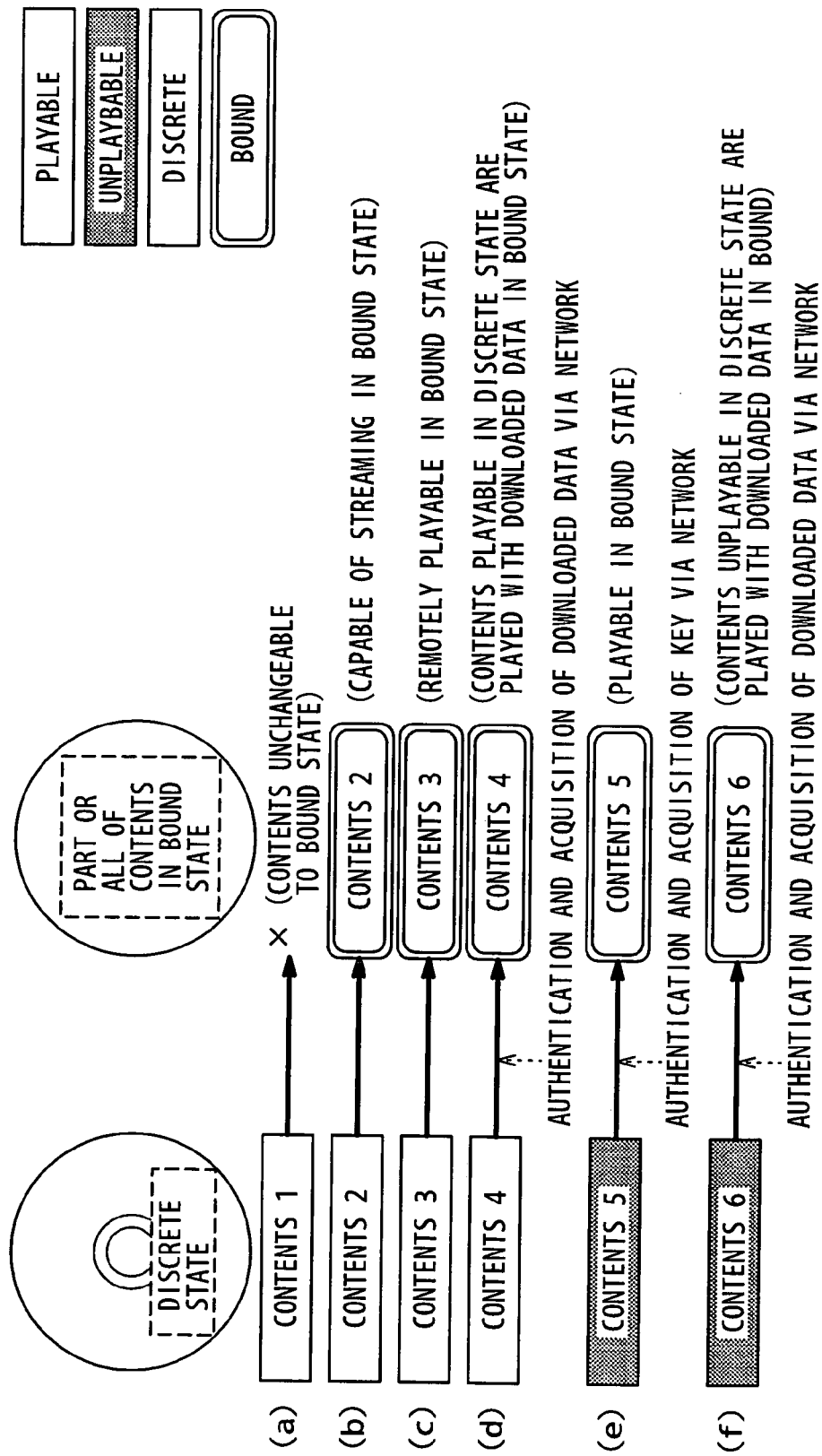
FIG. 8 is a diagram showing contents usage modes and contents usage limitations of contents in a network-discrete state and a network-bound state.

As shown in FIG. 8 at (A), two states, i.e., a state independent of a network (discrete state) and a state related to a network (bound state), are defined as states of contents management units (CPS units) on a recording medium.

If a plurality of contents (contents management units) are present on the recording medium, then it is managed which state each of the contents management units (CPS units) is in. Management information indicative of the discrete/bound state of each contents management unit (CPS unit) is recorded in an information recording medium, a reproducing device (information reproducing device) loaded with an information recording medium, or a management server on a home network which performs an information management process.

Contents 1 through 6 shown in FIG. 8 correspond respectively to contents management units (CPS units), and belong to main contents or subcontents.

A process of reproducing contents will be described below.

Contents that are segmentalized in contents management units (CPS units) stored on an information recording medium include contents that can be reproduced in the discrete state and contents that cannot be reproduced in the discrete state.

The contents 1 through 4 shown in FIG. 8 are contents that can be reproduced in the discrete state, and the contents 5, 6 are contents that cannot be reproduced in the discrete state.

Each of the contents (contents management units) on the recording medium can be brought into the bound state by a user's operation or a process in the reproducing device. There are also contents that are inhibited from being brought into the bound state, such as the contents 1 shown in FIG. 8 at (a).

The information about the discrete and bound states is determined as attributes of the contents (contents management units) stored in the information recording medium, and is stored in the information recording medium as attribute information corresponding to the respective contents management units.

With respect to each of the contents (contents management units), there are determined in advance processes that can be performed in the two states, i.e., (1) the discrete state; and
(2) the bound state.

The information about these processes is recorded as corresponding attribute-information of the contents (contents management units) in either the information recording medium or a management server holding management information.

Examples are contents (contents management units) shown in FIG. 8 at (a) through (f).

(a) Contents 1 are contents that can be reproduced in the discrete state, and are contents (contents management units) that cannot be changed to the bound state.

(b) Contents 2 are contents that can be reproduced in the discrete state, and are contents (contents management units) that can be reproduced in a streaming playback process using a network connection in the bound state. The streaming playback process is a contents playback process for sending data on a recording medium or digital data converted from data on a recording medium through a network, and decoding and displaying the data with a receiving device.

(c) Contents 3 are contents that can be reproduced in the discrete state, and are contents (contents management units) that can be reproduced in a remote playback process using a network connection in the bound state. The remote playback process is a contents playback process wherein a transmitting device performs a process including a response to a user's operation such as in interactive contents of DVD-Video and sends only video data to be displayed on a screen and audio data to be reproduced in a data format that can be displayed by a receiving device. In the remote playback process, user's operation commands need to be received by the receiving device and sent through the network to the reproducing device which is sending the data.

(d) Contents 4 are contents that can be reproduced in the discrete state, and are contents (contents management units) that are reproduced as a combination of contents on a recording medium and data downloaded through a network in the bound state.

The downloaded data are assumed to be subtitles in languages, audio data, and menu image data that are not stored on the recording medium, and a latest version of data that are used upon contents playback. The contents 4 are contents that can be reproduced in the discrete state in combination with the downloaded data in the bound state.

(e) Contents 5 are contents that cannot be reproduced in the discrete state, and are contents (contents management units) that can be reproduced only in the bound state.

A necessary key, i.e., a unit key corresponding to contents management units defined as the contents 5, can be acquired through a network for reproducing the contents. By allowing contents to be reproduced under the condition of the acquisition of a unit key, it is possible to provide a service to charge and sell key information when contents that cannot be reproduced in the discrete state are distributed, sold, and reproduced.

(f) Contents 6 are contents that cannot be reproduced in the discrete state, and are contents (contents management units) that can be reproduced only in the bound state, and also are contents (contents management units) that can be reproduced as a combination of contents on a recording medium and data downloaded through a network in the bound state.

The (d) contents 4 through the (f) contents 6 require that a network connection be made and downloaded data or a unit key be acquired. As preconditions for acquiring those data, an authentication process is performed to confirm that a data request is made from a proper device or user, and downloaded data and a unit key are provided the server if the authentication process is successful. The data transferred through the network are encrypted and provided to the user device. These processing details will be described later.

[6. Contents Copy Management in Network]

If an information recording medium storing contents that are segmentalized in contents management units and encrypted using unit keys as encryption keys for the respective units is loaded into a reproducing device as a device connected to a network such as a home network for reproducing and using the contents, an arrangement for performing contents copy management based on whether each of contents is in a state independent of a network or a state related to a network will be described below. The contents to be described below include both main contents and subcontents.

Figure 9:
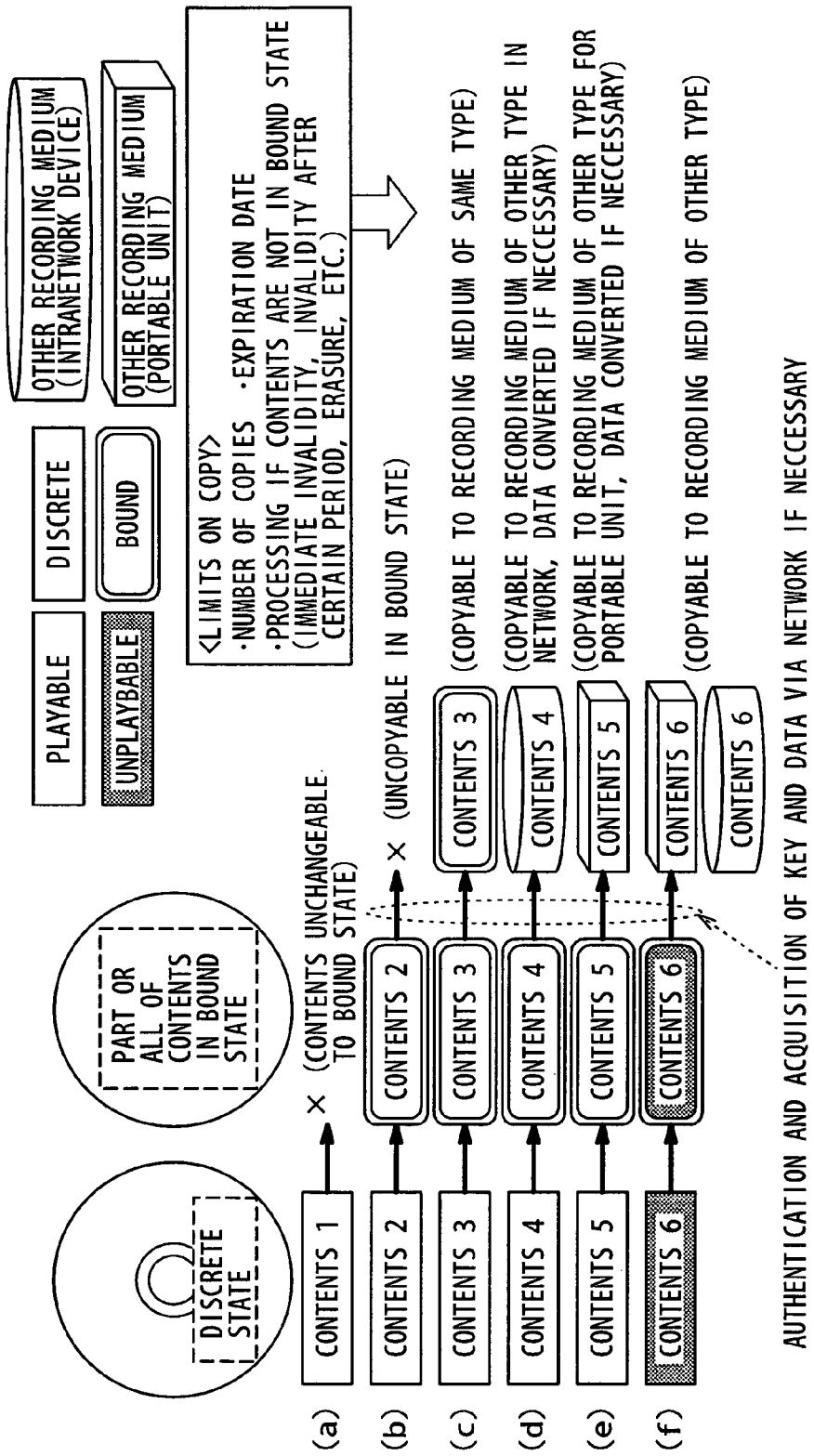
FIG. 9 is a diagram showing contents copy limitations of contents in a network-discrete state and a network-bound state.

As shown in FIG. 9 at (A), two states, i.e., a state independent of a network (discrete state) and a state related to a network (bound state), are defined as states of contents management units (CPS units) on a recording medium.

If a plurality of contents (contents management units) are present on the recording medium, then it is managed which state each of the contents management units (CPS units) is in. Management information indicative of the discrete/bound state of each contents management unit (CPS unit) is recorded in an information recording medium, a reproducing device (information reproducing device) loaded with an information recording medium, or a management server on a home network which performs an information management process.

Contents 1 through 6 shown in FIG. 9 correspond respectively to contents management units (CPS units). Each of the contents (contents management units) on the recording medium can be brought into the bound state by a user's operation or a process in the reproducing device. There are also contents that are inhibited from being brought into the bound state, such as the contents 1 shown in FIG. 9 at (a).

The information about the discrete and bound states is determined as attributes of the contents (contents management units) stored in the information recording medium, and is stored in the information recording medium or a management server storing management information, as attribute information corresponding to the respective contents management units.

With respect to each of the contents (contents management units), there are determined in advance copying processes that can be performed in the two states, i.e., (1) the discrete state; and
(2) the bound state.

The information about these copying processes is recorded as corresponding attribute information of the contents (contents management units) in either the information recording medium or the management server holding management information.

Examples are contents (contents management units) shown in FIG. 9 at (a) through (f).

(a) Contents 1 are contents that can be reproduced in the discrete state, and are contents (contents management units) that cannot be changed to the bound state.

(b) Contents 2 are contents that can be reproduced in the discrete state, and are contents (contents management units) that can be reproduced, but cannot be copied in the bound state.

(c) Contents 3 are contents that can be reproduced in the discrete state, and are contents (contents management units) that can also be reproduced in the bound state, and are also contents (contents management units) that can be copied to a recording medium which is of the same type as the copy source only in the bound state.

Copy destinations are assumed to be three objects, i.e.,
a recording medium which is of the same type as the copy source,
a different recording medium (in the network), and
a portable unit.

The contents 3 are contents that are allowed to be copied only to a recording medium which is of the same type as the copy source. Only if the copy destination is confirmed to be a recording medium which is of the same type as the copy source, the copy source can send the data on the recording medium to the copy destination.

(d) Contents 4 are contents that can be reproduced in the discrete state, and are contents (contents management units) that can be reproduced in the bound state, and also are contents (contents management units) that are allowed to be copied to a recording medium which is of a different type from the copy source only in the bound state.

The contents 4 are allowed to be copied to a recording medium which is of a different type from the copy source. If necessary, the device of the copy source or the copy destination needs to convert the data and record the copy data.

(e) Contents 5 are contents that cannot be reproduced in the discrete state, and are contents (contents management units) that can also be reproduced in the bound state, and also are contents (contents management units) that are allowed to be copied to a portable unit only in the bound state. The portable unit may be taken out of a home network, and copy management therefor needs to be performed in view of a possible takeout of the portable unit.

Limitations on copy need to be prescribed for the number of copies, an expiration date, and a process to be performed when an original recording medium is no longer in the bound state. These items of information should preferably be prescribed separately for the above three copying patterns. The process to be performed when an original recording medium is no longer in the bound state is assumed to invalidate the copy data, invalidate the copy data after a certain period of time, and erase the copy data. Any data that are not erased can be used as they are when the recording medium is back in the bound state again. Therefore, when the recording medium is rented to a friend, the copy data may be inhibited temporarily from usage, and when the recording medium is returned, the copy data may be used again.

(f) Contents 6 are contents that cannot be reproduced in the discrete state, and are contents (contents management units) that can be reproduced only in the bound state, and also are contents (contents management units) whose copy data are stored in advance in a recording medium for being copied through a home network.

The copy data may be of a type that cannot be reproduced on the device of copy source, and may be of an arrangement that can be reproduced as a result of being copied to another device. For example, copy data having the same contents may be stored in a data format (e.g., a file type such as AVI or the like or an MPEG-PS format that can be reproduced by a personal computer) that can be reproduced by general networked devices, in a recording medium which stores data in a plurality of layered formats described above with reference to FIGS. 2 and 3, and for copying the copy data through a network, the copy data are sent for reproduction on those general networked devices.

Prior to copying contents, it is preferable to perform authentication and key acquisition through a network. Furthermore, a system which charges for each copy and needs a key for copying should preferably be of a contents management arrangement for limiting the number of copies based on the number of times that a key is distributed.

[7. Management Information for Contents Management Units]

Management information for contents management units in an information recording medium which stores contents that are segmentalized in the above contents management units and encrypted using unit keys as encryption keys for the respective units will be described below. The contents to be described below include both main contents and subcontents.

As described above, one unit key is established in association with a contents management unit (CPS unit). A contents management unit (CPS unit) and key management table is established as the unit key information management table [unit arrangement and unit key management table] as shown in FIG. 4.

As attribute information associated with contents management units (CPS units), there is available state information indicative of whether each of the contents management units (CPS units) is in:

a. the discrete state; or
b. the bound state.

In an information recording medium that is incapable of writing data therein, only the above state information is described in its initial state.

In an information recording medium that is capable of writing data therein, two items of information, i.e., an initial state and a current state, are recorded. The current state information is written on the information recording medium by an information processing device as a reproducing device loaded with the information recording medium or a networked server.

FIG. 10 shows an example of the arrangement of "state management table" of initial states and current states that are recorded in an information recording medium that is capable of writing data therein. The table describes whether each of the initial states and the current states of contents management units (CPS units) is in the discrete state or the bound state.

The state management table shown in FIG. 10 is recorded in the information recording medium and also in an external device such as an information processing device as a reproducing device loaded with the information recording medium or a networked server.

In an information recording medium that is incapable of writing data therein, only initial state data are recorded. The external device such as an information processing device as a reproducing device loaded with the information recording medium or a networked server has a state management table of initial states and current states that are recorded.

The initial states established in the state management table include the following four states:
a. discrete only;
b. discrete initially;
c. bound only; and
d. bound initially.

The state "a. discretely only" represents contents (contents management units) that are allowed only in the discrete state, and cannot be changed to the bound state.

The state "b. discrete initially" represents contents (contents management units) that are initially in the discrete state, but can be changed to the bound state.

The state "c. bound only" represents contents (contents management units) that are allowed only in the bound state, and cannot be changed to the discrete state.

The state "b. bound initially" represents contents (contents management units) that are initially in the bound state, but can be changed to the discrete state.

The contents (contents management units) that are initially in the bound state assume that the contents are distributed in relation to information on the network. For example, these contents are based on the premise that they will be reproduced in combination with information on the network.

The current state is established as either the discrete state or the bound state.

The current state can be established for each contents management unit. There are available two state management processes for performing usage management of contents. According to the first process, the contents are always reset to the initial state when the recording medium is taken out of the home network.

For example, if a contents storage recording medium includes a removable medium that can be removed from the reproducing device, then each of the contents is reset to the initial state at the time the removable medium is removed from the reproducing device. At this time, the state management table stored outside the recording medium is also initialized.

According to the second process, the state of the recording medium is registered in an external management server. In this case, the state management table stored outside the recording medium does not need to be initialized when the removable medium is removed from the reproducing device.

When a removable medium which stores contents set to the bound state in a reproducing device connected to a home network (A) is loaded into a reproducing device connected to a home network (B) that is constructed in another home, for example, and the contents are to be set to the bound state, then the management server detects, based on the state management table, that the contents set to the bound state in the home network (A) are about to be redundantly set to the bound state in the home network (B), and does not permit the contents to be set to the bound state in the home network (B).

The above management process is effective to prevent the same contents from being used as a plurality of contents in parallel.

The state management table as shown in FIG. 10 may be held by the management server or the like to allow the current state to be referred to even when the removable medium is removed from the reproducing device and also to allow usage management of the contents to be performed based on the current state thus referred to.

If the information recording medium is a recordable medium and records the current state, then since the current state is recorded on the recording medium, the current state can directly be read from the recording medium without confirming whether the contents are in the bound state or not through the server, and usage management of the contents can be performed based on the read current state.

ROM mediums which inhibit data from being additionally recorded in a normal data area thereof should preferably have a partly recordable area therein for recording the above state management information. ROM mediums of such an arrangement should preferably be used.

Alternatively, it may be preferable to use optical disc mediums that are additionally recordable, cartridge mediums having IC memories, etc.

The state management table shown in FIG. 10 may be integrally combined with or may be independent of the table [unit arrangement and unit key management table] of contents management units (CPS units) and unit keys as shown in FIG. 4.

The management information corresponding to the contents management units further includes information as to reproduction and usage limitation of contents when the contents are in the discrete state, and information as to reproduction and usage limitation of contents when the contents are in the bound state.

These contents management information is described as attribute information corresponding to the contents in the information recording medium, or recorded in the management server which performs a contents management process. For those contents which are allowed to be used only in the bound state, it is possible to employ a contents usage management arrangement based on only the contents management information recorded in the management server.

An example of data of the contents management information will be described below with reference to FIG. 11. FIG. 11 shows an example of the arrangement of contents usage management information recorded as fixed-length data, i.e., a contents playback and copy control information management table. The contents playback and copy control information management table is established as an information table of data of each CPS unit or data of all CPS units.

The contents playback and copy control information management table shown in FIG. 11 includes control information relative to usage and copying of contents in the form of fixed-length data, such as contents management information depending on the state of contents, i.e., whether contents are in the discrete state or the bound state.

In view of the usage of contents in the home network, the setting of the contents management information of the fixed length as shown in FIG. 11 is preferable. The management information in the discrete state represents, for example, whether contents can be reproduced in the discrete state or not. For contents that cannot be reproduced in the discrete state, a process of reproducing the contents is described. For example, the connection to a key distribution server, the need for an acquisition of key data distributed in another medium (memory card or the like), and information such as an URL or a telephone number for specifying a server, or an index value to a list storing such information is described.

The management information in the bound state represents whether or not copying, streaming, and remote playback within a network are possible, the number of copies and expiration date for each of the types of devices in question, whether or not copying/streaming data are present, a data conversion process, and the handling of copy data if the contents are no longer in the bound state.

Since FIG. 11 assumes that part or all of the above information is stored in a fixed-length field, data made up of a large number of characters such as the URL and data position (path information) are stored in another file, and an index to a list stored in the other file is stored in the fixed-length field.

To make it possible to acquire playback operation control information from a server, rather than using playback control information on the recording medium, and to operate according to the acquired playback operation control information, as indicated by a contents management information arrangement 501 in FIG. 11, a flag indicative of the acquisition from the server and information indicative of how to access the server may be stored.

By setting the above information as the contents management information, it is possible to perform a complex control process that cannot be expressed by fixed-length data and to change a control process after the recording medium is sold.

FIG. 12 shows an example of the arrangement of contents usage management information established for each CPS unit, i.e., a contents playback and copy control information management table of contents playback and copy control information recorded as variable-length data.

Details of established information are the same as those shown in FIG. 11. Since variable-length information can be included, data made up of a large number of characters such as the URL and data position (path information) can directly be described in the contents management information. Since the information is of a loop structure and a type (CCI_and_other_info_type in FIG. 12) is defined for each type of contents management information, a new copy control process that is subsequently added can easily be handled by defining a type and information (CCI_and_other_info_value and Additional_info in FIG. 12) ancillary thereto. Unknown types of devices that were sold in the past may not be processed.

It is possible to establish a structure wherein contents management information relative to the discrete state and the bound state is not divided, as shown in FIG. 12 at (A), and a structure wherein loops of contents management information are provided for the respective two states, as shown in FIG. 12 at (B).

To make it possible to acquire playback operation control information from a server, rather than using playback control information on the recording medium, and to operate according to the acquired playback operation control information, as indicated by a contents management information arrangement 502 in FIG. 12, a flag indicative of the acquisition from the server and information indicative of how to access the server may be stored.

By setting the above information as the contents management information, it is possible to perform a complex control process that cannot be expressed by fixed-length data and to change a control process after the recording medium is sold.

By establishing user definition information 503 in the contents playback and copy control information management table as shown in FIG. 12 and setting the type of user-definable control information as the user definition information 503, it is possible to realize a control process beyond the range of standards belonging to the recording medium and a control process that can freely be defined by the contents distributor, for performing contents playback control corresponding to individual users, e.g., distinguishing between certain membership users and nonmembership users and allowing only the membership users to reproduce contents, or establishing the definition of copy control information (CCI) not depending on the recording medium standard.

A usage example of copy control information (CCI) based on the user definition is, for example, to establish the definition of copy control information (CCI) not depending on the recording medium standard.

Parameters of the copy control information (CCI) are determined by standards for each particular recording system (DVD standards or the like). Once reproducing devices compatible with such recording system become widely used, it is difficult to expand the copy control information (CCI).

Therefore, optional control information which is not available as the copy control information (CCI) determined by the recording system is established as user definition information, and the contents owner or administrator establishes unique copy control information (CCI).

Since copy control information (CCI) that is uniquely established by the contents owner or administrator cannot be interpreted by standards-compliant reproducing devices, an application (e.g., Java) for interpreting copy control information (CCI) is made available from the recording medium or an external source such as a server or the like. By executing the application that is acquired, it is possible for the reproducing device to interpret uniquely defined copy control information (CCI) and control operation according to the CCI.

[8. Storage arrangement of main contents, subcontents, and contents]

A storage arrangement of main contents, subcontents, and contents will be described below.

An example of a directory arrangement for storing various contents management units (CPS units) described above and various management information, and a storage area for the management information will be described below with reference to FIG. 13. A BDMV directory is a directory for storing application files in the Blu-ray Disc ROM format.

Figure 13:
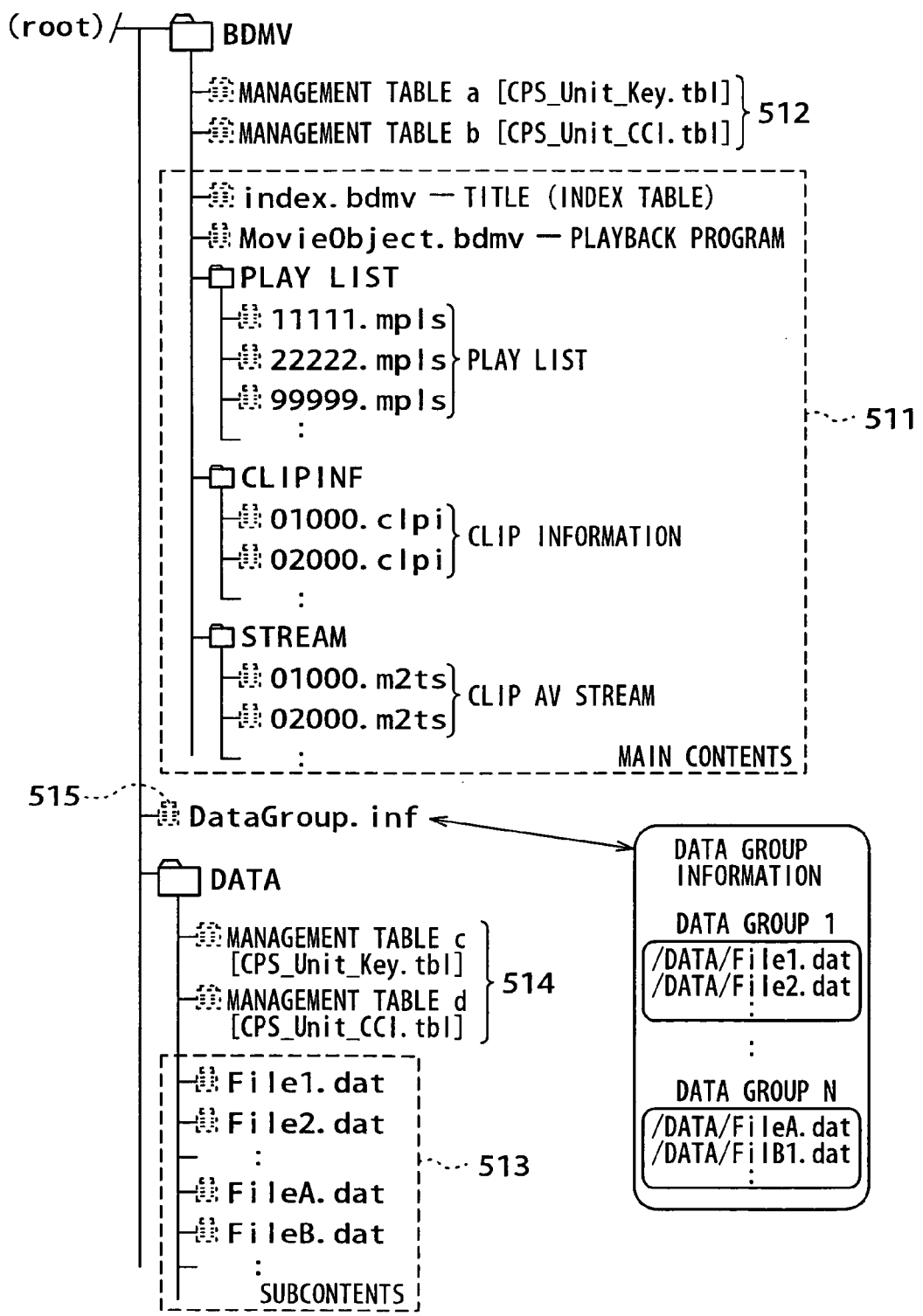
FIG. 13 is a diagram showing an example (example 1) of the arrangement of a data storage directory in the information recording medium.

In the directory arrangement shown in FIG. 13, main contents data area 511 is a directory storing data files of main contents in a plurality of layered arrangements according to the certain AV format described above with reference to FIGS. 2 and 3, i.e., contents according to the certain AV format (Blu-ray Disc ROM format) having a layered arrangement of applications, play lists, clips, etc., and also storing programs.

These data files are stored in a user data area of the information recording medium. AV streams included in the clips are data files encrypted by unit keys that are established for respective contents management units (CPS units).

A main contents management data area 512 stores management files corresponding to the main contents. The main contents management data area 512 stores data files of tables, i.e., a table managing a contents management unit (CPS unit) arrangement and unit keys as shown in FIG. 4, i.e., the [unit arrangement and unit key management table], the [state management table] managing the discrete states and the bound states for the respective contents management units described above with reference to FIG. 10, and the [contents playback and copy control information management table] storing usage of contents and copy control information in the states described above with reference to FIGS. 11 and 12. These tables are stored as either individual data files or data files including a combination of tables.

A subcontents data area 513 is a directory storing contents that do not belong to the main contents, i.e. contents not in accordance with the particular AV format [Blu-ray Disc ROM format], i.e., contents belonging to the data groups shown in FIGS. 2 and 3. These data files are also stored in the user data area of the information recording medium. Contents belonging to the subcontents data area 513 may include both contents established as contents management units (CPS units) and contents not established as contents management units (CPS units). The contents established as contents management units (CPS units) become data files encrypted with unit keys.

A subcontents management data area 514 stores management files corresponding to subcontents. The subcontents management data area 514 stores data files of tables, i.e., a table managing a contents management unit (CPS unit) arrangement and unit keys as shown in FIG. 4, i.e., the [unit arrangement and unit key management table], the [state management table] managing the discrete states and the bound states for the respective contents management units described above with reference to FIG. 10, and the [contents playback and copy control information management table] storing usage of contents and copy control information in the states described above with reference to FIGS. 11 and 12.

Data group information 515 represents files storing data group information of subcontents. As shown in FIG. 13, paths of data files belonging to data groups 1 through N are registered. For opening subcontents, the data group information 515 is opened first to acquire the information of a group to which the desired contents belong, and then a data file can be specified based on the acquired information.

If a group is established as a contents management unit (CPS unit), it is encrypted with a unit key associated with each data group. If a data file belonging to a group established as a contents management unit (CPS unit) is to be used, then it is necessary to acquire a unit key and decrypt the data file with the unit key. These items of information can be acquired from management files stored in the subcontents management data area 514.

The subcontents data area 513 shown in FIG. 13 is of an arrangement including a mixture of files belonging to all data groups. As with a subcontents data area 521 shown in FIG. 14, for example, the subcontents data area 513 may have folders for data groups and may have an arrangement of files such as data belonging to data groups and arranged under each of the data groups.

Figure 14:
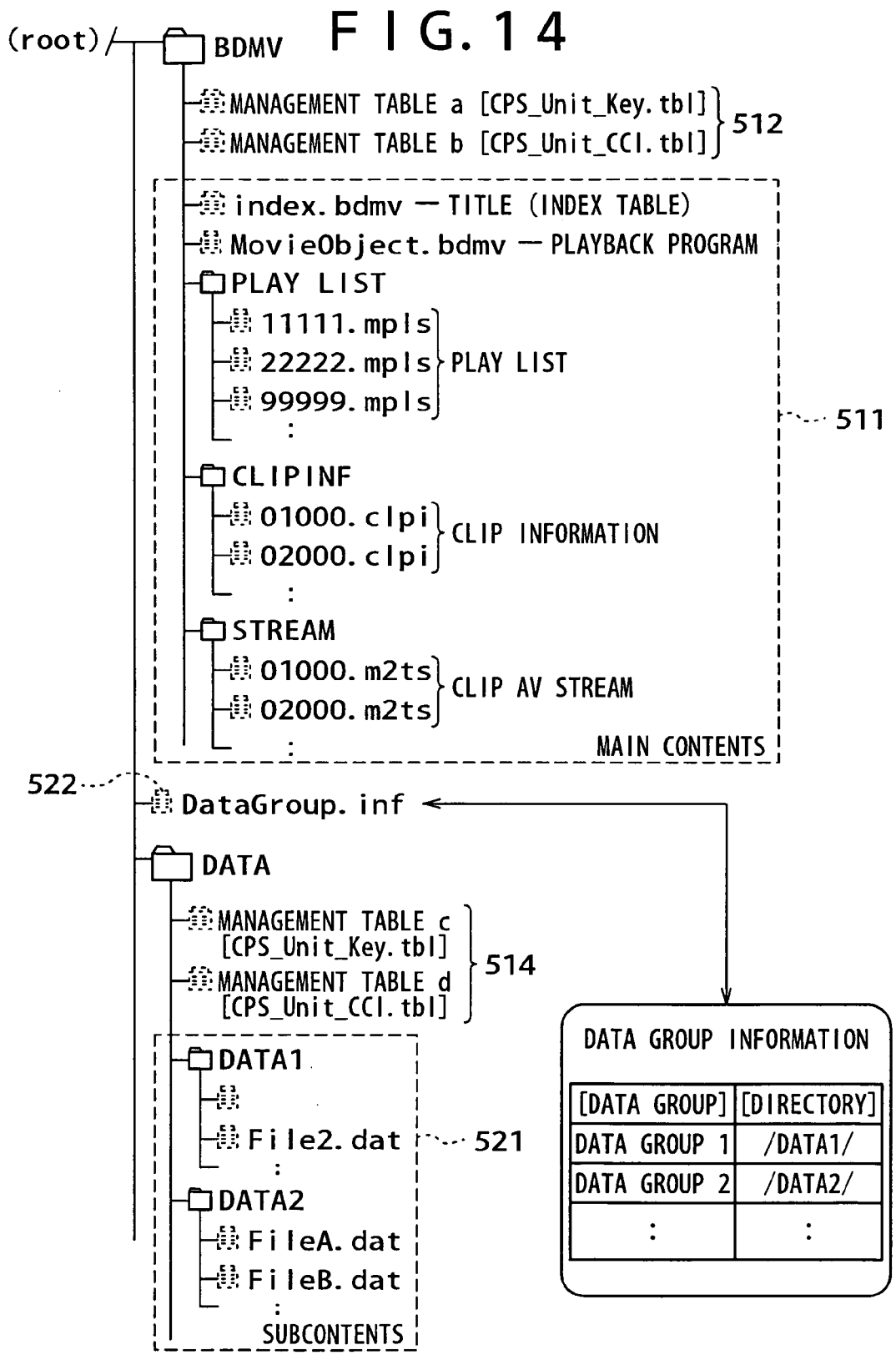
FIG. 14 is a diagram showing an example (example 2) of the arrangement of a data storage directory in the information recording medium.

In an arrangement shown in FIG. 14, data group information 522 is arranged as data representing directory names (folder names) corresponding to respective data groups. For opening subcontents, the data group information 522 is opened first to acquire a directory name as the information of a group to which desired contents belong, and the data file is acquired based on the acquired information.

With the data storage arrangements shown in FIGS. 13 and 14, management information corresponding main contents and management information corresponding subcontents are established separately from each other. However, as shown in FIG. 15, for example, these management information may be established as files directly connected to routes, so that all the management information corresponding to main contents and subcontents may be managed altogether.

Figure 15:
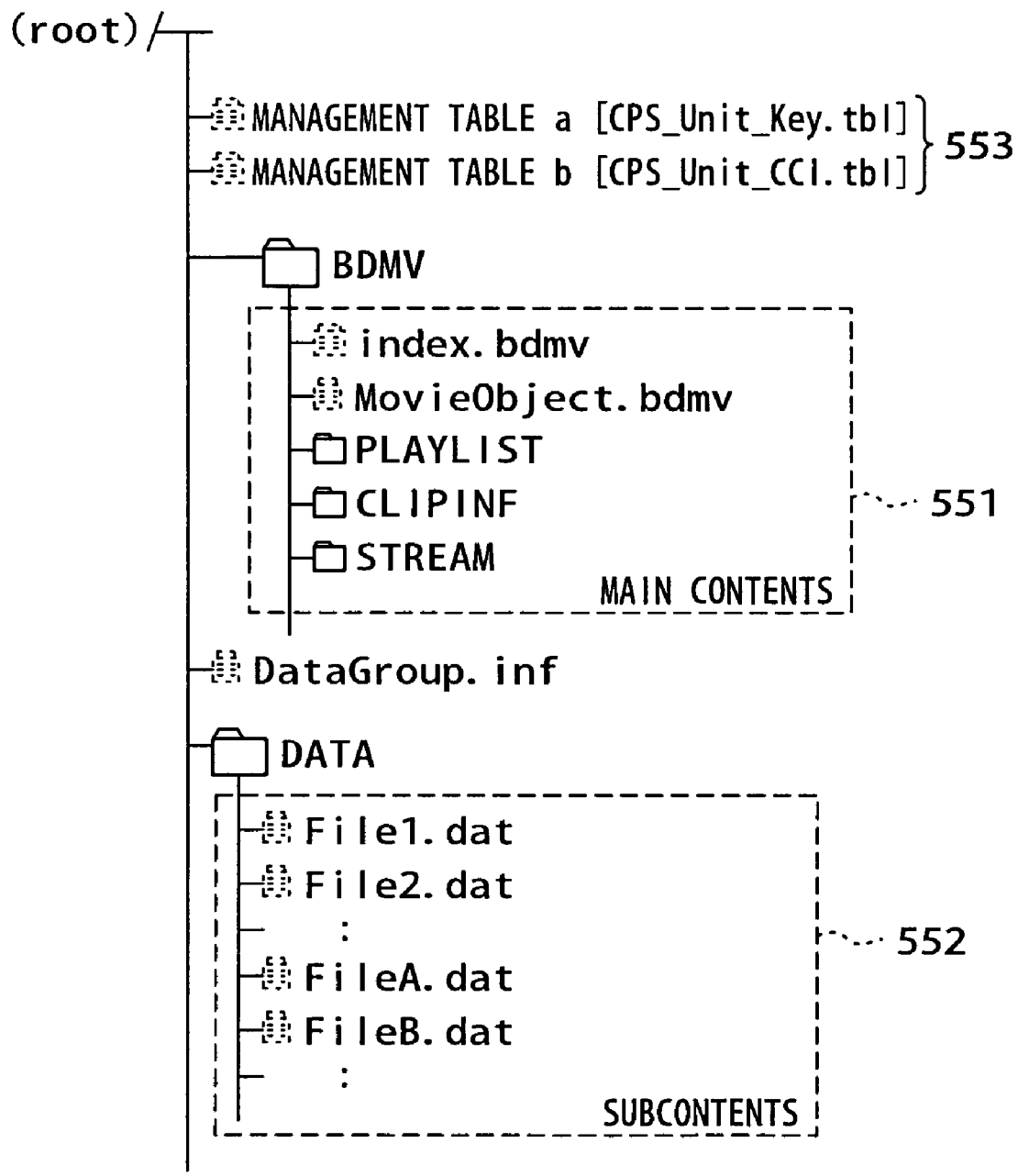
FIG. 15 is a diagram showing an example (example 3) of the arrangement of a data storage directory in the information recording medium.

The directory arrangement shown in FIG. 15 contains a main contents data area 551, a subcontents data area 552, and a contents management data area 553 corresponding to main contents and subcontents.

The contents management data area 553 stores management files corresponding to both main contents and subcontents. The contents management data area 553 stores data files of tables, i.e., a table managing a contents management unit (CPS unit) arrangement and unit keys as shown in FIG. 4, i.e., the [unit arrangement and unit key management table], the [state management table] managing the discrete states and the bound states for the respective contents management units described above with reference to FIG. 10, and the [contents playback and copy control information management table] storing usage of contents and copy control information in the states described above with reference to FIGS. 11 and 12.

There are various storage patterns for main contents management data, subcontents management data, and contents management data including both of them.

Figure 16:
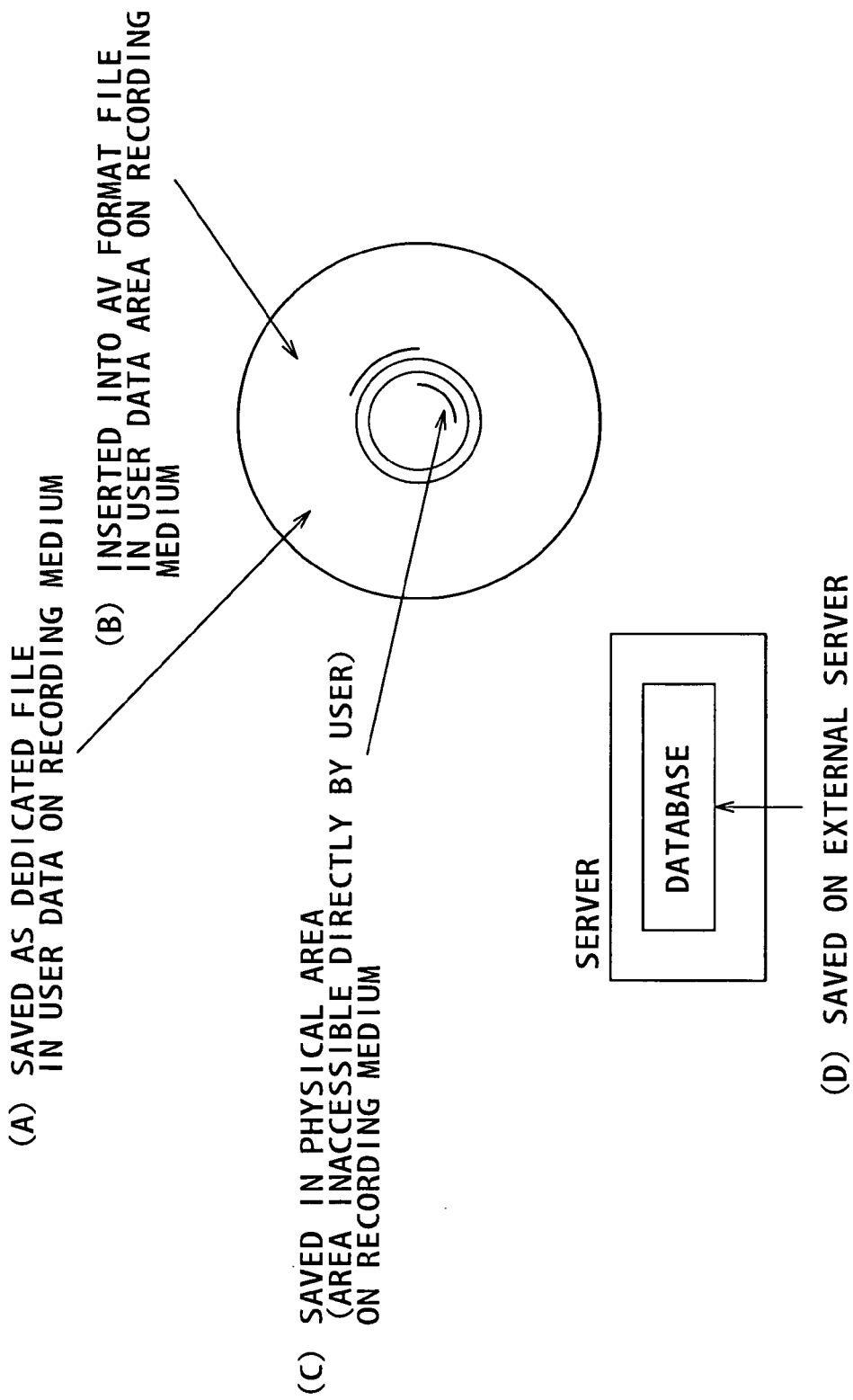
FIG. 16 is a diagram showing the manner in which management information is stored.

FIG. 16 shows an example of a storage arrangement for those management data. The management data are stored in one of patterns described below.

(A) The management data are saved as a dedicated file in a user data area of the recording medium.

(B) the management data are inserted in an AV format file in a user data area of the recording medium. For example, management table data are inserted and stored in a title, index data file or an AV format file such as a play list or the like.

(C) the management data are stored in a physical area of the recording medium, i.e., an area that cannot directly be accessed by the user.

(D) the management data are saved in an external server.

The management data are stored in either one of the above patterns (A) through (D).

The [unit arrangement and unit key management table], the [state management table], and the [contents playback and copy control information management table] have been described above as specific examples of management data. All of these tables may not necessarily be stored in one pattern, but may be stored in respective different patterns.

According to the above pattern (C), the above three types of information are saved in an area that cannot directly be accessed by the user, such as a lead-in area of the recording medium. According to the above pattern (D), the above three types of information are saved in an external server, rather than the recording medium. In this case, the reproducing device needs to acquire information corresponding to the three tables from the external surface before the recording medium is played back.

[9. Encryption and Falsification Prevention Processing Arrangements for Contents Usage Control Information]

Encryption and falsification prevention processing arrangements for contents usage control information will be described below.

First, a summary of a plurality of arrangements will be described below in (9-1), and details of one specific processing arrangement will be described below in (9-2).

(9-1) Summary of encryption and falsification prevention processing arrangements for contents usage control information.

First, a summary of encryption and falsification prevention processing arrangements for contents usage control information will be described below. The contents usage control information corresponding to contents which correspond to the respective CPS units described above with reference to FIGS. 11 and 12, i.e., the [contents playback and copy control information management table] storing usage of contents and copy control information, should preferably be processed for antifalsification, and encrypted and stored.

A process for preventing falsification of playback/copy control information and a process of encrypting playback/copy control information will be described below with reference to FIG. 17.

Figure 17:
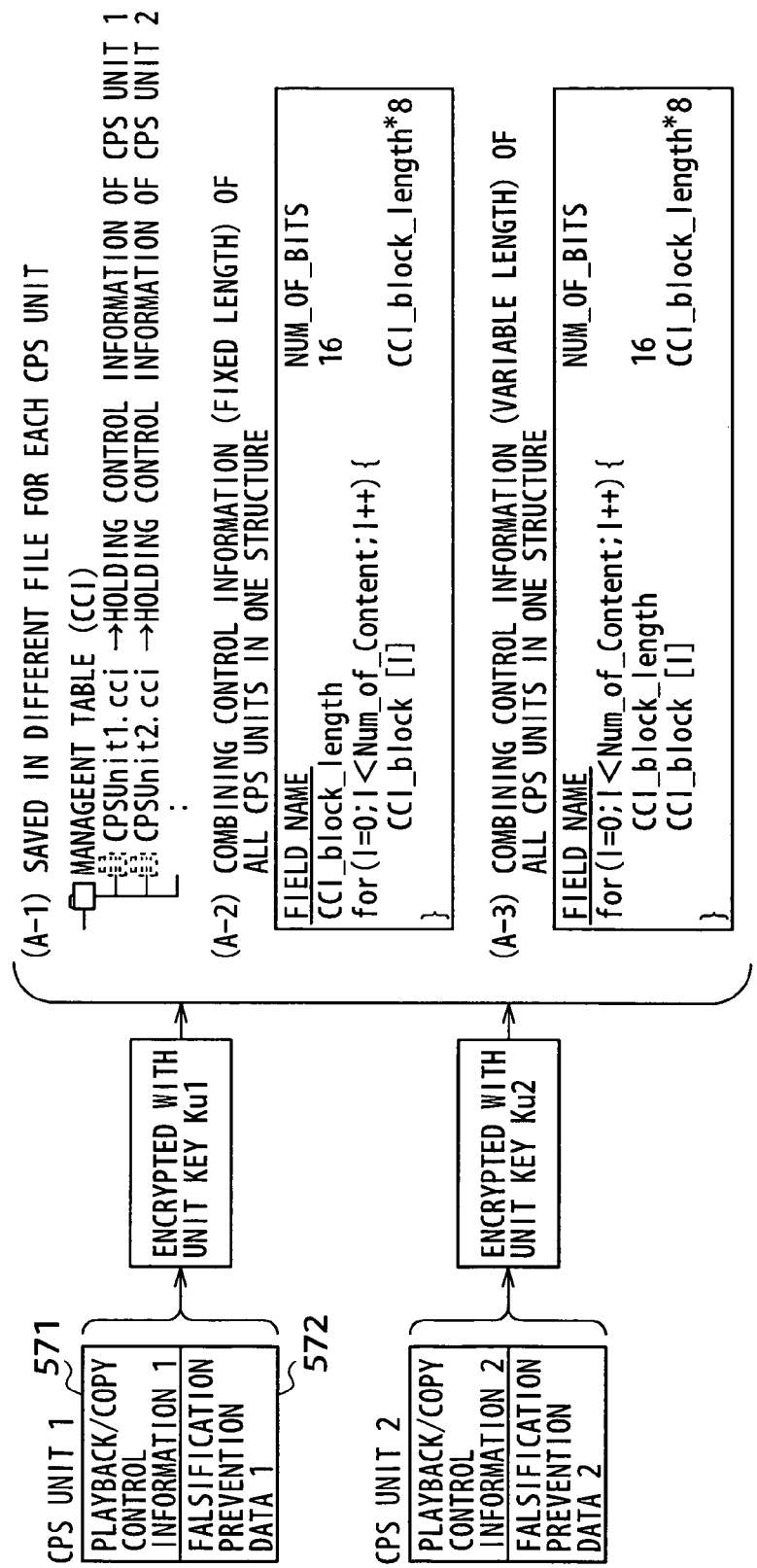
FIG. 17 is a diagram showing a falsification prevention and encryption arrangement for playback/copy control information.

As shown in FIG. 17, playback/copy control information is combined with falsification verification data added thereto, and then encrypted and stored.

For example, falsification verification data 1, 572 are established for playback/copy control information 1, 571 corresponding to the CPS unit 1. The falsification verification data may be established as hash data such as SHA-1 or the like, for example, based on the playback/copy control information or MAC (Message Authentication Code) based on the playback/copy control information.

The playback/copy control information 1, 571 with the falsification verification data 1, 572 added thereto is encrypted based on a unit key corresponding to each CPS unit, and stored.

The playback/copy control information may be stored in one of different patterns as follows: As shown in FIG. 17 at (A-1), a playback/copy control information file is established for each CPU unit. As shown in FIG. 17 at (A-2), the control information of all CPU units is stored altogether as a single data file including fixed-length data described above with reference to FIG. 11. As shown in FIG. 17 at (A-3), the control information of all CPU units is stored altogether as a single data file including variable-length data described above with reference to FIG. 12.

Figure 18:
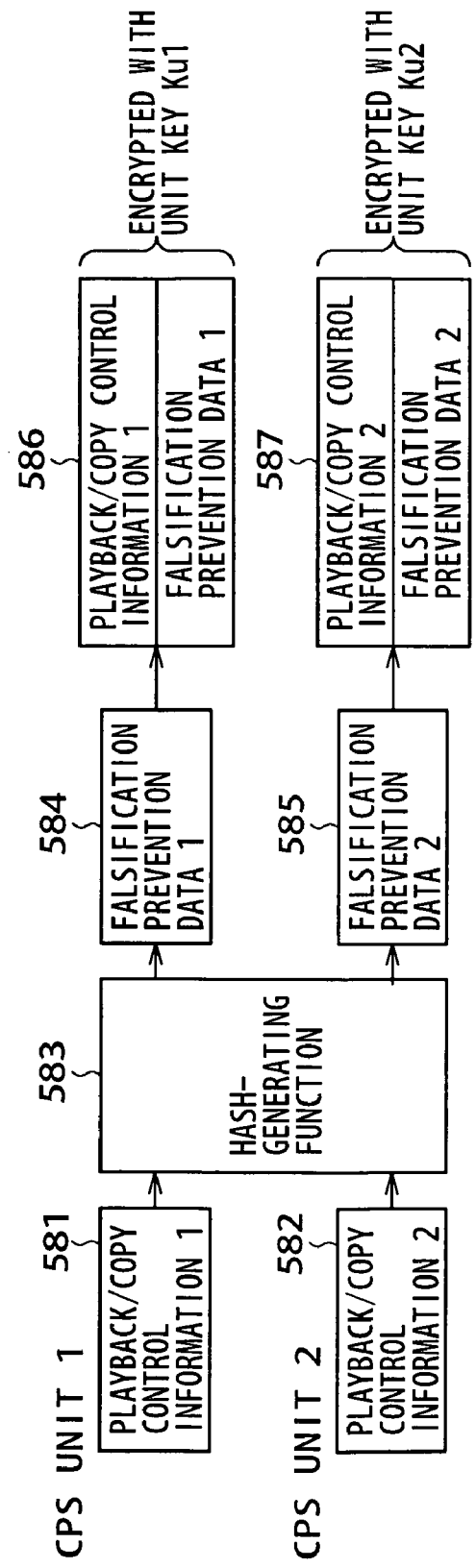
FIG. 18 is a diagram showing a falsification prevention and encryption arrangement where a hash function is applied to playback/copy control information.

A sequence of a process for applying a hash function as falsification verification data will be described below with reference to FIG. 18.

Hash values based on playback/copy control information 581, 582 corresponding to respective CPS units are generated by a hash generating function 583 such as SHA-1 or the like.

The hash values are established as falsification verification data 584, 585 corresponding to the playback/copy control information 581, 582 which corresponds to the respective CPS units, and unit keys Ku1, Ku2 corresponding to the respective CPS units are applied to joined data 586, 587 of the playback/copy control information and the falsification verification data to encrypt them into storage files.

Figure 19:
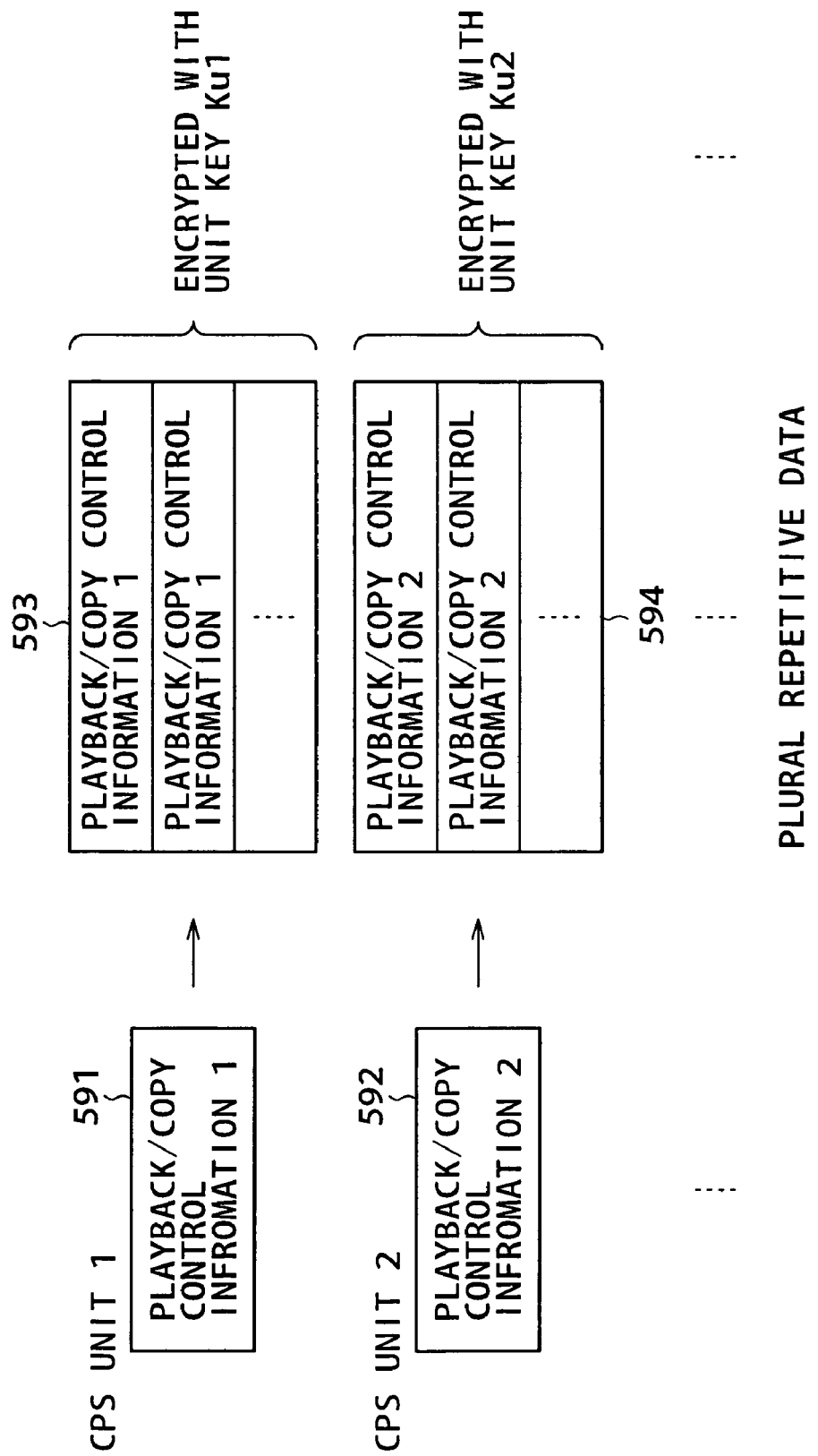
FIG. 19 is a diagram showing a falsification prevention and encryption arrangement where repeated data of playback/copy control information are applied.

A falsification prevention arrangement to which no hash function is applied will be described below with reference to FIG. 19. According to a process shown in FIG. 19, playback/copy control information 591, 592 corresponding to the respective CPS units is repeated and joined a plurality of times to establish joined data 593, 594. Then, unit keys Ku1, Ku2 corresponding to the respective CPS units are applied to joined data 593, 594 to encrypt them into storage files.

The encrypted data of the joined same data are established as storage files. When these storage files are decrypted with the unit keys Ku1, Ku2, any falsification thereof can be verified based on whether a repeated pattern of the same data is detected or not.

An information processing apparatus for performing a process of reproducing contents acquires encrypted contents usage control information corresponding to contents management units (CPS units) stored in the information recording medium, i.e., playback/copy control information, performs a decryption process which applies unit keys established so as to correspond to contents management units, performs a falsification verification process, and then performs a contents usage process based on the contents usage control information on the condition that no falsification is confirmed.

(9-2) Specific Example of Encryption and Falsification Prevention Processing Arrangements for Contents Usage Control Information.

Now, a specific example of encryption and falsification prevention processing arrangements will be described below.

In the specific example to be described below, playback/copy control information as contents usage control information is stored according to the pattern shown in FIG. 17 at (A-1), i.e., as established individual files corresponding to the playback/copy control information of the individual CPS units.

An arrangement for encrypting playback/copy control information as contents usage control information will be described below with reference to FIG. 20.

Figure 20:
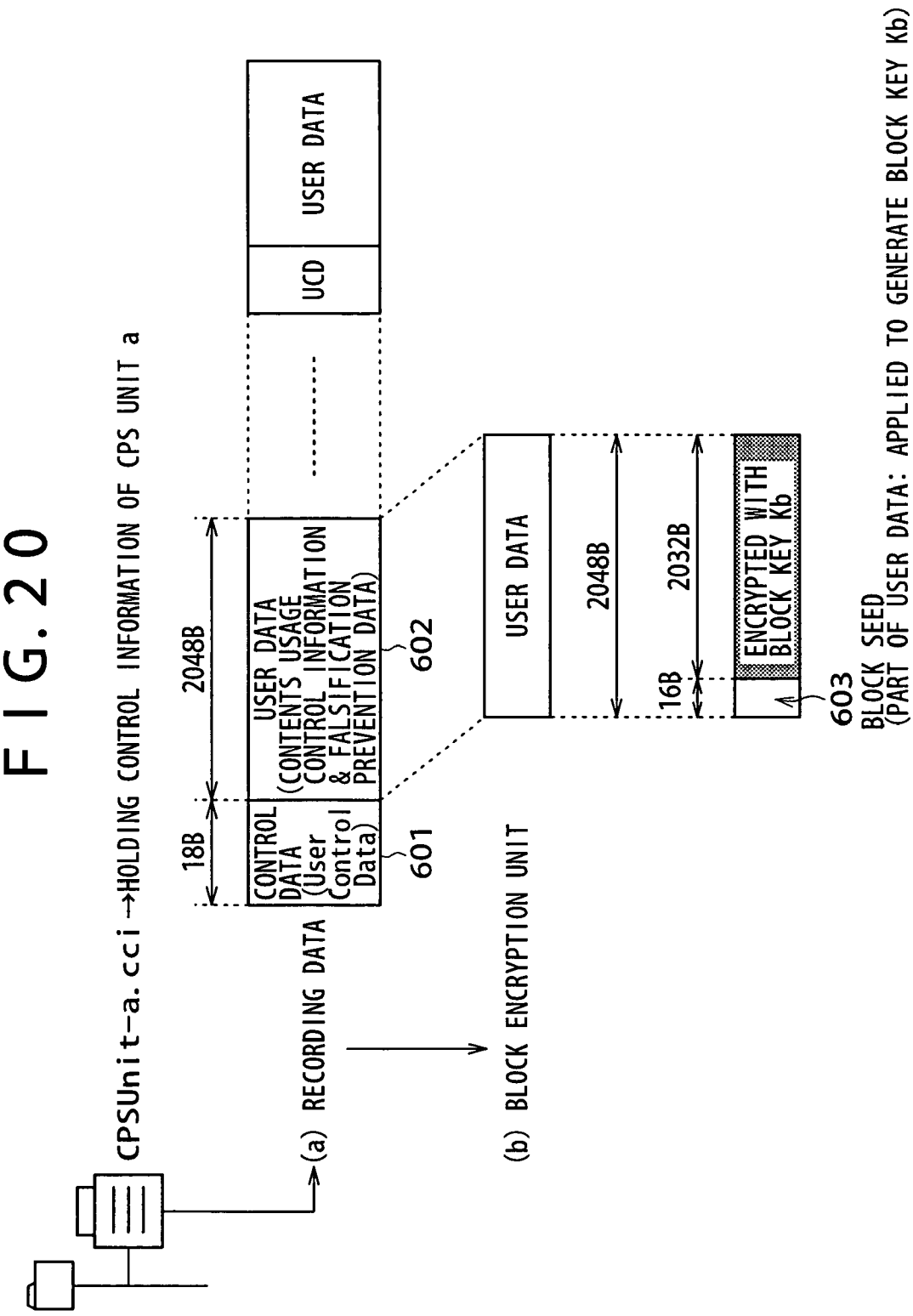
FIG. 20 is a diagram of an arrangement of data of contents usage control information recorded on the information recording medium, i.e., a recorded arrangement of data making up an individual file corresponding to playback/copy control information of each CPS unit.

FIG. 20 is a diagram of an arrangement of data of contents usage control information recorded in the information recording medium, i.e., a recorded arrangement of data making up individual files corresponding to playback/copy control information of the respective CPS units.

FIG. 20 at (a) shows a recorded data arrangement in the information recording medium of the contents usage control information of a CPS unit 001. As shown, the recorded data has a plurality of data blocks each including 18-byte user control data (UCD) 601 and 2048-byte user data 602 including contents usage control information and hash data as falsification verification data. The number of data blocks that are used differs depending on the data length of the contents usage control information.

The contents usage control information of a CPU unit a shown in FIG. 20 at (a) is contents usage control information corresponding to one of a plurality of CPS units stored in the information recording medium. For example, the contents usage control information corresponds to contents usage control information [CPSUnit001.cci] 610 of the CPS unit 001, in a directory indicative of an overall data arrangement recorded in the information recording medium shown in FIG. 21, for example.

Figure 21:
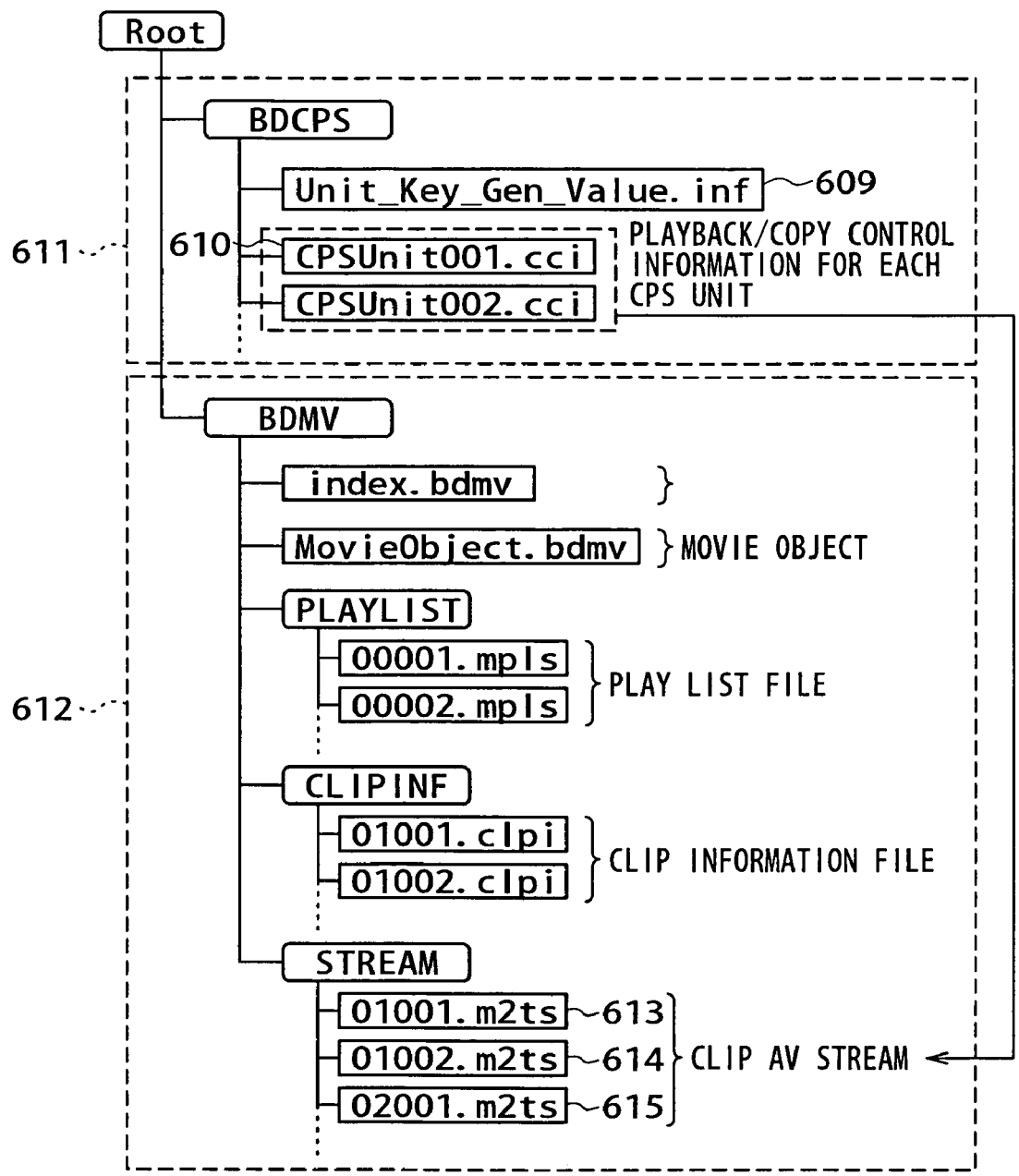
FIG. 21 is a diagram showing a directory illustrative of an overall data arrangement recorded on the information recording medium.

The directory arrangement shown in FIG. 21 is an arrangement including a content data area 612 and a contents management data area 611 corresponding to contents. A BDMV directory indicated in the content data area 612 is established as a directory storing contents and applications according to the Blu-ray Disc ROM format.

As described above with reference to FIGS. 2 and 3, the contents according to the Blu-ray Disc ROM format have a layered arrangement of titles, objects, play lists, clip information, AV streams, etc. Data files making up them are established in the BDMV directory.

The contents management data area 611 stores management files corresponding to contents. For example, the contents management data area 611 stores, with respect to each of the CPS units, unit key generation value information (Unit_Key_Gen_Value.inf) as information corresponding to the table managing CPU unit keys of the respective contents management units (CPS units) shown in FIG. 4, and contents usage control information (CPSUnit00n.cci) as playback/copy control information of contents that are established for the respective units.

A data arrangement of the unit key generation value information (Unit_Key_Gen_Value.inf) 609 will be described below with reference to FIG. 22. FIG. 22 shows an example of the syntax of a unit key generation value information (Unit_Key_Gen_Value.inf) file. The unit key generation value information file is a data file which defines information representative of association between contents management units and indexes, and random number information for use in the generation of unit keys.

Specifically, the unit key generation value information (Unit_Key_Gen_Value.inf) file is a file defining a first playback as playback contents to be activated when an information recording medium (disc) is loaded into the drive, indexes of a top menu as contents to be reproduced when a menu display function is activated, as described above with reference to FIGS. 5 through 7, information associating titles as other indexes to CPS units, and random number (Vu) information for generating keys assigned to the respective CPS units.

The unit key generation value information (Unit_Key_Gen_Value.inf) includes the following data:

(a) [CPS_Unit_number_for_FirstPlayback] as information to designate a CPS unit No. corresponding to the first playback;

(b) [CPS_Unit_number_for_TopMenu] as information to designate a CPS unit No. corresponding to the top menu;

(c) [Number of Titles] as title number information;

(d) [CPS_Unit_number for Title] as information to designate a CPS unit No. corresponding to each title;

(e) [Number of CPS_Units] as CPS unit number information; and (f) [Unit Key Generation Value for CPS_Unit] as random number (Vu) information for generating keys corresponding to the respective CPS units.

If contents corresponding to the first playback are not stored, then [CPS_Unit_number_for_FirstPlayback=0] is set. If contents corresponding to the top menu are not stored, then [CPS_Unit_number_for_TopMenu=0] is set. Respective CPS unit numbers are set in association with respective title numbers (Title#1 through Title#[Number_of_Titles]).

The playback/copy control information of the contents is established as individual information of the respective CPS units. Specifically, individual usage control information, as described below, is established for the respective CPS units stored in the information recording medium.

[CPS Unit 1]

The number of copies allowed for the recording medium: a, the number of playbacks allowed: b, whether or not remote playback is possible: possible, . . . .

[CPS Unit 2]

The number of copies allowed for the recording medium: 0, the number of playbacks allowed: c, whether remote playback is possible or not: not possible, . . . .

The contents usage control information [CPSUnit001.cci] 610 shown in FIG. 21 is contents usage control information corresponding to the CPS unit 001. Contents usage control information [CPSUnit002.cci] is contents usage control information corresponding to the CPS unit 002.

These contents usage control information correspond to the contents stored in the respective CPS units, or specifically usage control information of clip AV stream data 613, 614, 615 in the directory shown in FIG. 21.

Figure 23:
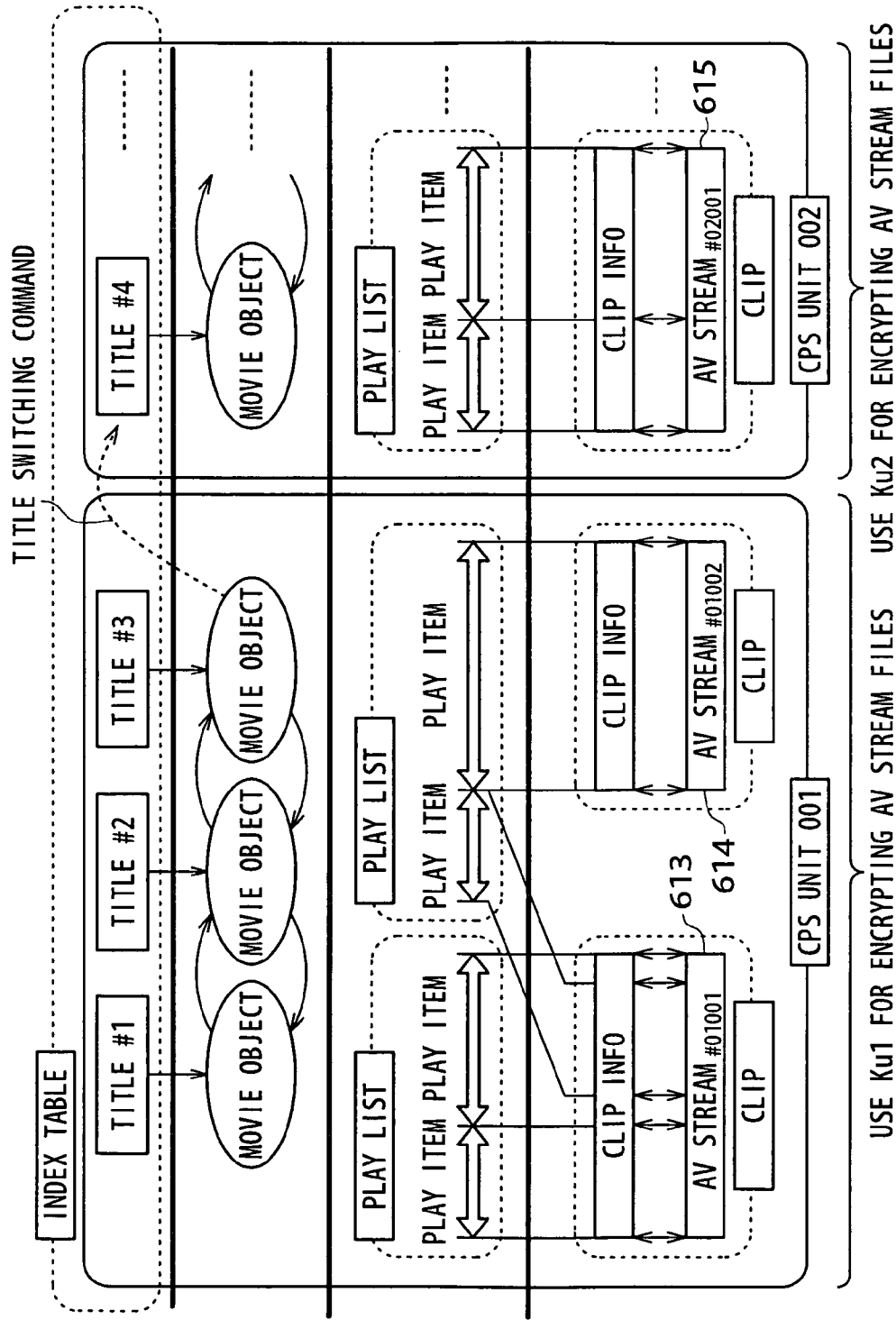
FIG. 23 is a diagram showing a contents arrangement according to a Blu-ray Disc ROM format illustrative of an association between AV streams and CPS units.

FIG. 23 shows a contents arrangement according to the Blu-ray Disc ROM format illustrative of an association between these AV streams and CPS units. The clip AV stream data 613, 614, 615 shown in FIG. 21 correspond respectively to AV stream data 613, 614, 615 shown in FIG. 23.

Specifically, the clip AV stream data 613, 614 are data belonging to a CPS unit #1, and the clip AV stream data 615 are data belonging to a CPS unit #2.

Therefore, contents playback control information of the clip AV stream data 613, 614 is a contents playback control information file established in association with the CPS unit 001, e.g., the contents usage control information [CPSUnit001.cci] 610 shown in FIG. 21, and contents playback control information of the clip AV stream data 615 is a contents playback control information file established in association with the CPS unit 002, e.g., the contents usage control information [CPSUnit002.cci] shown in FIG. 21.

When the information processing apparatus is to use contents contained in either one of CPS units, the information processing apparatus reads the contents usage control information corresponding to the CPS unit, and performs a usage process according to the read control information.

The recorded arrangement of the contents usage control information will further be described below with reference to FIG. 20. The 18-byte user control data (UCD) 601 in the recorded data shown in FIG. 20 at (a) are control data that are established for each 2048-byte user data 602, and include control data such as playback control information. The playback/copy control information for the respective CPS units and hash values as falsification verification data therefor are stored in the user data 602.

Each data block is subjected to block encryption applying a block key kb that is generated by a block seed 603 set in the block and a unit key Ku corresponding to each contents management unit (CPS unit). A block encryption process using the block key Kb will be described below with reference to FIG. 24. User data 621 shown in FIG. 24 represent user data (2048 bytes) in one data block. The usage data are data including playback/copy control information for each CPS unit.

In the block encryption process, a block seed having a predetermined length is extracted from the user data (2048 bytes) in one data block, and a block key Kb is generated by an encryption process based on the block seed and the unit key Ku. The data portion exclusive of the block seed are then encrypted using the block key Kb.

In the illustrated example, 16-byte data are extracted from the beginning of the user data, and the extracted 16-byte data are applied as a block seed 622.

As shown in FIG. 24, the 16-byte block seed 622 from the beginning of the user data is subjected to an encryption process, specifically, an AES encryption process, for example, based on a CPS unit key Ku-a 623, generating a block key Kb 624 in step S11.

The CPS unit key Ku-a 623 that is applied is the unit key of a unit corresponding to the contents usage control information that is subjected to the block encryption. If the contents usage control information that is subjected to the block encryption represents control data for the CPS unit a, then the unit key Ku-a corresponding to the CPS unit a is applied. In this manner, a different unit key established for each CPS unit is applied to generate a block key.

After the block key Kb 624 is generated in step S11, the data portion of the user data 621 exclusive of the 16 bytes of the block seed 622, i.e., a 2032-byte data area, is subjected to an encryption process, e.g., an AES encryption process, by applying the block key Kb 624.

According to this block encryption, the 2048-byte user data serving as the block data are established as the 16-byte block seed 622 which is not encrypted and the 2032-byte data encrypted by the block key Kb 624. These data are recorded in the information recording medium.

The block seed is extracted from the user data, and is established as different data for each block. Therefore, even though the common CPS unit key Ku is applied, the block key Kb is different for each block, and hence the encryption process is performed with higher security.

Figure 25:
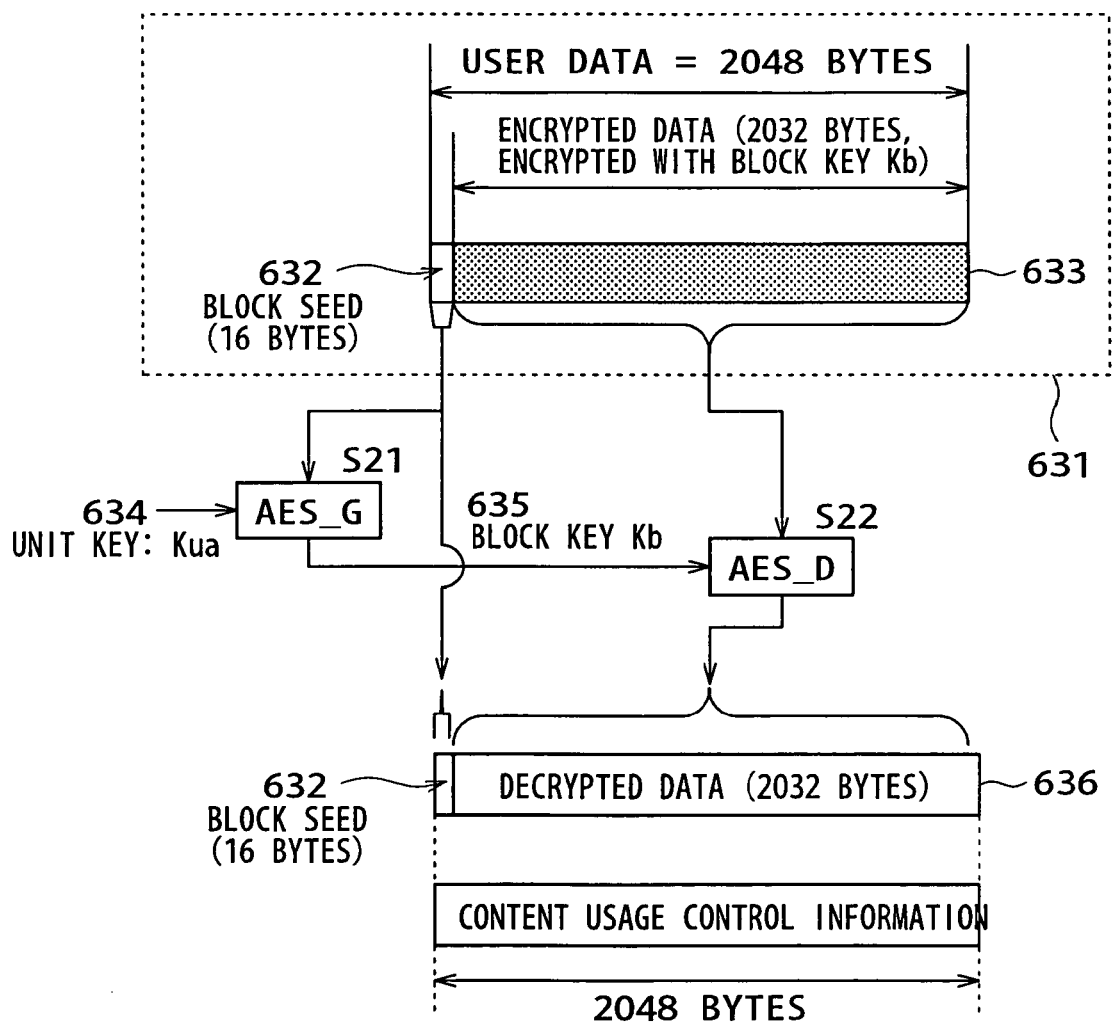
FIG. 25 is a diagram showing a decryption process using the block key Kb.

A sequence of decrypting data that have been subjected to the block encryption will be described below with reference to FIG. 25. 2048-byte user data 631 shown in FIG. 25 are data that have been subjected to the block encryption described above with reference to FIG. 24, and are made up of a 16-byte block seed 632 which is not encrypted and 2032-byte data 633 encrypted by a block key Kb.

As shown in FIG. 25, the 16-byte block seed 632 from the beginning of the user data is subjected to an encryption process, specifically, an AES encryption process, based on a CPS unit key Ku-a 634, generating a block key Kb 635 in step S21.

The CPS unit key Ku-a 634 that is applied is the unit key of a unit corresponding to the contents usage control information that is subjected to the block encryption. If the contents usage control information that is subjected to the block encryption represents control data for the CPS unit a, then the unit key Ku-a corresponding to the CPS unit a is applied.

After the block key Kb 635 is generated in step S21, the data portion of the user data 631 exclusive of the 16 bytes of the block seed 632, i.e., the 2032-byte encrypted data 633, is subjected to a decryption process, e.g., an AES decryption process, by applying the block key Kb 635.

According to this block encryption, the 2048-byte user data serving as the block data are made up of the 16-byte block seed 622 which is not encrypted and the 2032-byte data decrypted by the block key Kb 635. These data represent contents usage control information corresponding to a certain CPS unit. The information processing apparatus for reproducing and using contents uses contents according to the contents usage control information.

In FIGS. 24 and 25, the encryption and decryption processes for one block have been described. As described above with reference to FIG. 20, CPS-associated contents usage control information is recorded using a plurality of blocks depending on the length thereof. Therefore, for recording and reproducing CPS-associated contents usage control information, the process per block described above with reference to FIGS. 24 and 25 is performed on a plurality of blocks.

Figure 26:
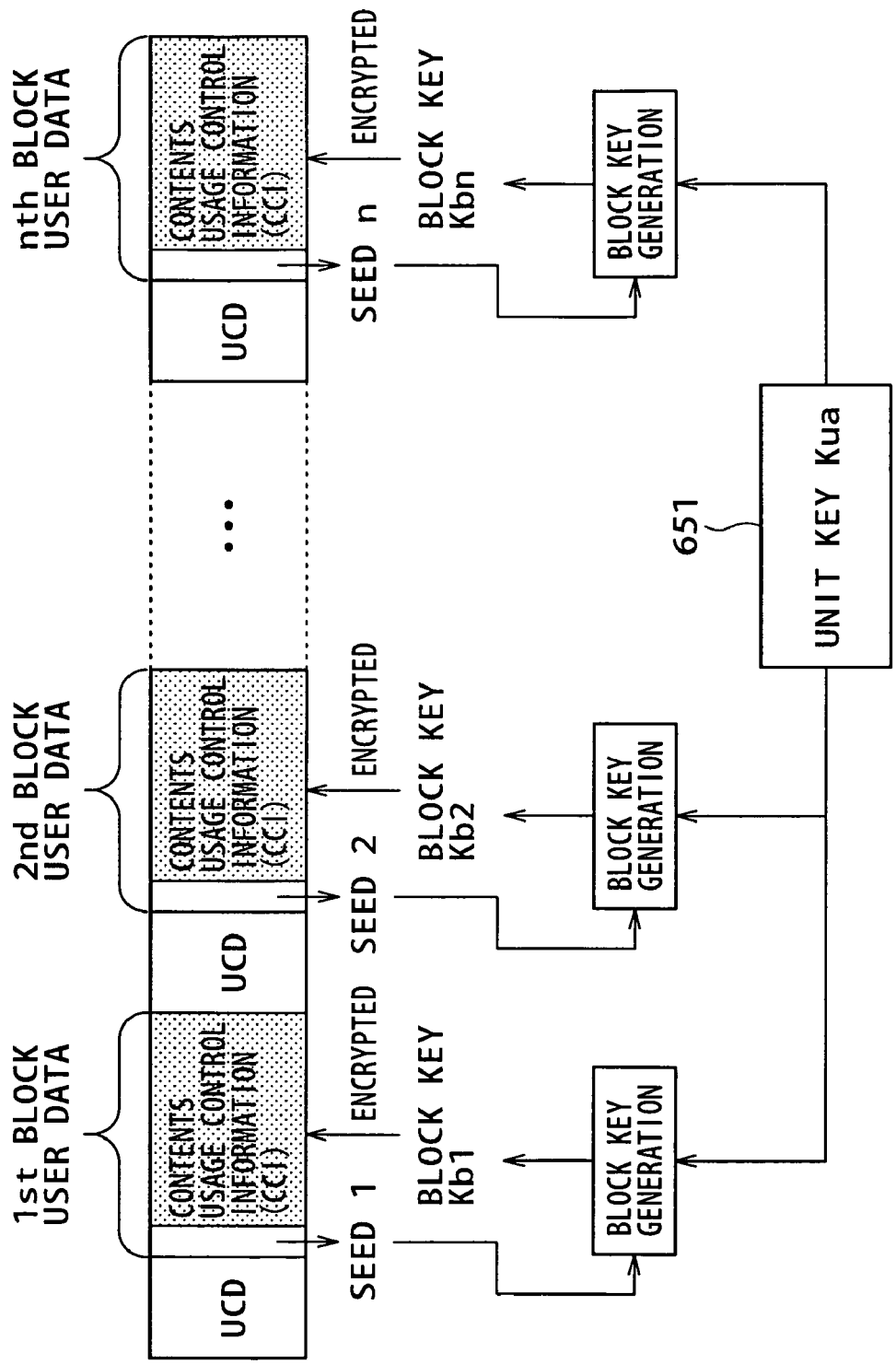
FIG. 26 is a diagram showing an overall recorded data arrangement of contents usage control information corresponding to a certain single CPS unit.

FIG. 26 shows an overall recorded data arrangement of contents usage control information corresponding to a certain single CPS unit a. The contents usage control information is divided and stored in the user data areas of a plurality of block data. In the example shown in FIG. 26, the user data of first through nth n blocks are used.

16 bytes from the beginning of the user data of each block are extracted as a seed, and an encryption process is performed by applying a unit key Kua 651 to the extracted seed to generate a block key.

Specifically, with respect to the first block, an encryption process is performed by applying a seed 1 and the unit key Kua 651 to generate a block key Kb1, and the block key Kb1 is applied to encrypt the data area of the user data exclusive of the seed. Similarly, with respect to the second block, an encryption process is performed by applying a seed 2 and the unit key Kua 651 to generate a block key Kb2, and the block key Kb2 is applied to encrypt the data area of the user data exclusive of the seed. The same process is carried out on all the blocks to generate recorded data.

An example of a recorded contents usage control information file corresponding to a single contents management units (CPS unit) and an example of hash values set as falsification verification data will be described below with reference to FIG. 27.

As described above with reference to FIGS. 20 through 26, contents usage control information as playback/copy control information for each CPS unit is divided and stored in the 2048-byte user data areas of block data.

Figure 27:
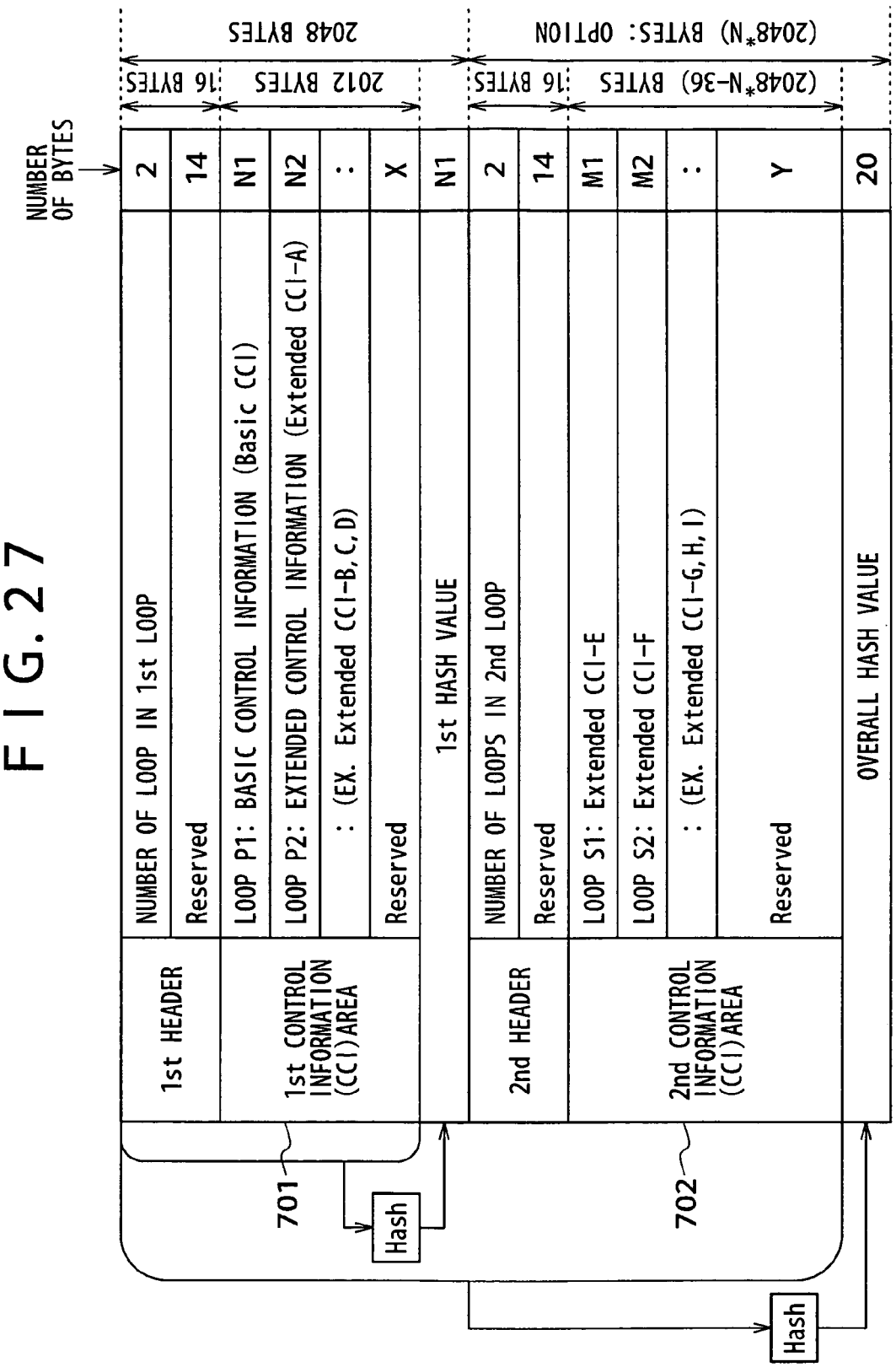
FIG. 27 is a diagram showing an example of a recorded contents usage control information file corresponding to a single contents management units (CPS unit) and an example of hash values set as falsification verification data.

FIG. 27 shows a first block 701 as a 2048-byte user data area serving as block data storing contents usage control information, and a succeeding block 702. The succeeding block 702 includes one or more blocks. It is assumed that the succeeding block 702 contains user data of N blocks, and contains data of 2048×N.

The first block 701 contains user data having a total number of bytes: 2048 bytes, and stores the respective data of:
a. first header: 16 bytes;
b. first control information (CCI) area: 2012 bytes; and
c. first hash value: 20 bytes.

The first header (16 bytes) contains information as to the number of loops of contents usage control information (playback/copy control information) contained in the first control information (CCI) area and a reserved area. The data in the first header (16 bytes) is used as seed information for generating a block key corresponding to this block.

As described above with reference to FIGS. 20 through 26, since the seed information is not subjected to block encryption, it is stored as plaintext data in the information recording medium. Therefore, if contents usage control information as playback/copy control information for each CPS unit is included in the 16-byte data at the beginning of the user data area of the block data used as the seed information, then the specific details of the control information may possibly leak out. Therefore, the 16-byte area at the beginning of the user data area is established as a header information area for storing data of lower confidentiality.

The first control information (CCI) area (2012 bytes) following the header stores contents usage control information as playback/copy control information corresponding to each CPS unit.

FIG. 27 shows the contents usage control information (playback/copy control information) of the first block 701 as including two types of control information, i.e.,
basic control information (Basic CCI), and
extended control information (Extended CCI).

In the example shown in FIG. 27, the first control information (CCI) area stores one item of basic control information (Basic CCI) and four items A through D of extended control information (Extended CCI).

The basic control information (Basic CCI) represents data comprising basic minimum contents usage control information. The basic control information (Basic CCI) is read by almost all information processing apparatus which perform a contents playback process according to a predetermined contents playback processing program, and the information processing apparatus are required to perform a process according to the control information. The extended control information (Extended CCI) represents data comprising extended contents usage control information (playback/copy control information) applicable to information processing apparatus which have processing functions such as higher-level contents usage processes, e.g., network transfer and streaming transmission and reception of data.

The basic control information (Basic CCI) is required to be quickly removed from a playback/copy control information storage file. For storing the extended control information (Extended CCI), there is employed a storage process which poses less limitations on size or the like for future extension. Specific examples of the basic control information (Basic CCI) and the extended control information (Extended CCI) are shown in FIG. 28.

As shown in FIG. 28, the basic control information (Basic CCI) includes the following control information, for example:
copyable/uncopyable information: copyable/uncopyable/copyable for one generation only; video output resolution limit information: output limit/no output limit;
analog copy control information: analog copy position/impossible (designation of analog copy prevention technique);

information on whether or not there is encryption: encryption/no encryption; and information on whether or not there is claim of rights: claim or rights/no claim of rights.

The extended control information (Extended CCI) includes the following control information, for example:

playable/unplayable information on a single information recording medium (disc): indicates whether or not contents playback is possible only with information on an information recording medium (disc);

method of playing contents unplayable on a single information recording medium (disc): "connection to a key distribution server", "insertion of a memory card with key", etc.;

server designation: an index value to a server list;

copying and streaming compatibility information: compatibility information for playing back contents on another intranetwork device; and data conversion process upon copying and streaming: a process usable for converting contents to those for another device.

The extended control information (Extended CCI) further includes the following control information:

copy limitation information as to whether copyable to intranetwork recording medium of same type or not, etc.;

copy limitation information as to whether or not copyable to portable unit, etc.;

information as to whether or not streaming and remote playback are possible, etc.;

information as to a downloading process; and information for acquiring operation control information from a server.

The extended control information (Extended CCI) may be set to any optional control information.

The data making up the first block 701 as the 2048-byte user data area serving as block data storing contents usage control information will further be described below with reference to FIG. 27.

The first block 701 stores a first hash value (20 bytes) generated based on each of the data of:

a. first header: 16 bytes; and b. first control information (CCI) area: 2012 bytes.

The hash value represents data generated by applying a hash function such as SHA-1 or the like to the data of the first header and the data of the first control information (CCI) area, and is established as falsification verification data for the data of the first header and the data of the first control information (CCI) area.

The size of the hash value differs depending on the hash function used. In FIG. 27, the hash function SHA-1 is used and the hash value of 160 bits (20 bytes) is generated. However, a different hash function and a different hash value length may be employed. The first hash value is obtained by inputting, to the hash function, data ranging from the beginning of the file to a position immediately prior to the area where the hash value is recorded (if SHA-1 is used, a 2028-byte area from the beginning).

An information processing apparatus for reading contents usage control information and performing contents usage according to the usage control information calculates a hash value based on the data of the first header and the data of the first control information (CCI) area, and compares the calculated hash value with a hash value stored in the user data area of the block data. If the compared hash values agree with each other, then the information processing apparatus determines that there is no falsification, and continues its processing. If the compared hash values do not agree with each other, then the information processing apparatus determines that there is falsification, and stops reproducing and using the contents according to the contents usage control information.

The succeeding block 702 shown in FIG. 27 contains user data of N blocks, and contains data of 2048×N bytes.

The user data of the succeeding block 702 store the respective data of:

a. second header: 16 bytes;

b. second control information (CCI) area: arbitrary bytes; and c. overall hash value: 20 bytes.

The second header: 16 bytes includes 16 bytes from the beginning of the user data of a second block following the first block 701, and contains information as to the number of loops of contents usage control information (playback/copy control information) contained in the second control information (CCI) area and a reserved area. The data in the second header (16 bytes) is used as seed information for generating a block key corresponding to 2048 bytes at the beginning of the second block.

The second control information (CCI) area: arbitrary bytes is established as an area for storing a plurality of contents usage control information (playback/copy control information) in a range not exceeding (2048×N−(16+20)) bytes which are produced by removing the header and the data portion of the overall hash value from the data size (2048×N) bytes of the succeeding block 702. In the example shown in FIG. 27, the second control information (CCI) area stores a total of five information blocks E through I of extended control information (Extended CCI).

If the succeeding block 702 uses a plurality of blocks, then the 16-byte data at the beginning of the user data of each block serve as a seed area as block key generation information for each block. The seed area is arranged to store either arrangement data of contents usage control information (playback/copy control information) or the same information as the second header or dummy data.

The overall hash value: 20 bytes stores an overall hash value (20 bytes) generated based on all of the following data:

the overall data of the first block 701;

the second header of the succeeding block 702: 16 bytes; and the second control information (CCI) area: arbitrary bytes.

The overall hash value is generated by applying a hash function such as SHA-1 or the like to the overall data of the first block 701, the second header of the succeeding block 702, and the overall data of the second control information (CCI), and is established as falsification verification data for the overall data of the first block 701, the second header of the succeeding block 702, and the overall data of the second control information (CCI).

The size of the hash value differs depending on the hash function used. In FIG. 27, the hash function SHA-1 is used and the hash value of 160 bits (20 bytes) is generated. However, a different hash function and a different hash value length may be employed. The overall hash value is obtained by inputting, to the hash function, data ranging from the beginning of the file to a position immediately prior to the area where the hash value is recorded (if SHA-1 is used, a [file size−20]-byte area from the beginning).

Of information processing apparatus for reading contents usage control information and performing contents usage according to the usage control information, an apparatus for performing higher-level contents usage processes according to the extended control information does not verify the hash value of the first block, but performs a data falsification verification process based on the overall hash value.

Specifically, the information processing apparatus for performing contents usage calculates a hash value based on the overall data of the first block 701, the data of the second header and the second control information (CCI) of the succeeding block 702, and compares the calculated hash value with a hash value stored in the user data area of the succeeding block 702. If the compared hash values agree with each other, then the information processing apparatus determines that there is no falsification, and continues its processing. If the compared hash values do not agree with each other, then the information processing apparatus determines that there is falsification, and stops reproducing and using the contents according to the contents usage control information.

An apparatus which uses higher-level contents and performs higher-level contents usage processes according to the extended control information calculates a hash value based on the data contained in not only the first block but also succeeding blocks from the second block, and compares the calculated hash value with the overall hash value. An apparatus which does not use higher-level contents and but performs higher-level contents usage processes according to only the basic control information may calculate a hash value based on the information set in the first block 701, and compare the calculated hash value with the first hash value set in the first block 701.

The stored arrangement of the contents usage control information and the hash value setting arrangement shown in FIG. 27 offer the following three advantages:

(1) It makes it possible to acquire and verify basic control information by generating and decrypting a block key of 2048 bytes (first block) at the beginning and verifying falsification based on a comparison of hash values.

(2) If the size of extended control information is small, then also the extended control information is stored in 2048 bytes (first block) at the beginning to make it possible to acquire and verify basic control information and extended control information by generating and decrypting a block key of 2048 bytes (first block) at the beginning and verifying falsification based on a comparison of hash values.

(3) If the size of extended control information is large, then it is possible to store contents usage control information using a succeeding block from the second block.

FIG. 29 is a diagram showing a syntax corresponding to a stored example of the contents usage control information shown in FIG. 27.

There are first block area data 721 made up of 2048 bytes at the beginning and succeeding block area data 722 following the first block area data 721 and having a size which is an integral multiple of 2048 bytes.

The first block area data 721 establish therein, as header information:

[Number_of_Primary_CCI_loop] as information indicative of the number of information blocks (loops) serving as contents usage control information (playback/copy control information) described in the first block area: 16 bits; and a reserved areas: 112 bits.

The above data are 16-byte data of the header.

The first block area data 721 also establish therein, as first control information (CCI) area information:

[CCI_and_other_info_type] as data type information of contents usage control information (playback/copy control information): 16 bits;

[CCI_and_other_info_data_length] as data length information of contents usage control information (playback/copy control information): 16 bits;

[CCI_and_other_info_data] as data value information of contents usage control information (playback/copy control information): (CCI_and_other_info_data_length×8) bits; and a reserved areas: X bits.

Furthermore, the first block area data 721 establish therein:

[Hash_value_for_Primary_CCI] as a hash value calculated based on the above first block arrangement data: 160 bits.

The succeeding block area data 722 are of substantially the same data arrangement as the first block area, and establish therein a header made up of information indicative of the number of loops and a reserved area, a contents usage control information (playback/copy control information) area including a data type, a data length, and a data value, a reversed area, and an overall hash value [Hash_value_for_All_CCI]: 160 bits.

The overall hash value [Hash_value_for_All_CCI]: 160 bits is a hash value generated based on the overall first block area data 721 and the succeeding block area data 722 except for the overall hash value.

An example of a recorded contents usage control information file different from that shown in FIG. 27, and an example of a hash value set as falsification verification data will be described below with reference to FIG. 30.

In the example of the recorded contents usage control information file shown in FIG. 27, the first block area stores therein both basic control information and extended control information. In the example shown in FIG. 30, however, the first block serves as an area storing only basic control information, and all extended control information is stored in a succeeding block from the second block.

The arrangement of the recorded contents usage control information file in the present example will be described below with reference to FIG. 30.

Figure 30:
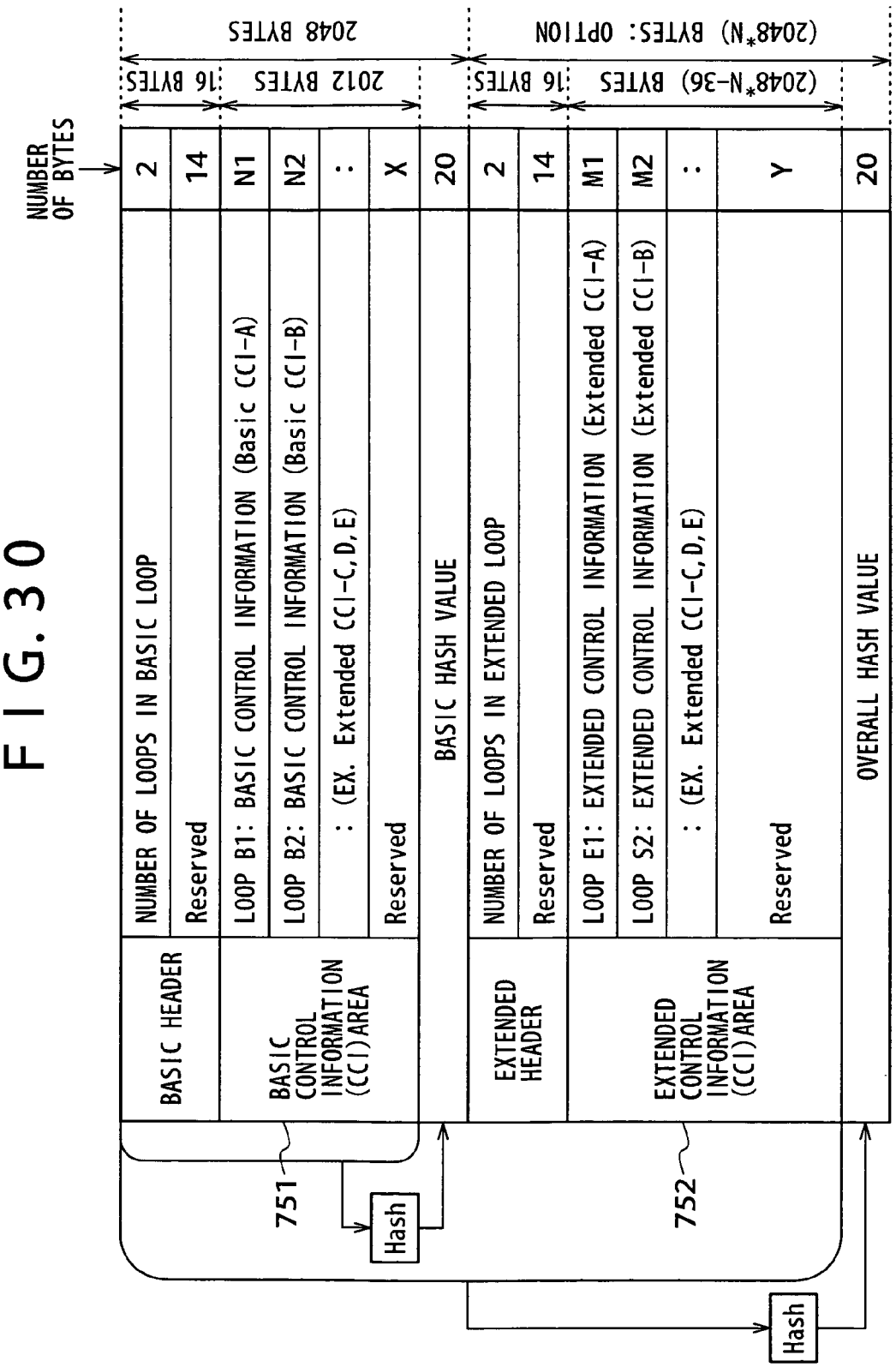
FIG. 30 is a diagram showing an example of a recorded contents usage control information file and an example of hash values set as falsification verification data.

FIG. 30 shows a first block 751 as a 2048-byte user data area serving as block data storing contents usage control information, and a succeeding block 752. The succeeding block 752 includes one or more blocks. It is assumed that the succeeding block 752 contains user data of N blocks, and contains data of 2048×N.

The first block 751 contains user data having a total number of bytes: 2048 bytes, and stores the respective data of:

a. basic header: 16 bytes;
b. basic control information (CCI) area: 2012 bytes; and
c. basic hash value: 20 bytes.

The basic header (16 bytes) contains information as to the number of loops of contents usage control information (playback/copy control information) contained in the basic control information (CCI) area of the first block 751 and a reserved area. The data in the basic header (16 bytes) is used as seed information for generating a block key corresponding to this block.

The basic control information (CCI) area (2012 bytes) following the header storing only basic control information (Basic CCI) in contents usage control information (playback/copy control information) corresponding to each CPS unit. Extended control information (Extended CCI) is not stored in the first block 751, but stored in its entirety in the succeeding block 752. In the illustrated example, the first block 751 stores a total of five information blocks A through E of basic control information (Basic CCI).

As described above, the basic control information (Basic CCI) represents data comprising basic minimum contents usage control information (playback/copy control information). The basic control information (Basic CCI) is read by almost all information processing apparatus which perform a contents playback process according to a predetermined contents playback processing program, and the information processing apparatus are required to perform a process according to the control information.

The first block 571 further stores therein a basic hash value (20 bytes) generated based on the data of the basic header (16 bytes) and the basic control information (CCI) area: 2012 bytes. The hash value represents data generated by applying a hash function such as SHA-1 to the data of the basic header and the data of the basic control information (CCI) data, and is established as falsification verification data for these data. The size of the hash value differs depending on the hash function used. In FIG. 30, the hash function SHA-1 is used and the hash value of 160 bits (20 bytes) is generated. However, a different hash function and a different hash value length may be employed. The first hash value is obtained by inputting, to the hash function, data ranging from the beginning of the file to a position immediately prior to the area where the hash value is recorded (if SHA-1 is used, a 2028-byte area from the beginning).

An information processing apparatus for performing contents usage based on only the basic control information calculates a hash value based on the data of the basic header and the data of the basic control information (CCI) area, and compares the calculated hash value with a hash value stored in the user data area of the block data. If the compared hash values agree with each other, then the information processing apparatus determines that there is no falsification, and continues its processing. If the compared hash values do not agree with each other, then the information processing apparatus determines that there is falsification, and stops reproducing and using the contents according to the contents usage control information.

The information processing apparatus for performing contents usage based on only the basic control information is not required to perform processes such as the reading of information and the calculation of a hash value for the second block and following blocks, and hence can process data efficiently.

The succeeding block 752 shown in FIG. 30 contains user data of N blocks, and contains data of 2048×N bytes.

The user data of the succeeding block 752 store the respective data of:

a. extended header: 16 bytes;

b. extended control information (CCI) area: arbitrary bytes; and c. overall hash value: 20 bytes.

The extended header: 16 bytes comprises 16 bytes from the beginning of the user data of a second block following the first block 751, and contains information as to the number of loops of contents usage control information (playback/copy control information) contained in the extended control information (CCI) area and a reserved area. The data in the extended header (16 bytes) is used as seed information for generating a block key corresponding to the second block.

The extended control information (CCI) area: arbitrary bytes is established as an area for storing a plurality of contents usage control information (playback/copy control information) in a range not exceeding (2048×N−(16+20)) bytes which are produced by removing the header and the data portion of the overall hash value from the data size (2048×N) bytes of the succeeding block 752. The succeeding block 752 only includes the extended control information except for the basic control information stored in the first block 751. In the example shown in FIG. 30, the extended control information (Extended CCI) area stores a total of five information blocks A through E.

If the succeeding block 752 uses a plurality of blocks to store the extended control information, then the 16-byte data at the beginning of the user data of each block serve as a seed area as block key generation information for each block. The seed area is arranged to store either arrangement data of contents usage control information (playback/copy control information) or the same information as the extended header at the beginning of the second header or dummy data.

The overall hash value: 20 bytes stores an overall hash value (20 bytes) generated based on all of the following data:

the overall data of the first block 751;

the extended header of the succeeding block 752: 16 bytes; and the extended control information (CCI) area: arbitrary bytes.

The overall hash value is generated by applying a hash function such as SHA-1 to the overall data of the first block 751, the extended header of the succeeding block 752, and the overall data of the extended control information (CCI), and is established as falsification verification data for the overall data of the first block 751, the extended header of the succeeding block 752, and the overall data of the extended control information (CCI). The size of the hash value differs depending on the hash function used. In FIG. 30, the hash function SHA-1 is used and the hash value of 160 bits (20 bytes) is generated. However, a different hash function and a different hash value length may be employed.

Of information processing apparatus for reading contents usage control information and performing contents usage according to the usage control information, an apparatus for performing higher-level contents usage processes according to the extended control information does not verify the hash value of the first block, but performs a data falsification verification process based on the overall hash value. Only if the information processing apparatus determines that there is no falsification, it continues its processing to use contents. If the information processing apparatus determines that there is falsification, then it stops reproducing and using the contents according to the contents usage control information.

With the arrangement according to the present embodiment, the information processing apparatus for using contents according to the basic control information is required to decrypt and verify, based on a hash value, only the data of the first block 751, and can dispense with processes of decrypting, calculating a hash value for, and verifying the succeeding block 752. The information processing apparatus can therefore perform its processing efficiently.

FIG. 31 is a diagram showing a syntax corresponding to a stored example of the contents usage control information shown in FIG. 30.

There are first block area data 771 made up of 2048 bytes at the beginning and succeeding block area data 772 following the first block area data 771 and having a size which is an integral multiple of 2048 bytes.

The first block area data 771 establish therein, as header information:

[Number_of_Basic_CCI_loop] as information indicative of the number of information blocks (loops) serving as contents usage control information (playback/copy control information) described in the basic control information (CCI) area: 16 bits; and a reserved areas: 112 bits.

The above data are 16-byte data of the header.

The first block area data 771 establish therein, as the basic control information (CCI) area information:

[CCI_and_other_info_type] as data type information of contents usage control information (playback/copy control information): 16 bits;

[CCI_and_other_info_data_length] as data length information of contents usage control information (playback/copy control information): 16 bits;

[CCI_and_other_info_data] as data value information of contents usage control information (playback/copy control information): (CCI_and_other_info_data_length×8) bits; and a reserved areas: X bits.

Furthermore, the first block area data 771 establish therein:

[Hash_value-for-Basic_CCI] as a hash value calculated based on the above first block arrangement data: 160 bits.

The succeeding block area data 772 are of substantially the same data arrangement as the first block area, and establish therein a header made up of information indicative of the number of loops and a reserved area, a contents usage control information (playback/copy control information) area including a data type, a data length, and a data value, a reversed area, and an overall hash value [Hash_value_for_All_CCI]: 160 bits.

The overall hash value [Hash_value_for_All_CCI] 160 bits is a hash value generated based on the overall first block area data 771 and the succeeding block area data 772 except for the overall hash value.

As described above, the contents usage control information (playback/copy control information) includes basic control information (Basic CCI) and extended control information (Extended CCI). The basic control information (Basic CCI) represents data comprising basic minimum contents usage control information (playback/copy control information). The basic control information (Basic CCI) is read by almost all information processing apparatus which perform a contents playback process according to a predetermined contents playback processing program, and the information processing apparatus are required to perform a process according to the control information. The extended control information (Extended CCI) represents data comprising extended contents usage control information (playback/copy control information) applicable to information processing apparatus which have processing functions such as higher-level contents usage processes, e.g., network transfer and streaming transmission and reception of data.

A processing sequence of an information processing apparatus for reading contents usage control information (playback/copy control information) in different categories from an information recording medium and performing processes according to the control information will be described below with reference to FIGS. 32 and 33.

Figure 32:
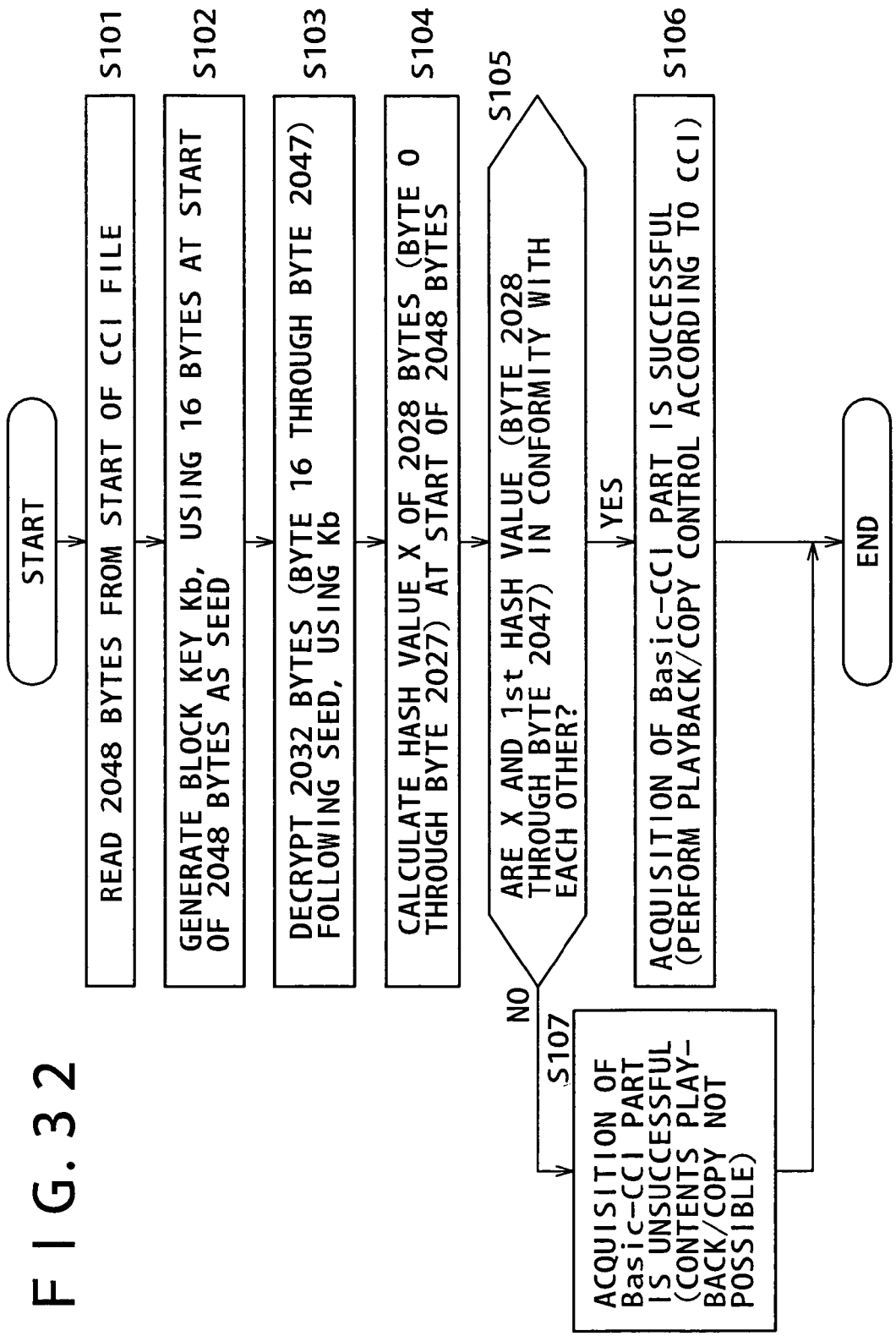
FIG. 32 is a flowchart of a processing sequence of an information processing apparatus for reading only basic control information and performing contents usage according to the basic control information.

FIG. 32 shows a processing sequence of an information processing apparatus for reading only basic control information and performing contents usage according to the basic control information.

In step S101, the information processing apparatus selects a contents control information file (CCI file) corresponding to a certain CPS unit, and reads 2048 bytes from the beginning of a data area which corresponds to a first block of the file.

In step S102, the information processing apparatus acquires 16 bytes from the beginning of the read 2048-byte data of the first block, and performs a key generation process by applying an encryption process, e.g., an AES encryption process, based on a CPS unit key on the acquired 16 bytes as a seed, thereby generating a block key Kb. The CPS unit key applied here is a CPS unit key corresponding to a contents management unit (CPS unit) that is associated with the contents control information file (CCI file) that is selected.

In step S103, the information processing apparatus applies the generated block key Kb to perform a decryption process on the block-encrypted data area of the read 2048-byte data of the first block exclusive of the 16 bytes at the beginning. For example, the information processing apparatus performs a decryption process according to an AES encryption algorithm.

In step S104, the information processing apparatus calculates a hash value X based on the 2028-byte data of the decrypted block data exclusive of 20 bytes. At this time, SHA-1, for example, is applied as a hash value calculating algorithm.

In step S105, the information processing apparatus compares the calculated hash value with the hash value (the 20-byte data from the 2028th byte to the 2047th byte of the block data) written in the block data.

If the calculated hash value and the read hash value do not agree with each other, then control goes to step S107 in which the information processing apparatus determines that there is falsification, and stops using contents according to contents control information.

If the calculated hash value and the read hash value agree with each other, then control goes to step S106 in which the information processing apparatus determines that there is no falsification, and acquires contents control information and uses contents according to the contents control information. In this case, the control information comprises basic control information, and the information processing apparatus performs a contents usage process according to the basic control information.

FIG. 33 shows a processing sequence of an information processing apparatus for reading both basic control information and extended control information and performing contents usage according to the basic control information and the extended control information.

In step S201, the information processing apparatus selects a contents control information file (CCI file) corresponding to a certain CPS unit, and reads 2048 bytes from the beginning of a data area which corresponds to a first block of the file.

In step S202, the information processing apparatus acquires 16 bytes from the beginning of the read 2048-byte data of the first block, and performs a key generation process by applying an encryption process, e.g., an AES encryption process, based on a CPS unit key on the acquired 16 bytes as a seed, thereby generating a block key Kb. The CPS unit key applied here is a CPS unit key corresponding to a contents management unit (CPS unit) that is associated with the contents control information file (CCI file) that is selected.

In step S203, the information processing apparatus applies the generated block key Kb to perform a decryption process on the block-encrypted data area of the read 2048-byte data of the first block exclusive of the 16 bytes at the beginning. For example, the information processing apparatus performs a decryption process according to an AES encryption algorithm.

In step S204, the information processing apparatus determines whether all the block data of the contents control information file (CCI file) have been read and decrypted or not. If not, control goes back to step S201, and the information processing apparatus repeats the same process on a succeeding block, i.e., acquires a seed, generates a block key Kb, and decrypts the encrypted data.

If all the block data of the contents control information file (CCI file) have been read and decrypted, then control goes to step S205.

In step S205, the information processing apparatus calculates a hash value X based on all the block data of the decrypted contents control information file (CCI file), exclusive of the overall hash value of 20 bytes. At this time, SHA-1, for example, is applied as a hash value calculating algorithm.

In step S206, the information processing apparatus compares the calculated hash value with the overall hash value read from the contents control information file (CCI file).

If the calculated hash value and the read hash value do not agree with each other, then control goes to step S208 in which the information processing apparatus determines that there is falsification, and stops using contents according to contents control information.

If the calculated hash value and the read hash value agree with each other, then control goes to step S207 in which the information processing apparatus determines that there is no falsification, and acquires contents control information and uses contents according to the contents control information. In this case, the control information comprises basic control information and extended control information, and the information processing apparatus performs a contents usage process according to the basic control information and the extended control information.

[10. Example of Arrangement of Information Processing Apparatus]

An example of the arrangement of an information processing apparatus for recording and reproducing main contents and subcontents having the above contents management units (CPS units) is now described with reference to FIG. 34.

An information processing apparatus 800 has a drive 890 for driving an information recording medium 891 to input and output data recording and playback signals, a CPU 870 for performing data processing operation according to various programs, a ROM 860 as a storage area for programs, parameters, etc., a memory 880, an input/output interface I/F 810 for inputting and outputting digital signals, an input/output interface I/F 840 having an A/D, D/A converter 841, an MPEG codec 830 for encoding and decoding MPEG data, a TS/PS processing section 820 for performing TS (Transport Stream)/PS (Program Stream) processing operation, and an encrypting section 850 for performing various encryption processes. These blocks are connected to a bus 801.

Operation of the information processing apparatus 800 for recording data will first be described below. Data to be recorded are assumed to be of two types, i.e., a digital signal and an analog signal.

If data to be recorded are in the form of a digital signal, it is input from the digital signal input/output interface I/F 810, and, if necessary, encrypted by the encrypting section 850 into data, which are stored in the information recording medium 891. If the data type of the input digital signal is to be converted before the digital signal is stored, the data type thereof is converted into a storage data type by the MPEG codec 830, the CPU 870, and the TS/PS processing section 820. The data in the converted data type are encrypted by the encrypting section 850 and stored in the information recording medium 891.

If data to be recorded are in the form of an analog signal, it is input to the input/output interface I/F 840, and converted into a digital signal by the A/D converter 841. The digital signal is converted by the MPEG codec 830 into a digital signal to be recorded. The digital signal is then converted by the TS/PS processing section 820 into AV multiplex data in a recording data type. If necessary, the data are encrypted by the encrypting section 850 and stored in the information recording medium 891.

For example, if main contents represented by stream data including MPEG-TS data are to be recorded, then the main contents are segmentalized into contents management units (CPS units), and thereafter encrypted by the encrypting section 850 according to an encryption process using a unit key. The encrypted data are then stored in the information recording medium 891 by the drive 890.

Subcontents are also segmentalized into contents management units (CPS units) corresponding to data groups. The data are thereafter encrypted by the encrypting section 850 according to an encryption process using a unit key. The encrypted data are then stored in the information recording medium 891 by the drive 890.

The various types of management information described above, i.e.,

[the unit arrangement and key management table],
[the state management table], and
[the contents playback and copy control information management table], are also generated or updated, and, if necessary, stored as falsification verification data or encrypted data in the information recording medium 891.

Operation of the information processing apparatus 800 for reproducing data from the information recording medium will be described below. If AV stream data including MPEG-TS data as main contents are to be reproduced, then when data read from the information recording medium 891 by the driver 890 are identified as a contents management unit, a unit key corresponding to the contents management unit is acquired, and the data are decrypted by the encrypting section 850 based on the acquired unit key. The decrypted data are then divided into various data, e.g., video data, audio data, subtitle data, etc., by the TS/PS processing section 820.

The digital data that are decoded by the MPEG codec 830 are converted by the D/A converter 841 of the input/output interface I/F 840 into an analog signal, which is output. If digital data are to be output, then the MPEG-TS data decrypted by the encrypting section 850 are output as digital data through the input/output interface I/F 810 to a digital interface such as an IEEE 1394 cable, an Ethernet cable, or a wireless LAN. For the information processing apparatus 800 to have a network connection function, the input/output interface I/F 810 has a network connection function. If the reproducing apparatus converts the data into a data type capable of being received by an output destination device and outputs the converted data, then the video data, the audio data, the subtitle data, etc. separated by the TS/PS processing section 820 are converted in rate and codec processing by the MPEG codec 830. Then, the data are multiplexed again into MPEG-TS or MPEG-PS data by TS/PS processing section 820, and then output from the digital signal input/output interface I/F 810. Alternatively, the data may be converted by the CPU 870 into a codec or multiplex file other than MPEG, and then output from the digital signal input/output interface I/F 810.

When subcontents are also identified as a contents management unit, a unit key corresponding to the contents management unit is acquired. The data are then decrypted by the encrypting section 850 based on the acquired unit key, and reproduced.

If the various types of management information described above, i.e.,

[the unit arrangement and key management table],
[the state management table], and
[the contents playback and copy control information management table], are stored in the image recording medium 891, then they are read from the image recording medium 891 and stored in the memory 880. Key information for each contents management unit (CPS unit) required for playback can be acquired from the data stored in the memory 880. If the management tables and unit keys are not stored in the information recording medium, then they may be acquired from a networked server according to a predetermined procedure.

As described above, contents management units (CPS units) are established in association with arrangement data of main contents and subcontents, and one unit key is associated with one contents management unit (CPS unit). The supervisory playback control program for performing supervisory control over the reproduction of contents detects switching between contents management units (CPS units), and switches between keys to be applied depending on the switching between contents management units (CPS units). If no key has been acquired, the supervisory playback control program performs a process of presenting a message prompting the user to acquire a key.

If contents usage control information, i.e., contents playback and copy control information, is encrypted and established as falsification verification data, then for using contents, encrypted contents usage control information corresponding to a contents management unit stored in the information recording medium is acquired. The acquired contents usage control information is decrypted by applying a unit key corresponding to the contents management unit and then verified for falsification. On the condition that no falsification is confirmed, a contents usage process based on the contents usage control information is performed.

If information required by the recording and reproducing apparatus is acquired via a network outside the recording and reproducing apparatus, then the acquired data are stored in the memory 880 in the recording and reproducing apparatus. The data that are stored include key information necessary for contents playback, subtitle data to be reproduced in timed relation to the reproduction of the contents, audio information, image data such as still image data, contents management information, and usage rules of the reproducing apparatus which correspond to the contents management information.

The program for performing the reproducing process and the recording process is stored in the ROM 860. While the program is being executed, the memory 880 is used as storage and work areas for parameters and data. In FIG. 34, the apparatus arrangement capable of recording and reproducing data is illustrated. However, an apparatus having only a playback function and an apparatus having only a recording function may be arranged, and the present invention is also applicable to those apparatus.

The present invention has been described in detail with respect to certain embodiments. However, it is apparent to those skilled in the art that modifications and alternatives may be made to those embodiments without departing from the scope of the present invention. The present invention has been disclosed for illustrative purposes, and should not be interpreted as limitative. The scope of appended claims for patent should be taken into consideration for determining the scope of the present invention.

The processing sequence described above in the specification can be executed by hardware, software, or a combination thereof. If the processing sequence is to be executed by software, a program in which the processing sequence is recorded may be installed in a memory in a computer that is incorporated in dedicated hardware, or may be installed in a general-purpose computer which can execute various processes, and the installed program may be executed.

For example, the program may be recorded in advance in a hard disc or a ROM (Read-Only Memory) as a recording medium. Alternatively, the program may be stored (recorded) temporarily or permanently in a removable recording medium such as a flexible disc, a CD-ROM (Compact Disc Read-Only Memory), an MO (Magneto-Optical) disc, a DVD (Digital Versatile Disc), a magnetic disc, or a semiconductor memory. The removable recording medium may be provided as so-called package software.

The program may be installed from the removable recording medium into the computer. Alternatively, the program may be transferred in a wireless fashion from a downloading site into the computer, or may be transferred in a wired fashion from a downloading site into the computer via a network such as the Internet. The computer may receive the transferred program and install the program in a built-in recording medium such as a hard disc or the like.

The various processes described above in the specification may be performed not only in a chronological order described above or but also concurrently or individually depending on the processing capability of the apparatus which performs those processes, or if necessary. The system referred to in the present specification includes a logical set of plural apparatus, and is not limited to one in which the apparatus are housed in one casing.

According to the arrangement of the present invention, as described above, main contents having a data format according to a certain AV (Audio Visual) format such as a Blu-ray disc ROM format, for example, and subcontents having a data format not according to the AV format are established as contents management units, and data included in the contents management units are stored in an information recording medium as encrypted data based on individual unit keys associated with the respective contents management units. Therefore, not only data according to the AV format, but also data according to an arbitrary format not according to the AV format can be used in various forms. The arrangement of the present invention is effectively applicable to an information recording medium and an information processing apparatus in a system which is required to store a plurality of contents in the information recording medium and to perform usage control on each of the contents.

According to the arrangement of the present invention, furthermore, arrangement data of main contents and subcontents are divided into units, and usage control of contents in each of the units, or specifically, usage control of various contents, such as playback control and copy control, can be performed. Since contents usage control can be performed individually in each of contents management units, each of the segmentalized contents can be managed in an information recording medium which stores many contents. The arrangement of the present invention is effectively applicable to an information recording medium and an information processing apparatus in a system which is required to store a plurality of contents in the information recording medium and to perform usage control on each of the contents.

According to the arrangement of the present invention, furthermore, arrangement data of main contents and subcontents are divided into units, and usage control information of contents of in each of the units is established and encrypted as falsification verification data. Consequently, the contents are prevented from suffering unauthorized usage due to unauthorized acquisition and falsification of usage control information. The arrangement of the present invention is effectively applicable to an information recording medium and an information processing apparatus in a system which is required to perform usage control of contents strictly.

According to the arrangement of the present invention, furthermore, contents usage control information corresponding to contents divided into contents management units (CPS units) is converted into encrypted data using unit keys corresponding to the contents management units, and falsification verification data corresponding to data including the contents usage control information are established and recorded. Therefore, it is possible to prevent the contents usage control information from leaking and being falsified, thus realizing contents usage management at a higher security level.

According to the arrangement of the present invention, furthermore, contents usage control information corresponding to contents divided into contents management units (CPS units) is divided into basic control information and extended control information, and certain block data including the basic control information are established. Each block is encrypted, and falsification verification data corresponding to the block data including the basic control information are established. Therefore, an apparatus for using contents according to only the basic control information is not required to decode data block storing the extended control information and verify those data block storing the extended control information for falsification, but can process data efficiently.

What is claimed is:

1. An information recording medium, storing:
   main contents to be read from the information recording medium and having constituent data according to a predetermined format and subcontents to be read from the information recording medium and having constituent data not according to the predetermined format, as recorded data, the main contents recorded in a plurality of contents management units, at least one of the contents management units including, as the constituent data, plural individual contents data and plural titles;
   an individual independent encryption unit key for each respective contents management unit;
   the contents management units including data stored as encrypted data based on the individual encryption unit keys associated respectively with said contents management units.

2. The information recording medium according to claim 1, wherein said predetermined format is a disc ROM format, and said main contents comprise recorded data having a layered data arrangement according to said disc ROM format.

3. The information recording medium according to claim 1, wherein said subcontents comprise a set of data groups including at least one data file, said contents management units being established as units of said data groups, said information recording medium storing path identification information of the files of the data groups corresponding to the contents management units, as data group management information.

4. The information recording medium according to claim 1, wherein said subcontents comprise a set of data groups including at least one data file, said contents management units being established as units of said data groups, said information recording medium having a directory arrangement with said data groups established as individual folders.

5. The information recording medium according to claim 4, wherein said information recording medium stores identification information of the individual folders of the data groups corresponding to the contents management units, as the data group management information.

6. The information recording medium according to claim 1, wherein said information recording medium stores contents usage control information corresponding to the contents management units, as the encrypted data based on the encryption unit keys associated respectively with the contents management units.

7. The information recording medium according to claim 1, wherein said information recording medium stores contents usage control information corresponding to the contents management units, as data having a falsification prevention arrangement.

8. The information recording medium according to claim 1, wherein said information recording medium stores contents usage control information corresponding to the contents management units and data associated with hash values based on the contents usage control information, as the encrypted data based on the encryption unit keys associated respectively with the contents management units.

9. The information recording medium according to claim 1, wherein said information recording medium stores repetitive data of contents usage control information corresponding to the contents management units, as the encrypted data based on the encryption unit keys associated respectively with the contents management units.

10. The information recording medium according to claim 1, wherein said information recording medium stores first playback contents as contents reproduced when the information recording medium is loaded in a drive, said first playback contents being established as contents management units, the contents management units including data stored as the encrypted data based on the individual encryption unit keys associated respectively with the contents management units.

11. The information recording medium according to claim 1, wherein said information recording medium stores top menu contents as contents reproduced when a menu display function is performed, said top menu contents being established as contents management units, the contents management units including data stored as the encrypted data based on the individual encryption unit keys associated respectively with the contents management units.

12. The information recording medium according to claim 1, wherein said information recording medium further stores a data file defining information representative of association between the contents management units and indexes, and random number information for generating the encryption unit keys.

13. An information processing apparatus, comprising:
   a management unit setting section for establishing constituent data of main contents to be read from an information recording medium and according to a predetermined format and subcontents to be read from the information recording medium and not according to the predetermined format, as contents management units, the main contents recorded in a plurality of contents management units, at least one of the contents management units including, as the constituent data, plural individual contents data and plural titles; and
   a recording section for generating an individual independent encryption unit key for each respective contents management unit and for recording data included in the contents management units in the information recording medium as encrypted data based on the individual encryption unit keys associated respectively with said contents management units.

14. The information processing apparatus according to claim 13, wherein said predetermined format is a disc ROM format, and said recording section stores said main contents in said information recording medium as recorded data having a layered data arrangement according to said disc ROM format.

15. The information processing apparatus according to claim 13, wherein said management unit setting section establishes said contents management units in association with a set of data groups including at least one data file included in said subcontents, and said recording section records path identification information of the files of the data groups corresponding to the contents management units, in said information recording medium as data group management information.

16. The information processing apparatus according to claim 13, wherein said management unit setting section establishes said contents management units in association with a set of data groups including at least one data file included in said subcontents, and said recording section records said at least one data file included in said subcontents in said information recording medium based on a directory arrangement with said data groups established as individual folders.

17. The information processing apparatus according to claim 16, wherein said recording section records identification information of the individual folders of the data groups corresponding to the contents management units, in said information recording medium as the data group management information.

18. The information processing apparatus according to claim 13, wherein said recording section records contents usage control information corresponding to the contents management units, in said information recording medium as the encrypted data based on the encryption unit keys associated respectively with the contents management units.

19. The information processing apparatus according to claim 13, wherein said recording section records contents usage control information corresponding to the contents management units, in said information recording medium as data having a falsification prevention arrangement.

20. The information processing apparatus according to claim 13, wherein said recording section encrypts contents usage control information corresponding to the contents management units and data associated with hash values based on the contents usage control information, based on the encryption unit keys associated respectively with the contents management units, and records the encrypted contents usage control information and the encrypted data in said information recording medium.

21. The information processing apparatus according to claim 13, wherein said recording section encrypts repetitive data of contents usage control information corresponding to the contents management units, based on the encryption unit keys associated respectively with the contents management units, and records the encrypted repetitive data in said information recording medium.

22. The information processing apparatus according to claim 13, wherein said management unit setting section establishes first playback contents as contents reproduced when the information recording medium is loaded in a drive, as contents management units, and said recording section records data included in the contents management units as the encrypted data based on the individual encryption unit keys associated respectively with the contents management units.

23. The information processing apparatus according to claim 13, wherein said management unit setting section establishes top menu contents as contents reproduced when a menu display function is performed, as contents management units, and said recording section records data included in the contents management units as the encrypted data based on the individual encryption unit keys associated respectively with the contents management units.

24. The information processing apparatus according to claim 13, wherein said recording section further records a data file defining information representative of association between the contents management units and indexes, and random number information for generating the encryption unit keys.

25. An information processing method, comprising:
establishing constituent data of main contents to be read from an information recording medium and according to a predetermined format and subcontents to be read from the information recording medium and not according to the predetermined format, as contents management units, the main contents recorded in a plurality of contents management units, at least one of the contents management units including, as the constituent data, plural individual contents data and plural titles;
generating an individual independent encryption unit key for each respective contents management unit;
storing data included in the contents management units in the information recording medium as encrypted data based on the individual encryption unit keys associated respectively with said contents management units.

26. The information processing method according to claim 25, wherein said predetermined format is a disc ROM format, and said data storing comprising storing said main contents in said information recording medium as recorded data having a layered data arrangement according to said disc ROM format.

27. The information processing method according to claim 25, further comprising:
establishing said contents management units in association with a set of data groups including at least one data file included in said subcontents; and
storing path identification information of the files of the data groups corresponding to the contents management units, in said information recording medium as data group management information.

28. The information processing method according to claim 25, further comprising:
establishing said contents management units in association with a set of data groups including at least one data file included in said subcontents; and
storing said at least one data file included in said subcontents in said information recording medium based on a directory arrangement with said data groups established as individual folders.

29. The information processing method according to claim 28, further comprising:
storing identification information of the individual folders of the data groups corresponding to the contents management units, in said information recording medium as the data group management information.

30. The information processing method according to claim 25, further comprising:
storing contents usage control information corresponding to the contents management units, in said information recording medium as the encrypted data based on the encryption unit keys associated respectively with the contents management units.

31. The information processing method according to claim 25, further comprising:
storing contents usage control information corresponding to the contents management units, in said information recording medium as data having a falsification prevention arrangement.

32. The information processing method according to claim 25, further comprising:
encrypting contents usage control information corresponding to the contents management units and data associated with hash values based on the contents usage control information, based on the encryption unit keys associated respectively with the contents management units; and storing the encrypted contents usage control information and the encrypted data in said information recording medium.

33. The information processing method according to claim 25, further comprising:

encrypting repetitive data of contents usage control information corresponding to the contents management units, based on the encryption unit keys associated respectively with the contents management units; and storing the encrypted repetitive data in said information recording medium.

34. The information processing method according to claim 25, further comprising:

establishing first playback contents as contents reproduced when the information recording medium is loaded in a drive, as contents management units; and storing data included in the contents management units as the encrypted data based on the individual encryption unit keys associated respectively with the contents management units.

35. The information processing method according to claim 25, further comprising:

establishing top menu contents as contents reproduced when a menu display function is performed, as contents management units; and storing data included in the contents management units as the encrypted data based on the individual encryption unit keys associated respectively with the contents management units.

36. The information processing method according to claim 25, further comprising:

further storing a data file defining information representative of association between the contents management units and indexes, and random number information for generating the encryption unit keys.

37. A tangible computer readable medium storing computer executable code for controlling a computer to record usage management contents, the computer executable code comprising:

first computer executable code to control the computer to establish constituent data of main contents to be read from an information recording medium and according to a predetermined format and subcontents to be read from the information recording medium and not according to the predetermined format, as contents management units, the main contents recorded in a plurality of contents management units, at least one of the contents management units including, as the constituent data, plural individual contents data and plural titles; and second computer executable code to control the computer to generate an individual independent encryption unit key for each respective contents management unit;

third computer executable code to control the computer to store data included in the contents management units in the information recording medium as encrypted data based on the individual encryption unit keys associated respectively with said contents management units.

* * * * *